United States Patent
Schiffmann et al.

(10) Patent No.: US 11,100,070 B2
(45) Date of Patent: *Aug. 24, 2021

(54) MANIPULATION AND/OR ANALYSIS OF HIERARCHICAL DATA

(71) Applicant: ROBERT T. AND VIRGINIA T. JENKINS AS TRUSTEES OF THE JENKINS FAMILY TRUST DATED FEB. 8, 2002, Sacramento, CA (US)

(72) Inventors: Karl Schiffmann, Santa Barbara, CA (US); Jack J. LeTourneau, Ventura, CA (US); Mark Andrews, Pleasant Hill, CA (US)

(73) Assignee: Robert T. and Virginia T. Jenkins, Sacramento, CA (US), as Trustees of the Jenkins Family Trust dated Feb. 8, 2002

(*) Notice: Subject to any disclaimer, the term of this patent is extended or adjusted under 35 U.S.C. 154(b) by 287 days.

This patent is subject to a terminal disclaimer.

(21) Appl. No.: 16/048,061

(22) Filed: Jul. 27, 2018

(65) Prior Publication Data

US 2019/0026326 A1 Jan. 24, 2019

Related U.S. Application Data

(63) Continuation of application No. 14/968,429, filed on Dec. 14, 2015, now Pat. No. 10,055,438, which is a continuation of application No. 13/030,084, filed on Feb. 17, 2011, now Pat. No. 9,245,050, which is a continuation of application No. 11/412,417, filed on Apr. 26, 2006, now Pat. No. 7,899,821.

(60) Provisional application No. 60/675,987, filed on Apr. 29, 2005.

(51) Int. Cl.
| | |
|---|---|
| G06F 16/20 | (2019.01) |
| G06F 16/22 | (2019.01) |
| G06F 16/245 | (2019.01) |
| G06F 16/28 | (2019.01) |
| G06F 16/901 | (2019.01) |

(52) U.S. Cl.
CPC ........ *G06F 16/2246* (2019.01); *G06F 16/245* (2019.01); *G06F 16/282* (2019.01); *G06F 16/9027* (2019.01)

(58) Field of Classification Search
CPC ... G06F 16/2246; G06F 16/245; G06F 16/282
See application file for complete search history.

(56) References Cited

U.S. PATENT DOCUMENTS

| | | |
|---|---|---|
| 3,201,701 A | 8/1965 | Maitra |
| 3,704,345 A | 11/1972 | Coker |
| 4,001,951 A | 1/1977 | Fasse |

(Continued)

OTHER PUBLICATIONS

"Core Technology Benchmarks a White Paper", Jul. 2002, downloaded from the internet Mar. 2, 2004.

(Continued)

*Primary Examiner* — Tarek Chbouki

(74) *Attorney, Agent, or Firm* — Berkeley Law & Technology Group, LLP

(57) ABSTRACT

Embodiments of methods, apparatuses, devices and/or systems for manipulating hierarchical sets of data are disclosed. In particular, methods, apparatus devices and or/or systems for analyzing hierarchical data are disclosed.

35 Claims, 21 Drawing Sheets

(56) References Cited

U.S. PATENT DOCUMENTS

| | | |
|---|---|---|
| 4,134,218 A | 1/1979 | Adams et al. |
| 4,156,910 A | 5/1979 | Barton et al. |
| 4,286,330 A | 8/1981 | Isaacson |
| 4,439,162 A | 3/1984 | Blaine |
| 4,677,550 A | 6/1987 | Ferguson |
| 4,737,109 A | 4/1988 | Abramson |
| 4,745,561 A | 5/1988 | Hirosawa et al. |
| 4,751,684 A | 6/1988 | Holt |
| 4,831,525 A | 5/1989 | Saito et al. |
| 4,867,686 A | 9/1989 | Goldstein |
| 4,905,138 A | 1/1990 | Bourne |
| 4,931,928 A | 6/1990 | Greenfeld |
| 4,949,388 A | 8/1990 | Bhaskaran |
| 4,989,132 A | 1/1991 | Mellender et al. |
| 4,991,087 A | 2/1991 | Burkowski et al. |
| 5,021,943 A | 6/1991 | Grimes |
| 5,021,992 A | 6/1991 | Kondo |
| 5,050,071 A | 9/1991 | Harris et al. |
| 5,191,522 A | 3/1993 | Bosco et al. |
| 5,235,701 A | 8/1993 | Ohler et al. |
| 5,265,245 A | 11/1993 | Nordstrom et al. |
| 5,295,261 A | 3/1994 | Simonetti |
| 5,325,531 A | 6/1994 | McKeeman |
| 5,335,320 A | 8/1994 | Iwata |
| 5,335,345 A | 8/1994 | Frieder et al. |
| 5,355,496 A | 10/1994 | Fant et al. |
| 5,463,777 A | 10/1995 | Bialkowski et al. |
| 5,493,504 A | 2/1996 | Minato |
| 5,493,678 A | 2/1996 | Arcuri et al. |
| 5,497,500 A | 3/1996 | Rogers et al. |
| 5,509,088 A | 4/1996 | Robson |
| 5,519,627 A | 5/1996 | Mahmood et al. |
| 5,522,068 A | 5/1996 | Berkowitz |
| 5,544,301 A | 8/1996 | Orton et al. |
| 5,577,253 A | 11/1996 | Blickstein |
| 5,598,350 A | 1/1997 | Kawanishi et al. |
| 5,606,669 A | 2/1997 | Bertin et al. |
| 5,636,155 A | 6/1997 | Kabuo |
| 5,687,362 A | 11/1997 | Bhargava et al. |
| 5,706,406 A | 1/1998 | Pollock |
| 5,724,512 A | 3/1998 | Winterbottom |
| 5,724,576 A | 3/1998 | Letourneau |
| 5,742,806 A | 4/1998 | Reiner |
| 5,745,892 A | 4/1998 | Miyata et al. |
| 5,748,975 A | 5/1998 | Van De Vanter |
| 5,758,152 A | 5/1998 | LeTourneau |
| 5,778,354 A | 7/1998 | Leslie |
| 5,778,371 A | 7/1998 | Fujihara |
| 5,781,906 A | 7/1998 | Aggarwal et al. |
| 5,784,557 A | 7/1998 | Oprescu |
| 5,787,415 A | 7/1998 | Jacobson et al. |
| 5,787,432 A | 7/1998 | Letourneau |
| 5,796,356 A | 8/1998 | Okada et al. |
| 5,802,370 A | 9/1998 | Sitbon et al. |
| 5,822,593 A | 10/1998 | Lamping et al. |
| 5,826,262 A | 10/1998 | Bui |
| 5,848,159 A | 12/1998 | Collins et al. |
| 5,905,138 A | 5/1999 | Van Broekhoven |
| 5,930,805 A | 7/1999 | Marquis |
| 5,937,181 A | 8/1999 | Godefroid et al. |
| 5,960,425 A | 9/1999 | Buneman et al. |
| 5,970,490 A | 10/1999 | Morgenstern |
| 5,978,790 A | 11/1999 | Buneman et al. |
| 5,987,449 A | 11/1999 | Suciu |
| 5,999,926 A | 12/1999 | Suciu |
| 6,002,879 A | 12/1999 | Radigan et al. |
| 6,003,033 A | 12/1999 | Amano et al. |
| 6,022,879 A | 2/2000 | Crow et al. |
| 6,028,987 A | 2/2000 | Hirairi |
| 6,055,537 A | 4/2000 | LeTourneau |
| 6,076,087 A | 6/2000 | Suciu |
| 6,088,691 A | 7/2000 | Bhargava et al. |
| 6,141,655 A | 10/2000 | Johnson et al. |
| 6,199,103 B1 | 3/2001 | Sakuguchi et al. |
| 6,236,410 B1 | 5/2001 | Politis et al. |
| 6,240,418 B1 * | 5/2001 | Shadmon ............ G06F 16/2246 707/696 |
| 6,243,859 B1 | 6/2001 | Chen-Kuang |
| 6,272,495 B1 | 8/2001 | Hetherington |
| 6,279,007 B1 | 8/2001 | Uppala |
| 6,289,354 B1 | 9/2001 | Aggarwal et al. |
| 6,292,938 B1 | 9/2001 | Sarkar et al. |
| 6,314,559 B1 | 11/2001 | Sollich |
| 6,336,812 B1 | 1/2002 | Cooper et al. |
| 6,341,372 B1 | 1/2002 | Datig |
| 6,377,953 B1 | 4/2002 | Gawlick |
| 6,411,957 B1 | 6/2002 | Dijkstra |
| 6,442,584 B1 | 8/2002 | Kolli et al. |
| 6,446,256 B1 | 9/2002 | Hyman et al. |
| 6,466,240 B1 | 10/2002 | Maslov |
| 6,480,857 B1 | 11/2002 | Chandler |
| 6,505,205 B1 | 1/2003 | Kothuri et al. |
| 6,542,899 B1 | 4/2003 | Saulpaugh et al. |
| 6,550,024 B1 | 4/2003 | Pagurek et al. |
| 6,556,983 B1 | 4/2003 | Altschuler et al. |
| 6,598,052 B1 | 7/2003 | Saulpaugh et al. |
| 6,598,502 B1 | 7/2003 | Rosa |
| 6,606,632 B1 | 8/2003 | Saulpaugh et al. |
| 6,606,741 B2 | 8/2003 | Kojima et al. |
| 6,609,130 B1 | 8/2003 | Saulpaugh et al. |
| 6,610,106 B1 | 8/2003 | Jenks |
| 6,611,844 B1 | 8/2003 | Saulpaugh et al. |
| 6,640,218 B1 | 10/2003 | Golding |
| 6,658,649 B1 | 12/2003 | Bates et al. |
| 6,687,734 B1 | 2/2004 | Sellink et al. |
| 6,691,301 B2 | 2/2004 | Bowen |
| 6,714,939 B2 | 3/2004 | Saldanha et al. |
| 6,728,953 B1 | 4/2004 | Walster |
| 6,745,384 B1 | 6/2004 | Biggerstaff |
| 6,748,378 B1 | 6/2004 | Lavender et al. |
| 6,763,515 B1 | 7/2004 | Vazquez et al. |
| 6,785,673 B1 | 8/2004 | Fernandez et al. |
| 6,804,677 B2 | 10/2004 | Shadmon |
| 6,817,865 B2 | 11/2004 | Charbonneau |
| 6,829,695 B1 | 12/2004 | Ross |
| 6,847,979 B2 | 1/2005 | Allemang et al. |
| 6,854,976 B1 | 2/2005 | Suhr |
| 6,874,005 B2 | 3/2005 | Fortenberry et al. |
| 6,880,148 B1 | 4/2005 | Raph |
| 6,941,511 B1 | 9/2005 | Hind |
| 6,965,990 B2 | 11/2005 | Barsness et al. |
| 6,968,330 B2 | 11/2005 | Edwards et al. |
| 6,978,271 B1 | 12/2005 | Hoffman et al. |
| 7,043,555 B1 | 5/2006 | McCain et al. |
| 7,051,033 B2 | 5/2006 | Agarwal et al. |
| 7,072,904 B2 | 7/2006 | Najork et al. |
| 7,103,838 B1 | 9/2006 | Krishnamurthy et al. |
| 7,107,265 B1 | 9/2006 | Calvignac et al. |
| 7,111,016 B2 | 9/2006 | Gurevich |
| 7,117,196 B2 | 10/2006 | Gaur et al. |
| 7,117,479 B2 | 10/2006 | Van De Vanter |
| 7,127,704 B2 | 10/2006 | Van De Vanter et al. |
| 7,134,075 B2 | 11/2006 | Hind et al. |
| 7,139,765 B1 | 11/2006 | Balkany |
| 7,140,006 B2 | 11/2006 | Harrison et al. |
| 7,162,485 B2 | 1/2007 | Gottlob et al. |
| 7,190,376 B1 | 3/2007 | Tonisson |
| 7,191,182 B2 | 3/2007 | Anonsen et al. |
| 7,203,680 B2 | 4/2007 | Parida |
| 7,203,774 B1 | 4/2007 | Zhou et al. |
| 7,225,183 B2 | 5/2007 | Gardner |
| 7,287,026 B2 | 10/2007 | Oommen |
| 7,313,563 B2 | 12/2007 | Bordawekar et al. |
| 7,318,215 B1 | 1/2008 | Krishnan et al. |
| 7,337,163 B1 | 2/2008 | Srinivasan |
| 7,356,802 B2 | 4/2008 | de Sutter et al. |
| 7,360,202 B1 | 4/2008 | Seshadri et al. |
| 7,392,239 B2 | 6/2008 | Fontoura |
| 7,409,673 B2 | 8/2008 | Kuo et al. |
| 7,419,376 B2 | 9/2008 | Sarvazyan et al. |
| 7,421,648 B1 | 9/2008 | Davis |
| 7,437,666 B2 | 10/2008 | Ramarao |
| 7,475,070 B2 | 1/2009 | Fan et al. |
| 7,496,892 B2 | 2/2009 | Nuss |

(56) References Cited

U.S. PATENT DOCUMENTS

| | | |
|---|---|---|
| 7,512,932 B2 | 3/2009 | Davidov et al. |
| 7,536,675 B2 | 5/2009 | Gallagher |
| 7,536,676 B2 | 5/2009 | Baker |
| 7,544,062 B1 | 6/2009 | Hauschild et al. |
| 7,561,927 B2 | 7/2009 | Oyama et al. |
| 7,571,156 B1 | 8/2009 | Gupta et al. |
| 7,571,169 B2 | 8/2009 | Jones et al. |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | LeTourneau |
| 7,630,995 B2 | 12/2009 | LeTourneau |
| 7,636,727 B2 | 12/2009 | Schiffmann et al. |
| 7,650,592 B2 | 1/2010 | Eckels et al. |
| 7,669,183 B2 | 2/2010 | Bowman et al. |
| 7,681,177 B2 | 3/2010 | LeTourneau |
| 7,720,830 B2 | 5/2010 | Wen et al. |
| 7,761,847 B2 | 7/2010 | Kornerup et al. |
| 7,761,858 B2 | 7/2010 | Chang et al. |
| 7,765,183 B2 | 7/2010 | Williams, Jr. |
| 7,779,396 B2 | 8/2010 | Meijer et al. |
| 7,801,923 B2 | 9/2010 | LeTourneau |
| 7,827,523 B2 | 11/2010 | Ahmed et al. |
| 7,861,304 B1 | 12/2010 | Nachenberg |
| 7,882,147 B2 | 2/2011 | LeTourneau |
| 7,890,471 B2 | 2/2011 | Fan |
| 7,890,927 B2 | 2/2011 | Eldridge |
| 7,890,928 B2 | 2/2011 | Patrudu |
| 7,899,821 B1 | 3/2011 | Schiffmann |
| 7,962,494 B2 | 6/2011 | Furusho |
| 8,005,869 B2 | 8/2011 | Corl |
| 8,020,145 B2 | 9/2011 | Fant |
| 8,032,860 B2 | 10/2011 | Piehler et al. |
| 8,037,102 B2 | 10/2011 | LeTourneau |
| 8,060,868 B2 | 11/2011 | Meijer et al. |
| 8,086,998 B2 | 12/2011 | Bansal |
| 8,112,740 B2 | 2/2012 | Meijer |
| 8,151,276 B2 | 4/2012 | Grechanik |
| 8,181,155 B2 | 5/2012 | Pinto et al. |
| 8,203,972 B2 | 6/2012 | Sauermann |
| 8,230,526 B2 | 7/2012 | Holland et al. |
| 8,250,526 B2 | 8/2012 | Anderson et al. |
| 8,316,059 B1 | 11/2012 | Schiffmann |
| 8,356,040 B2 | 1/2013 | LeTourneau |
| 8,365,137 B2 | 1/2013 | Fant |
| 8,438,534 B2 | 5/2013 | Thomson |
| 8,443,339 B2 | 5/2013 | LeTourneau |
| 8,458,191 B2 | 6/2013 | Bhattacharjee |
| 8,484,236 B1 | 7/2013 | Andrews |
| 8,606,794 B2 | 12/2013 | Amer-Yahia |
| 8,612,461 B2 | 12/2013 | Schiffmann |
| 8,615,530 B1 | 12/2013 | Letourneau |
| 8,626,777 B2 | 1/2014 | LeTourneau |
| 8,650,201 B2 | 2/2014 | LeTourneau |
| 8,683,431 B2 | 3/2014 | Thomson et al. |
| 8,762,942 B2 | 6/2014 | Langworthy et al. |
| 8,868,621 B2 | 10/2014 | D'Onofrio, II et al. |
| 8,869,106 B2 | 10/2014 | Jazdzewski |
| 8,930,896 B1 | 1/2015 | Wiggins |
| 8,935,232 B2 | 1/2015 | Abadi |
| 8,990,769 B2 | 3/2015 | LeTourneau |
| 9,002,862 B2 | 4/2015 | Schiffmann |
| 9,015,202 B2 | 4/2015 | Letourneau |
| 9,020,961 B2 | 4/2015 | LeTourneau |
| 9,043,347 B2 | 5/2015 | LeTourneau |
| 9,077,515 B2 | 7/2015 | LeTourneau |
| 9,167,579 B2 | 10/2015 | Fettweis et al. |
| 9,177,003 B2 | 11/2015 | Letourneau |
| 9,245,050 B2 | 1/2016 | Schiffmann |
| 9,330,128 B2 | 5/2016 | Schiffmann |
| 9,411,841 B2 | 8/2016 | Schiffmann |
| 9,425,951 B2 | 8/2016 | LeTourneau |
| 9,430,512 B2 | 8/2016 | LeTourneau |
| 9,563,653 B2 | 2/2017 | LeTourneau |
| 9,563,663 B2 | 2/2017 | Shukla et al. |
| 9,646,034 B2 | 5/2017 | Schiffmann |
| 9,646,107 B2 | 5/2017 | LeTourneau |
| 9,842,130 B2 | 12/2017 | Schiffmann |
| 10,055,438 B2 | 8/2018 | Schiffmann |
| 10,068,003 B2 | 9/2018 | Schiffmann |
| 10,140,349 B2 | 11/2018 | Letourneau |
| 10,255,311 B2 | 4/2019 | LeTourneau |
| 10,275,489 B1 | 4/2019 | Muniswamy Reddy |
| 10,325,031 B2 | 6/2019 | Letourneau |
| 10,380,039 B2 | 8/2019 | Cooray |
| 10,380,089 B2 | 8/2019 | Letourneau |
| 10,394,785 B2 | 8/2019 | Letourneau |
| 10,411,878 B2 | 9/2019 | Letourneau |
| 10,437,886 B2 | 10/2019 | Andrews |
| 10,713,274 B2 | 7/2020 | Letourneau |
| 10,725,989 B2 | 7/2020 | Schiffmann |
| 10,733,234 B2 | 8/2020 | Letourneau |
| 2001/0003211 A1 | 6/2001 | Bera |
| 2001/0037496 A1 | 11/2001 | Simonyi |
| 2002/0023166 A1 | 2/2002 | Bar-Noy et al. |
| 2002/0062259 A1 | 2/2002 | Katz et al. |
| 2002/0040292 A1 | 4/2002 | Marcu |
| 2002/0059281 A1 | 5/2002 | Watanabe et al. |
| 2002/0091676 A1 | 7/2002 | Agrawal |
| 2002/0107860 A1 | 8/2002 | Gobeille et al. |
| 2002/0129129 A1 | 9/2002 | Bloch et al. |
| 2002/0130796 A1 | 9/2002 | Tsuchido et al. |
| 2002/0130907 A1 | 9/2002 | Chi et al. |
| 2002/0133347 A1 | 9/2002 | Schoneburg |
| 2002/0133497 A1 | 9/2002 | Draper et al. |
| 2002/0149604 A1 | 10/2002 | Wilkinson |
| 2002/0169563 A1 | 11/2002 | de Carvalho Ferreira |
| 2002/0194163 A1 | 12/2002 | Hopeman |
| 2003/0041088 A1 | 2/2003 | Wilson et al. |
| 2003/0065659 A1 | 4/2003 | Agarwal et al. |
| 2003/0074436 A1 | 4/2003 | Gieseke |
| 2003/0115559 A1 | 6/2003 | Sawada |
| 2003/0130977 A1 | 7/2003 | Oommen |
| 2003/0167445 A1 | 9/2003 | Su et al. |
| 2003/0195885 A1 | 10/2003 | Emmick et al. |
| 2003/0195890 A1 | 10/2003 | Oommen |
| 2003/0236787 A1* | 12/2003 | Burges ............... G06F 16/35 |
| 2003/0236794 A1 | 12/2003 | Hostetter et al. |
| 2004/0003028 A1 | 1/2004 | Emmett et al. |
| 2004/0010752 A1 | 1/2004 | Chan et al. |
| 2004/0019599 A1 | 1/2004 | Trappen et al. |
| 2004/0024724 A1 | 2/2004 | Rubin |
| 2004/0024790 A1 | 2/2004 | Everett |
| 2004/0044659 A1 | 3/2004 | Judd et al. |
| 2004/0054692 A1 | 3/2004 | Seyrat et al. |
| 2004/0060006 A1 | 3/2004 | Lindblad |
| 2004/0060007 A1 | 3/2004 | Gottlob et al. |
| 2004/0068498 A1 | 4/2004 | Patchet et al. |
| 2004/0075677 A1 | 4/2004 | Loyall et al. |
| 2004/0103105 A1 | 5/2004 | Lindblad et al. |
| 2004/0122844 A1 | 6/2004 | Malloy et al. |
| 2004/0125124 A1 | 7/2004 | Kim et al. |
| 2004/0160464 A1 | 8/2004 | Reyna |
| 2004/0205047 A1 | 10/2004 | Carpenter |
| 2004/0215642 A1 | 10/2004 | Cameron et al. |
| 2004/0239674 A1 | 12/2004 | Ewald et al. |
| 2004/0254909 A1 | 12/2004 | Testa |
| 2004/0260683 A1 | 12/2004 | Chan et al. |
| 2004/0260684 A1 | 12/2004 | Agrawal et al. |
| 2004/0267958 A1 | 12/2004 | Reed |
| 2004/0268236 A1 | 12/2004 | Childlovskii et al. |
| 2005/0021548 A1 | 1/2005 | Bohannon et al. |
| 2005/0021683 A1 | 1/2005 | Newton et al. |
| 2005/0023524 A1 | 2/2005 | Beatty |
| 2005/0027495 A1 | 2/2005 | Matichuk |
| 2005/0027743 A1 | 2/2005 | O'Neil et al. |
| 2005/0028091 A1 | 2/2005 | Bordawekar |
| 2005/0050016 A1 | 3/2005 | Stanoi et al. |
| 2005/0050066 A1 | 3/2005 | Hughes |
| 2005/0055369 A1 | 3/2005 | Gorelik et al. |
| 2005/0058976 A1 | 3/2005 | Vernon |
| 2005/0060320 A1 | 3/2005 | Bostrom |
| 2005/0060332 A1 | 3/2005 | Bernstein et al. |
| 2005/0065964 A1 | 3/2005 | Ziemann et al. |

(56) References Cited

U.S. PATENT DOCUMENTS

| | | |
|---|---|---|
| 2005/0065965 A1 | 3/2005 | Ziemann et al. |
| 2005/0097084 A1 | 5/2005 | Balmin |
| 2005/0102636 A1 | 5/2005 | McKeon |
| 2005/0125432 A1 | 6/2005 | Lin et al. |
| 2005/0138073 A1 | 6/2005 | Zhou et al. |
| 2005/0149471 A1 | 7/2005 | Lassalle |
| 2005/0154265 A1 | 7/2005 | Miro et al. |
| 2005/0154979 A1 | 7/2005 | Chidlovskii et al. |
| 2005/0156761 A1 | 7/2005 | Oh |
| 2005/0165732 A1 | 7/2005 | Burges |
| 2005/0171962 A1 | 8/2005 | Martin et al. |
| 2005/0187900 A1 | 8/2005 | LeTourneau |
| 2005/0195741 A1 | 9/2005 | Doshi et al. |
| 2005/0210014 A1 | 9/2005 | Asano |
| 2005/0214727 A1 | 9/2005 | Stoianovici et al. |
| 2005/0216445 A1 | 9/2005 | Rao |
| 2005/0267908 A1 | 12/2005 | LeTourneau |
| 2005/0286788 A1 | 12/2005 | Orr |
| 2006/0004817 A1* | 1/2006 | Andrews ............ G06F 16/9027 |
| 2006/0005122 A1 | 1/2006 | Lemoine |
| 2006/0015538 A1 | 1/2006 | LeTourneau |
| 2006/0053122 A1 | 3/2006 | Korn et al. |
| 2006/0074838 A1 | 4/2006 | Srivastava |
| 2006/0095442 A1 | 5/2006 | LeTourneau |
| 2006/0095455 A1 | 5/2006 | LeTourneau |
| 2006/0123029 A1 | 6/2006 | LeTourneau |
| 2006/0129582 A1 | 6/2006 | Schiffmann et al. |
| 2006/0209351 A1 | 9/2006 | Saito et al. |
| 2006/0259533 A1 | 11/2006 | LeTourneau |
| 2006/0271573 A1 | 11/2006 | LeTourneau |
| 2007/0003917 A1 | 1/2007 | Kitching et al. |
| 2007/0198538 A1 | 8/2007 | Palacios |
| 2008/0270435 A1 | 10/2008 | Furusho |
| 2008/0313196 A1 | 10/2008 | Furusho |
| 2010/0094885 A1 | 4/2010 | Andrews |
| 2010/0094908 A1 | 4/2010 | LeTourneau |
| 2010/0114969 A1 | 5/2010 | LeTourneau |
| 2010/0191775 A1 | 7/2010 | Schiffmann et al. |
| 2010/0205581 A1 | 8/2010 | LeTourneau |
| 2010/0318521 A1 | 12/2010 | Letourneau |
| 2011/0131259 A1 | 6/2011 | Letourneau |
| 2011/0282898 A1 | 11/2011 | Schiffmann |
| 2011/0320499 A1 | 12/2011 | Letourneau |
| 2012/0144388 A1 | 6/2012 | Kurian et al. |
| 2013/0151566 A1 | 6/2013 | Schiffmann et al. |
| 2013/0198239 A1 | 8/2013 | Letoruneau |
| 2014/0040293 A1 | 2/2014 | Letourneau |
| 2014/0184430 A1 | 7/2014 | Jiang et al. |
| 2014/0289266 A1 | 9/2014 | Letourneau |
| 2014/0289278 A1 | 9/2014 | Schiffmann |
| 2014/0289279 A1 | 9/2014 | Letourneau |
| 2014/0362961 A1 | 12/2014 | Letourneau |
| 2015/0193517 A1 | 7/2015 | Letourneau |
| 2015/0220582 A1 | 8/2015 | Letourneau |
| 2015/0242449 A1 | 8/2015 | Schiffmann |
| 2015/0242450 A1 | 8/2015 | Letourneau |
| 2015/0310048 A1 | 10/2015 | Letourneau |
| 2015/0341165 A1 | 11/2015 | Letourneau |
| 2016/0117353 A1 | 4/2016 | Schiffmann |
| 2016/0162528 A1 | 6/2016 | Letourneau |
| 2016/0283611 A1 | 9/2016 | Schiffmann et al. |
| 2016/0328431 A1 | 11/2016 | Schiffmann |
| 2016/0359616 A1 | 12/2016 | Letourneau |
| 2017/0032053 A1 | 2/2017 | Letourneau |
| 2017/0053006 A1 | 2/2017 | Letourneau |
| 2017/0132301 A1 | 5/2017 | Letourneau |
| 2017/0255660 A1 | 9/2017 | Schiffmann et al. |
| 2018/0107698 A1 | 4/2018 | Schiffmann |
| 2019/0026326 A1 | 1/2019 | Schiffmann |
| 2019/0034510 A1 | 1/2019 | Letourneau |
| 2019/0121795 A1 | 4/2019 | Schiffmann |
| 2019/0129899 A1 | 5/2019 | Letourneau |
| 2019/0171628 A1 | 6/2019 | Letourneau |
| 2019/0236078 A1 | 8/2019 | Letourneau |
| 2019/0356465 A1 | 11/2019 | Letourneau |
| 2019/0377718 A1 | 12/2019 | Letourneau |
| 2019/0384753 A1 | 12/2019 | Letourneau |
| 2019/0384792 A1 | 12/2019 | Andrews |
| 2020/0218707 A1 | 7/2020 | Letourneau |
| 2020/0372041 A1 | 11/2020 | Letourneau |
| 2020/0394168 A1 | 12/2020 | Schiffmann |
| 2020/0394224 A1 | 12/2020 | Letourneau |
| 2021/0149860 A1 | 5/2021 | Letourneau |

OTHER PUBLICATIONS

"Origin Data, Inc. White Paper", ©1999, pp. 1-13.

"The Associative Model of Data White Paper", Lazy Software, Ltd., 2000.

ACM Portal Search Results (Kleene and prime and enumeration and operation and natural and numerals and sequences and "enumeration operation") conducted by Examiner on Jul. 18, 2009, 6 pages.

ACM Portal Search Results (Kleene and prime and enumeration and operation and natural and numerals and sequences and enumeration and operation) conducted by Examiner on Jul. 18, 2009, 1 page.

Alderson et al., "Toward an Optimization Driven Framework for Designing and Generating Realistic Internet Topologies" ACM SIGCOMM Computer Communications Review 41, vol. 33, No. 1, pp. 41-46, 2003.

Apostol, "A Centennial History of the Prime Number Theorem", Engineering and Science, No. 4, 1996.

Benedikt et al., "Definable Relations and First-Order Query Languages over Strings" Journal of the ACM, vol. 50, No. 5, pp. 694-751, 2003.

Boppana et al., "Full Fault Dictionary Storage Based on Labeled Tree Encoding", Proceedings of $14^{th}$ VLSI Test Symposium, 1996, pp. 174-179.

Borodin et al., "A Tradeoff Between Search and Update Time for the Implicit Dictionary Problem", Theoretical Computer Science vol. 1 No. 4 (1990), 425-447.

Cano et al., "Lazy Evaluation in Penniless Propagation over Join Trees", Networks, vol. 39(4), 2002 Wiley Periodicals, Inc., 175-185, 2002.

Caviness et al, "Simplification of Radical Expressions", ACM, pp. 329-338, 1976.

Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.

Cooper et al., "*Oh! Pascal!*", 1982, W.W. Norton & Company, Inc., Chapter 12, Arrays for Random Access, pp. 295-327.

Coenen, Frans; Leng, Paul and Ahmed, Shakil; "T-Trees, Vertical Partitioning and Distributed Association Rule Mining", IEEE, 2003.

Dubiner, M., Galil, Z., and Magen, E. "Faster Tree Pattern Matching.", Journal of the Association for Computing Machinery, vol. 41, No. 2, Mar. 1994, pp. 205-213.

Durango Bill's Enumeration of Trees. http://web.archive.org/web/20021028184112/http://www.durangobill.com/Trees.html, 1998.

Er, M.C., "Enumerating Ordered Trees Lexicographically", The Computation Journal, vol. 28, Issue 5, pp. 538-542, 1985.

Google search (Kleene prime enumeration operation natural numerals sequences "Kleene prime") conducted by Examiner on Jul. 18, 2009, 2 pages.

Ferragina et al., "The String B-Tree: A New Data Structure for String Search in External Memory and Its Applications", Journal of the ACM, vol. 46, No. 2, pp. 236-280, 1999.

Google Search (Kleene prime enumeration operation natural numerals sequences "enumeration operation") conducted by Examiner on Jul. 18, 2009, 2 pages.

Google Search (Kleene prime enumeration operation) conducted by Examiner on Jul. 18, 2009, 2 pages.

Hirschberg, "Algorithm for Computing Maximal Common Sebsequences", Communication of the ACM, vol. 18, No. 6, pp. 341-343, 1975.

Hoffman et al., "Pattern Matching in Trees", Purdue University, Jan. 1982, Journal for the Association for Computing Machinery, vol. 29, Issue 1, pp. 68-95.

(56) References Cited

OTHER PUBLICATIONS

Iacob et al., "XPath Extension for Querying Concurrent XML Markup", Technical Report #TR 394-04, Department of Computer Science, University of Kentucky, Lexington, KY 40506, Mar. 6, 2004, 15 pages.

IEEE Explore Digital Library Search Result conducted by Examiner on Jul. 18, 2009, 1 page.

Johnston et al. Advances in Dataflow Programming Languages, ACM Computing Surveys, vol. 36, No. 1, pp. 1-34, 2004.

Katajainen et al., "Tree Compression and Optimization with Applications", International Journal of Foundations of Computer Science, vol. 1 No. 4 (1990), 425-447.

Kharbutli et al., "Using Prime Numbers For Cache Indexing to Eliminate Conflict Misses", Dept. of Electrical and Computer Engineering, North Carolina State University, Feb. 2004, 24 pages.

Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.

Knuth, "The Art of Computer Programming", Volume 1 Fundamental Algorithms, Second edition, Addison-Wesley Series in *Computer Science and Information Processing*, ISBN 0-201-03809-9, Reading, Massachusetts, Copyright 1973.

Leinonen et al., "Automation of Document Structure Transformations", Auditorium, Microteknia Building, University of Kuopio, Nov. 5, 2004, 68 pages.

Lerman et al., "Learning the Common Structure of Data", American Association for Artificial Intelligence, AAAI-00 Proceedings, www.aaai.org, Apr. 13, 2000, 6 pages.

Letourneau, "The Elementary Theory of Object Oriented Arithmetic", pp. 1-9, Apr. 1990.

Malhotra et al, "A Methodology for Formal Expression of Hierarchy in Model Solution", IEEE, pp. 258-267, 1983.

Navarro, "A Guided Tour to Approximate String Matching", ACM Computing Surveys, vol. 33, No. 1, pp. 31-88, 2001.

Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.

Prasad et al., "Efficient Bit-Parallel Multi-Patterns String Matching Algorithms for Limited Expression", ACM, pp. 1-6, 2010.

Ramesh, R. and Ramakrishnan, I.V., "Nonlinear Pattern Matching in Trees." Journal of the Association for Computer Machinery, vol. 39, No. 2. Apr. 1992, pp. 295-316.

Reiss, "Semantics-Based Code Search", IEEE ICSE, pp. 243-253, 2009.

Schmidt et al., "Comparision of Tree and Graph Encodings as Function of Problem Complexity", ACM, pp. 1674-1679, 2007.

Sechrest et al., "Blending Hierarchical and Attribute-Based File Naming", Distributed Computing System, 1992, Proceedings of the 12$^{th}$ International Conference on Jun. 9-12, 1992, pp. 572-580.

Shanmugasundaram et al., "Querying SML Views of Relational Data", Proceedings of the 27$^{th}$ VLDB Conference, Roma, Italy, 2001, 9 pages.

Siegel, "All Searches Are Divided into Three Parts String Searches Using Ternary Trees", ACM, pp. 57-68, 1988.

Sinha et al, "Efficient Trie Based Sorting of Large Sets of Strings," ACM, pp. 1-8, 2003.

Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.

Smorynski, Craig, "Logical Number Theory I: An Introduction", Springer-Verlag Berlin Heidelberg, © 1991, Arithmetic Encoding, The Cantor Pairing Function, pp. 14-23, and 305.

Somani et al., "Phased-Mission System Analysis Using Boolean Algebraic Methods", May 1994, ACM Press, vol. 22, Issue 1.

Spinells "Declarative Peephole Optimization Using String Pattern Matching", ACM, pp. 47-51, 1999.

Sproat et al., "Compilation of Weighted Finite-State Tranducers from Decision Trees" ACM, pp. 215-222, 1996.

Stanat, D.F., and McAllister, D.F., "Discrete Mathematics in Computer Science", Prentice-Hall, 1977, Binary Relations, Ch. 3, Sec. 3.2, Trees, p. 131-145.

Talukdar, "Learning to Create Data-Integrating Queries", ACM PVLDB, pp. 785-796, 2008.

Thiemann, "Grammar-Based Analysis of String Expressions", ACM, pp. 59-70, 2005.

Valiente, "Algorithms on Trees and Graphs", Tree Isomorphism, pp. 151-251, Springer 2002.

Valiente, Gabriel, "Tree Isomorphism," of Algorithms on Trees and Graphs, Chapter 4, published by Springer, 2002, 51 pages.

Wagner et al., "The String-to-String Correction Problem", Journal of the Association for Computing Machinery, vol. 21, No. 1, pp. 168-173, 1974.

Wu, "A Prime Number Labeling Scheme for Dynamic Ordered XML Trees", IEEE, 2004, 13 pages.

Xie et al., "S-Looper: Automatice Summarization for Multipath String Loops", ACM, pp. 188-198, 2015.

Yates et al, "A New Approach to Text Searchin", Communications of the ACM, vol. 35, No. 10, pp. 74-82, 1992.

Zaks, S., "Lexicographic Generation of Ordered Trees", Dept. of Computer Science, University of Illinois, The Journal of Theoretical Computer Science, vol. 10(1), pp. 63-82, Revised 1978.

U.S. Appl. No. 11/005,859: Application filed Dec. 6, 2004, 120 pages.

U.S. Appl. No. 11/005,859: Notice to File Missing parts mailed Jan. 10, 2005, 2 pages.

U.S. Appl. No. 11/005,859: Response to Notice to File Missing parts mailed Apr. 1, 2005, 9 pages.

U.S. Appl. No. 11/005,859: Preliminary Amendment filed Apr. 28, 2005, 193 pages.

U.S. Appl. No. 11/005,859: Office Action—Restriction Requirement dated Dec. 12, 2007, 7 pages.

U.S. Appl. No. 11/005,859: Response to Office Action—Restriction Requirement filed Jan. 14, 2008, 82 pages.

U.S. Appl. No. 11/005,859: Non-final Office Action dated Mar. 21, 2008, 10 pages.

U.S. Appl. No. 11/005,859: Amendment filed Jul. 21, 2008, 86 pages.

U.S. Appl. No. 11/005,859: Final Office Action dated Oct. 30, 2008, 14 pages.

U.S. Appl. No. 11/005,859: Amendment filed Dec. 30, 2008, 83 pages.

U.S. Appl. No. 11/005,859: Advisory Action dated Jan. 13, 2009, 4 pages.

U.S. Appl. No. 11/005,859: RCE with amendment filed Apr. 30, 2009, 86 pages.

U.S. Appl. No. 11/005,859: Final Office Action dated Jul. 8, 2009, 9 pages.

U.S. Appl. No. 11/005,859: Examiner Interview Summary received Oct. 27, 2009, 3 pages.

U.S. Appl. No. 11/005,859: Amendment filed Dec. 8, 2009, 83 pages.

U.S. Appl. No. 11/005,859: Advisory Action dated Dec. 22, 2009, 3 pages.

U.S. Appl. No. 11/005,859: RCE with Amendment filed Jan. 7, 2010, 85 pages.

U.S. Appl. No. 11/005,859: Non-Final Office Action dated Jan. 21, 2010, 8 pages.

U.S. Appl. No. 11/005,859: Response to Non-Final Office Action filed Feb. 25, 2010, 83 pages.

U.S. Appl. No. 11/005,859: Final Office Action dated Jun. 8, 2010, 9 pages.

U.S. Appl. No. 11/005,859: Office Action Response dated Sep. 1, 2010, 89 pages.

U.S. Appl. No. 11/005,859: Advisory Action dated Sep. 14, 2010, 3 pages.

U.S. Appl. No. 11/005,859: Notice of Appeal filed Sep. 29, 2010, 1 page.

U.S. Appl. No. 11/005,859: Office Action dated Oct. 15, 2010, 5 pages.

(56) References Cited

OTHER PUBLICATIONS

U.S. Appl. No. 11/005,859: Office Action Response dated Jan. 18, 2011, 95 pages.
U.S. Appl. No. 11/005,859: Final Office Action dated Mar. 30, 2011, 7 pages.
U.S. Appl. No. 11/005,859: Notice of Allowance and Fees Due, dated Jun. 9, 2011, 11 pages.
U.S. Appl. No. 11/005,859: Amendment after Notice of Allowance and Issue Fee Payment, dated Sep. 9, 2011, 2 pages.
U.S. Appl. No. 11/005,859: Issue Notification, dated Sep. 21, 2011, 1 page.
U.S. Appl. No. 13/229,624: Application as filed Sep. 9, 2011, 139 pages.
U.S. Appl. No. 13/229,624: Filing receipt, dated Sep. 21, 2011, 4 pages.
U.S. Appl. No. 13/229,624: Non-Final Office Action, dated Nov. 23, 2011, 8 pages.
U.S. Appl. No. 13/229,624: Notice of Publication, dated Dec. 30, 2011, 1 page.
U.S. Appl. No. 13/229,624: Amendment, dated Feb. 23, 2012, 22 pages.
U.S. Appl. No. 13/229,624: Final Office Action, dated Mar. 20, 2012, 10 pages.
U.S. Appl. No. 13/229,624: Amendment after final, dated Jun. 13, 2012, 25 pages.
U.S. Appl. No. 13/229,624: Advisory Action, dated Jun. 20, 2012, 4 pages.
U.S. Appl. No. 13/229,624: RCE, mailed Jul. 20, 2012, 26 pages.
U.S. Appl. No. 13/229,624: Non-Final Rejection, dated Oct. 2, 2013, 9 pages.
U.S. Appl. No. 13/229,624: Response to non-final office action, dated Dec. 27, 2013, 11 pages.
U.S. Appl. No. 13/229,624: Non-Final Office Action, dated Apr. 4, 2014, 5 Pages.
U.S. Appl. No. 13/229,624: Non-Final Office Action Response, dated Aug. 1, 2014, 9 Pages.
U.S. Appl. No. 13/229,624: Final Rejection. dated Oct. 30, 2014, 6 pages.
U.S. Appl. No. 13/229,624: Response and Amendments after Final, filed Jan. 30, 2015, 11 pages.
U.S. Appl. No. 13/229,624: Advisory Action, dated Mar. 11, 2015, 3 pages.
U.S. Appl. No. 13/229,624: Applicant Initiated Interview Summary, dated Mar. 19, 2015, 3 pages.
U.S. Appl. No. 13/229,624: Response After Final Action and Interview Summary, filed Mar. 27, 2015, 20 pages.
U.S. Appl. No. 13/229,624: RCE and Amendments, filed Apr. 27, 2015, 17 pages.
U.S. Appl. No. 13/229,624: Notice of Allowance and Fees, dated Jul. 6, 2015, 21 pages.
U.S. Appl. No. 13/229,624: Issue Fee Payment, filed Sep. 28, 2015, 1 page.
U.S. Appl. No. 13/229,624: Issue Notification, filed Oct. 14, 2015, 1 page.
U.S. Appl. No. 14/870,744: Application as filed Sep. 30, 2015, 127 pages.
U.S. Appl. No. 14/870,744: Preliminary Amendments, dated Oct. 6, 2015, 10 pages.
U.S. Appl. No. 14/870,744: Notice to File Missing Parts, filed Oct. 16, 2015, 2 pages.
U.S. Appl. No. 14/870,744: Filing Receipt, dated Oct. 16, 2015, 3 pages.
U.S. Appl. No. 14/870,744: Applicant Response to Pre-Exam Formalities Notice, filed Feb. 19, 2016, 2 pages.
U.S. Appl. No. 14/870,744: Filing Receipt, dated Mar. 2, 2016, 3 pages.
U.S. Appl. No. 14/870,744: Notice of Publication, dated Jun. 9, 2016, 1 page.
U.S. Appl. No. 14/870,744: Non-Final Rejection, dated Aug. 24, 2017, 11 pages.
U.S. Appl. No. 14/870,744: Amendment/Req. Reconsideration-After Non-Final Reject, dated Nov. 24, 2017, 30 pages.
U.S. Appl. No. 14/870,744: Final Rejection, dated Mar. 30, 2018, 20 pages.
U.S. Appl. No. 14/870,744: Response After Final Action, dated May 30, 2018, 33 pages.
U.S. Appl. No. 14/870,744: Advisory Action, dated Jul. 3, 2018, 5 pages.
U.S. Appl. No. 14/870,744: RCE and Amendments, dated Jul. 27, 2018, 33 pages.
U.S. Appl. No. 14/870,744: Notice of Allowance and Fees Due, dated Sep. 6, 2018, 11 pages.
U.S. Appl. No. 11/007,139: Application filed Dec. 7, 2004, 90 pages.
U.S. Appl. No. 11/007,139: Notice to File Missing Parts mailed Jan. 19, 2005, 2 pages.
U.S. Appl. No. 11/007,139: Response to Notice to File Missing Parts dated Apr. 1, 2005, 9 pages.
U.S. Appl. No. 11/007,139: Preliminary Amendment filed Apr. 28, 2005, 146 pages.
U.S. Appl. No. 11/007,139: Non-final Office Action dated May 14, 2007, 58 pages.
U.S. Appl. No. 11/007,139: Amendment filed Oct. 15, 2007, 32 pages.
U.S. Appl. No. 11/007,139: Supplemental Response filed Oct. 17, 2007, 7 pages.
U.S. Appl. No. 11/007,139: Non-final Office Action dated Jan. 2, 2008 with Examiner's search results, 21 pages.
U.S. Appl. No. 11/007,139: Amendment filed Apr. 2, 2008, 30 pages.
U.S. Appl. No. 11/007,139: Final Office Action dated Aug. 15, 2008, 30 pages.
U.S. Appl. No. 11/007,139: Amendment filed Oct. 15, 2008, 26 pages.
U.S. Appl. No. 11/007,139: Advisory Action dated Oct. 22, 2008, 26 pages.
U.S. Appl. No. 11/007,139: RCE with Amendment filed Nov. 14, 2008, 32 pages.
U.S. Appl. No. 11/007,139: Non-final Office Action dated Dec. 8, 2008, 24 pages.
U.S. Appl. No. 11/007,139: Amendment filed May 8, 2009, 31 pages.
U.S. Appl. No. 11/007,139: Final Office Action dated Aug. 4, 2009, 26 pages.
U.S. Appl. No. 11/007,139: Amendment filed Dec. 4, 2009, 28 pages.
U.S. Appl. No. 11/007,139: Advisory Action dated Dec. 14, 2009, 4 pages.
U.S. Appl. No. 11/007,139: RCE with amendment filed Jan. 4, 2010, 27 pages.
U.S. Appl. No. 11/007,139: Non-Final Office Action dated Jan. 27, 2010, 31 pages.
U.S. Appl. No. 11/007,139: Response to Non-Final Office Action filed Apr. 27, 2010, 30 pages.
U.S. Appl. No. 11/007,139: Office Action dated Jul. 20, 2010, 20 pages.
U.S. Appl. No. 11/007,139: Office Action response dated Oct. 20, 2010, 33 pages.
U.S. Appl. No. 11/007,139: Advisory Action dated Oct. 25, 2010, 2 pages.
U.S. Appl. No. 11/007,139: Office Action response dated Nov. 18, 2010, 24 pages.
U.S. Appl. No. 11/007,139: Advisory Action dated Dec. 1, 2010, 4 pages.
U.S. Appl. No. 11/007,139: Office Action response and Notice of Appeal dated Dec. 20, 2010, 29 pages.
U.S. Appl. No. 11/007,139: Office Action dated Jan. 3, 2011, 24 pages.
U.S. Appl. No. 11/007,139: Office Action response, dated May 3, 2011, 27 pages.
U.S. Appl. No. 11/007,139: Final Office Action, dated Jul. 18, 2011, 23 pages.

(56) References Cited

OTHER PUBLICATIONS

U.S. Appl. No. 11/007,139: Amendment after final dated Oct. 18, 2011, 30 pages.
U.S. Appl. No. 11/007,139: Advisory Action and rule 312 amendment, dated Nov. 4, 2011, 4 pages.
U.S. Appl. No. 11/007,139: Notice of Appeal filed Nov. 16, 2011, 1 page.
U.S. Appl. No. 11/007,139: Appeal Brief filed May 1, 2012, 93 pages.
U.S. Appl. No. 11/007,139: Notice of defective appeal brief, mailed May 7, 2012, 3 pages.
U.S. Appl. No. 11/007,139: Appeal Brief filed May 15, 2012, 9 pages.
U.S. Appl. No. 11/007,139: Examiner's answer to appeal brief, mailed Aug. 20, 2012, 35 pages.
U.S. Appl. No. 11/007,139: Reply Brief, mailed Oct. 22, 2012, 29 pages.
U.S. Appl. No. 11/007,139: Appeal Docketing Notice, mailed Nov. 6, 2012, 2 pages.
U.S. Appl. No. 11/007,139: Patent Board Decision, mailed Jul. 24, 2015, 8 pages.
U.S. Appl. No. 11/007,139: RCE, filed Sep. 18, 2015, 19 pages.
U.S. Appl. No. 11/007,139: Non-Final Rejection, dated Dec. 31, 2015, 10 pages.
U.S. Appl. No. 11/007,139: Amendment/Req. Reconsideration-After Non-Final Rejection, dated Mar. 28, 2016, 19 pages.
U.S. Appl. No. 11/007,139: Final Rejection, dated Jun. 20, 2016, 12 pages.
U.S. Appl. No. 11/007,139: Response After Final Action, dated Jul. 29, 2016, 17 pages.
U.S. Appl. No. 11/007,139: Notice of Allowance and Fees, dated Aug. 23, 2016, 10 pages.
U.S. Appl. No. 11/007,139: Filing Receipt, dated Sep. 2, 2016, 3 pages.
U.S. Appl. No. 11/007,139: RCE, filed Nov. 10, 2016, 3 pages.
U.S. Appl. No. 11/007,139: Notice of Allowance and Fees, dated Dec. 29, 2016, 8 pages.
U.S. Appl. No. 11/007,139: Issue Notification, dated Apr. 19, 2017, 1 page.
U.S. Appl. No. 15/043,267: Application as filed Feb. 12, 2016, 92 pages.
U.S. Appl. No. 15/043,267: Preliminary Amendment, dated Feb. 12, 2016, 7 pages.
U.S. Appl. No. 15/043,267: Filing Receipt, dated Mar. 7, 2016, 3 pages.
U.S. Appl. No. 15/043,267: Preliminary Amendment, dated Jun. 10, 2016, 9 pages.
U.S. Appl. No. 15/043,267: Filing Receipt, dated Oct. 25, 2016, 3 pages.
U.S. Appl. No. 15/043,267: Notice of Publication, dated Feb. 2, 2017, 1 page.
U.S. Appl. No. 11/006,320: Application filed Dec. 6, 2004, 75 pages.
U.S. Appl. No. 11/006,320: Response to Missing Parts and Preliminary Amendment filed May 9, 2005, 135 pages.
U.S. Appl. No. 11/006,320: Office Action—Restriction Requirement dated Mar. 26, 2007, 7 pages.
U.S. Appl. No. 11/006,320: Response to Restriction Requirement filed Apr. 27, 2007, 34 pages.
U.S. Appl. No. 11/006,320: Notice of Non-Compliant Amendment dated Jul. 6, 2007, 3 pages.
U.S. Appl. No. 11/006,320: Response to Non-Compliant Amendment filed Jul. 25, 2007, 33 pages.
U.S. Appl. No. 11/006,320: Non-final Office Action dated Oct. 1, 2007, 24 pages.
U.S. Appl. No. 11/006,320: Amendment filed Jan. 29, 2008, 45 pages.
U.S. Appl. No. 11/006,320: Notice of Non-Compliant Amendment dated Apr. 8, 2008, 4 pages.
U.S. Appl. No. 11/006,320: Amendment filed May 5, 2008, 44 pages.
U.S. Appl. No. 11/006,320: Non-final Office Action dated Aug. 15, 2008, 33 pages.
U.S. Appl. No. 11/006,320: Amendment filed Nov. 14, 2008, 40 pages.
U.S. Appl. No. 11/006,320: Office Action—Shortened Statutory Period dated Jan. 27, 2009, 2 pages.
U.S. Appl. No. 11/006,320: Amendment filed Apr. 27, 2009, 44 pages.
U.S. Appl. No. 11/006,320: Final Office Action dated Jul. 29, 2009, 13 pages.
U.S. Appl. No. 11/006,320: Amendment filed Nov. 30, 2009, 10 pages.
U.S. Appl. No. 11/006,320: Non-final Office Action dated Dec. 4, 2009, 25 pages.
U.S. Appl. No. 11/006,320: Response to Non-Final Office Action filed Feb. 23, 2010, 11 pages.
U.S. Appl. No. 11/006,320: Final Office Action dated May 24, 2010, 11 pages.
U.S. Appl. No. 11/006,320: Office Action response dated Aug. 24, 2010, 15 pages.
U.S. Appl. No. 11/006,320: Notice of Allowance dated Sep. 17, 2010, 8 pages.
U.S. Appl. No. 11/006,320: Examiner Interview Summary and supplemental Notice of Allowance dated Dec. 17, 2010, 9 pages.
U.S. Appl. No. 11/006,320: Rule 312 Amendment and Issue Fee payment dated Dec. 17, 2010, 10 pages.
U.S. Appl. No. 11/006,320: Issue Notification dated Jan. 12, 2011, 1 page.
U.S. Appl. No. 12/972,326: Application as filed Dec. 17, 2010, 74 pages.
U.S. Appl. No. 12/972,326: Filing receipt and Notice to File Missing Parts dated Jan. 6, 2011, 5 pages.
U.S. Appl. No. 12/972,326: Response to Notice to File Missing parts mailed Jan. 26, 2011, 14 pages.
U.S. Appl. No. 12/972,326: Filing Receipt, dated Feb. 18, 2011, 3 pages.
U.S. Appl. No. 12/972,326: Preliminary amendment dated May 20, 2011, 15 pages.
U.S. Appl. No. 12/972,326: Notice of publication and non-compliant amendment dated Jun. 2, 2011, 3 pages.
U.S. Appl. No. 12/972,326: Preliminary amendment dated Jul. 5, 2011, 21 pages.
U.S. Appl. No. 12/972,326: Notice of additional fee due, mailed Jul. 12, 2011, 2 pages.
U.S. Appl. No. 12/972,326: Preliminary Amendment dated Aug. 10, 2011, 7 pages.
U.S. Appl. No. 12/972,326: Non-Final Office Action, dated Feb. 23, 2012, 9 pages.
U.S. Appl. No. 12/972,326: Abandoment, mailed Sep. 18, 2012, 2 pages.
U.S. Appl. No. 13/014,677: Application as filed Jan. 26, 2011, 90 pages.
U.S. Appl. No. 13/014,677: Notice to file missing parts and filing receipt, dated Mar. 23, 2011, 5 pages.
U.S. Appl. No. 13/014,677: Notice of Abandonment mailed Nov. 29, 2011, 2 pages.
U.S. Appl. No. 11/006,848: Application as filed Dec. 7, 2004, 59 pages.
U.S. Appl. No. 11/006,848: Notice of File Missing Parts mailed Mar. 18, 2005, 2 pages.
U.S. Appl. No. 11/006,848: Response to Notice of File Missing Parts dated May 3, 2005, 101 pages.
U.S. Appl. No. 11/006,848: Non-Final Office Action dated Apr. 4, 2007, 11 pages.
U.S. Appl. No. 11/006,848: Response to Non-Final Office Action dated Oct. 3, 2007, 20 pages.
U.S. Appl. No. 11/006,848: Supplemental Amendment dated Nov. 13, 2017, 4 pages.
U.S. Appl. No. 11/006,848: Non-Final Office Action dated Feb. 5, 2008, 16 pages.

(56) References Cited

OTHER PUBLICATIONS

U.S. Appl. No. 11/006,848: Response to Non-Final Office Action filed Aug. 4, 2008, 27 pages.
U.S. Appl. No. 11/006,848: Final Office Action dated Dec. 2, 2008, 30 pages.
U.S. Appl. No. 11/006,848: RCE filed May 4, 2009, 24 pages.
U.S. Appl. No. 11/006,848: Notice of Allowance dated Jun. 11, 2009, 8 pages.
U.S. Appl. No. 11/006,848: Issue fee mailed Sep. 11, 2009, 10 pages.
U.S. Appl. No. 11/006,848: Issue Notification mailed Oct. 28, 2009, 1 page.
U.S. Appl. No. 12/573,829: Application as filed Oct. 5, 2009, 64 pages.
U.S. Appl. No. 12/573,829: Notice to File Missing Parts and Filing Receipt dated Oct. 20, 2009, 5 pages.
U.S. Appl. No. 12/573,829: Preliminary Amendment dated Dec. 21, 2019, 17 pages.
U.S. Appl. No. 12/573,829: Filing receipt dated Jan. 4, 2010, 5 pages.
U.S. Appl. No. 12/573,829: Notice of Publication dated Apr. 15, 2010, 1 page.
U.S. Appl. No. 12/573,829: Office Action dated Jun. 28, 2010, 35 pages.
U.S. Appl. No. 12/573,829: Office Action Response dated Sep. 28, 2010, 22 pages.
U.S. Appl. No. 12/573,829: Office Action dated Nov. 1, 2010, 29 pages.
U.S. Appl. No. 12/573,829: Office Action Response dated Jan. 3, 2011, 29 pages.
U.S. Appl. No. 12/573,829: Advisory Action dated Jan. 7, 2011, 3 pages.
U.S. Appl. No. 12/573,829: Notice of Appeal mailed Jan. 11, 2011, 1 page.
U.S. Appl. No. 12/573,829: Appeal Brief, mailed May 4, 2011, 68 pages.
U.S. Appl. No. 12/573,829: Examiner's Answer to Appeal Brief, mailed Jul. 21, 2011, 31 pages.
U.S. Appl. No. 12/573,829: Reply brief filed Sep. 21, 2011, 17 pages.
U.S. Appl. No. 12/573,829: Reply brief noted Oct. 5, 2011, 2 pages.
U.S. Appl. No. 12/573,829: Appeal Docketing notice filed Oct. 11, 2011, 2 pages.
U.S. Appl. No. 12/573,829: Appeal Board Decision, mailed May 9, 2014, 10 pages.
U.S. Appl. No. 12/573,829: Request for continued examination, mailed Jul. 9, 2014, 19 pages.
U.S. Appl. No. 12/573,829: Non-Final Rejection and Examiner's Search, dated Apr. 28, 2015, 22 pages.
U.S. Appl. No. 12/573,829: Amendment/Req. Reconsideration After Non-Final Rejection, filed Jul. 27, 2015, 21 pages.
U.S. Appl. No. 12/573,829: Final Rejection and Examiner search, dated Sep. 15, 2015, 17 pages.
U.S. Appl. No. 12/573,829: Response After Final Action, dated Nov. 16, 2015, 17 pages.
U.S. Appl. No. 12/573,829: Advisory Action, dated Dec. 2, 2015, 4 pages.
U.S. Appl. No. 12/573,829: Request for Continued Examination and Amendments, dated Dec. 14, 2015, 17 pages.
U.S. Appl. No. 12/573,829: Non-Final Rejection, dated Jun. 13, 2016, 18 pages.
U.S. Appl. No. 12/573,829: Amendment/Req. Reconsideration-After Non-Final Reject, dated Sep. 13, 2016, 24 pages.
U.S. Appl. No. 12/573,829: Filing Receipt, dated Sep. 15, 2016, 3 pages.
U.S. Appl. No. 12/573,829: Non-Final Rejection, dated Dec. 16, 2016, 10 pages.
U.S. Appl. No. 12/573,829: Amendment/Req. Reconsideration-After Non-Final Reject, dated Mar. 16, 2017, 18 pages.

U.S. Appl. No. 12/573,829: Final Rejection, dated May 2, 2017, 20 pages.
U.S. Appl. No. 12/573,829: After Final Consideration Program Request, Jul. 5, 2017, 13 pages.
U.S. Appl. No. 12/573,829: Advisory Action/After Final Consideration Program Decision, dated Aug. 29, 2017, 5 pages.
U.S. Appl. No. 12/573,829: RCE and Amendments, dated Sep. 5, 2017, 24 pages.
U.S. Appl. No. 12/573,829: Non-Final Rejection, dated Dec. 27, 2017, 13 pages.
U.S. Appl. No. 12/573,829: Amendment/Req. Reconsideration—After Non-Final Reject, dated Mar. 27, 2018, 22 pages.
U.S. Appl. No. 12/573,829: Final Rejection, dated Jul. 11, 2018, 15 pages.
U.S. Appl. No. 12/573,829: After Final Consideration Program Request, filed Sep. 7, 2018, 23 pages.
U.S. Appl. No. 12/573,829: Advisory Action, dated Sep. 24, 2018, 4 pages.
U.S. Appl. No. 12/573,829: RCE and Amendments, dated Oct. 9, 2018, 20 pages.
U.S. Appl. No. 11/006,841: Application as filed Dec. 7, 2004, 63 pages.
U.S. Appl. No. 11/006,841: Notice to file missing parts mailed Jan. 10, 2005, 2 pages.
U.S. Appl. No. 11/006,841: Response to Notice to file missing parts and preliminary amendment dated Apr. 14, 2005, 105 pages.
U.S. Appl. No. 11/006,841: Non-Final OA dated Apr. 6, 2007, 16 pages.
U.S. Appl. No. 11/006,841: Response to Non-Final OA dated Sep. 6, 2007, 63 pages.
U.S. Appl. No. 11/006,841: Restriction Requirement dated Nov. 27, 2007, 5 pages.
U.S. Appl. No. 11/006,841: Restriction Requirement response dated Dec. 27, 2007, 36 pages.
U.S. Appl. No. 11/006,841: Restriction Requirement dated Mar. 17, 2008, 9 pages.
U.S. Appl. No. 11/006,841: Response to Restriction Requirement dated Jul. 17, 2008, 33 pages.
U.S. Appl. No. 11/006,841: Final Office Action dated Oct. 29, 2008, 54 pages.
U.S. Appl. No. 11/006,841: Response to Final Office Action dated Dec. 29, 2008, 45 pages.
U.S. Appl. No. 11/006,841: Advisory Action dated Jan. 6, 2009, 3 pages.
U.S. Appl. No. 11/006,841: RCE mailed Apr. 23, 2009, 48 pages.
U.S. Appl. No. 11/006,841: Supplemental Response dated Jun. 26, 2009, 34 pages.
U.S. Appl. No. 11/006,841: Notice of Allowance dated Jun. 29, 2009, 40 pages.
U.S. Appl. No. 11/006,841: Issue Fee mailed Sep. 29, 2009, 4 pages.
U.S. Appl. No. 11/006,841: Issue Notification dated Nov. 11, 2009, 1 page.
U.S. Appl. No. 12/578,411: Continuation application filed Oct. 13, 2009, 75 pages.
U.S. Appl. No. 12/578,411: Notice of Missing Parts dated Oct. 28, 2009, 6 pages.
U.S. Appl. No. 12/578,411: Response to Missing Parts filed Dec. 28, 2009, 25 pages.
U.S. Appl. No. 12/578,411: Filing Receipt dated Jan. 7, 2010, 3 pages.
U.S. Appl. No. 12/578,411: Notice of Publication dated Apr. 15, 2010, 1 page.
U.S. Appl. No. 12/578,411: Restriction requirement dated Jun. 8, 2011, 6 pages.
U.S. Appl. No. 12/578,411: Response to restriction requirement daetd Jul. 6, 2011, 19 pages.
U.S. Appl. No. 12/578,411: Non-Final Office Action, dated Aug. 23, 2011, 19 pages.
U.S. Appl. No. 12/578,411: Non-Final Office Action response dated Dec. 22, 2011, 38 pages.
U.S. Appl. No. 12/578,411: Final Rejection dated Jan. 20, 2012, 16 pages.

(56) References Cited

OTHER PUBLICATIONS

U.S. Appl. No. 12/578,411: Amendment, dated May 21, 2012, 23 pages.
U.S. Appl. No. 12/578,411: Advisory Action, dated May 31, 2012, 4 pages.
U.S. Appl. No. 12/578,411: RCE, mailed Jun. 12, 2012, 38 pages.
U.S. Appl. No. 12/578,411: Notice of Allowance, dated Aug. 19, 2013, 19 pages.
U.S. Appl. No. 12/578,411: Issue fee payment and Rule 312 amendment, dated Nov. 14, 2013, 14 pages.
U.S. Appl. No. 12/578,411: Examiner response to rule 312 amendment, dated Nov. 19, 2013, 2 pages.
U.S. Appl. No. 12/578,411: Response to Amendment under rule 312, dated Dec. 3, 2013, 3 pages.
U.S. Appl. No. 12/578,411: Issue Notification, dated Dec. 18, 2013, 1 page.
U.S. Appl. No. 14/086,837: Application as filed Nov. 21, 2013, 68 Pages.
U.S. Appl. No. 14/086,837: Notice to File Missing Parts, Mailed Dec. 12, 2013, 5 Pages.
U.S. Appl. No. 14/086,837: Applicant Response to Pre-Exam Formalities Notice, dated Jun. 11, 2014, 26 Pages.
U.S. Appl. No. 14/086,837: Notice of Publication, dated Sep. 25, 2014, 4 Pages.
U.S. Appl. No. 14/086,837: Terminal Disclaimer, filed Nov. 14, 2014, 1 page.
U.S. Appl. No. 14/086,837: Examiner's search strategy and results, dated Dec. 2, 2014, 9 pages.
U.S. Appl. No. 14/086,837: Notice of Allowance and Fees, dated Dec. 2, 2014, 17 pages.
U.S. Appl. No. 14/086,837: Amendment After Notice of Allowance, filed Feb. 27, 2015, 9 pages.
U.S. Appl. No. 14/086,837: Issue Fee Payment, filed Feb. 27, 2015, 1 page.
U.S. Appl. No. 14/086,837: Issue Notification, dated May 6, 2015, 1 page.
U.S. Appl. No. 14/635,836: Application as filed Mar. 2, 2015, 70 pages.
U.S. Appl. No. 14/635,836: Filing Receipt, dated Mar. 12, 2015, 3 pages.
U.S. Appl. No. 14/635,836: Notice to File Missing Parts, mailed Mar. 12, 2015, 2 pages.
U.S. Appl. No. 14/635,836: Applicant Response to Pre-Exam Formalities Notice, filed May 12, 2015, 40 pages.
U.S. Appl. No. 14/635,836: Filing Receipt, dated May 19, 2015, 3 pages.
U.S. Appl. No. 14/635,836: Notice of Publication, dated Aug. 27, 2015, 1 page.
U.S. Appl. No. 14/635,836: Electronic Terminal Disclaimer Approved and filed, Nov. 13, 2015, 3 pages.
U.S. Appl. No. 14/635,836: Notice of Allowance and Fees Due, dated Apr. 18, 2016, 25 pages.
U.S. Appl. No. 14/635,836: Issue Fee Payment and Amendment after NOA, dated Jul. 15, 2016, 15 pages.
U.S. Appl. No. 14/635,836: Response to Amendment under Rule 312, dated Jul. 21, 2016, 1 page.
U.S. Appl. No. 14/635,836: Response to Amendment under Rule 312, dated Jul. 22, 2016, 2 page.
U.S. Appl. No. 14/635,836: Issue Notification, dated Aug. 10, 2016, 1 page.
U.S. Appl. No. 15/250,118: Application as filed Aug. 29, 2016, 71 pages.
U.S. Appl. No. 15/250,118: Preliminary Amendment, dated Aug. 29, 2016, 20 pages.
U.S. Appl. No. 15/250,118: Filing Receipt, dated Sep. 9, 2016, 3 pages.
U.S. Appl. No. 15/250,118: Applicant Response to Pre-Exam Formalities Notice, filed Nov. 8, 2016, 21 pages.
U.S. Appl. No. 15/250,118: Filing Receipt, dated Nov. 15, 2016, 3 pages.
U.S. Appl. No. 15/250,118: Notice of Publication, dated Feb. 23, 2017, 1 page.
U.S. Appl. No. 15/250,118: Non-Final Rejection, dated Jun. 15, 2017, 22 pages.
U.S. Appl. No. 15/250,118: Amendment/Req. Reconsideration-After Non-Final Reject, dated Sep. 14, 2017, 44 pages.
U.S. Appl. No. 15/250,118: Final Rejection, dated Dec. 15, 2017, 25 pages.
U.S. Appl. No. 15/250,118: RCE and Amendments, dated Apr. 16, 2018, 44 pages.
U.S. Appl. No. 11/006,440: Application as filed Dec. 6, 2004, 85 pages.
U.S. Appl. No. 11/006,440: Notice to file missing parts dated Jan. 11, 2005, 2 pages.
U.S. Appl. No. 11/006,440: Response to Notice to file missing parts mailed Mar. 15, 2005, 8 pages.
U.S. Appl. No. 11/006,440: Preliminary Amendment dated Apr. 28, 2005, 140 pages.
U.S. Appl. No. 11/006,440: Preliminary Amendment and Substitute Specification dated Oct. 10, 2006, 139 pages.
U.S. Appl. No. 11/006,440: Restriction Requirement dated Mar. 29, 2007, 5 pages.
U.S. Appl. No. 11/006,440: Response to Restriction Requirement dated Apr. 30, 2007, 42 pages.
U.S. Appl. No. 11/006,440: Non-Final Office Action dated Jun. 21, 2007, 15 pages.
U.S. Appl. No. 11/006,440: Response to Non-Final Office Action dated Nov. 20, 2007, 42 pages.
U.S. Appl. No. 11/006,440: Final Office Action dated Feb. 6, 2008, 13 pages.
U.S. Appl. No. 11/006,440: Response to Final Office Action dated Apr. 7, 2008, 34 pages.
U.S. Appl. No. 11/006,440: Advisory Action dated May 9, 2008, 3 pages.
U.S. Appl. No. 11/006,440: Notice of appeal mailed Aug. 4, 2008, 1 page.
U.S. Appl. No. 11/006,440: RCE mailed Nov. 4, 2008, 39 pages.
U.S. Appl. No. 11/006,440: Final Office Action dated Jan. 23, 2009, 22 pages.
U.S. Appl. No. 11/006,440: Amendment after Final dated Apr. 23, 2009, 34 pages.
U.S. Appl. No. 11/006,440: Supplemental Amendment dated Jul. 17, 2009, 29 pages.
U.S. Appl. No. 11/006,440: Notice of Allowance dated Jul. 31, 2009, 15 pages.
U.S. Appl. No. 11/006,440: Examiner's Amendment and Reasons for Allowance dated Sep. 3, 2009, 9 pages.
U.S. Appl. No. 11/006,440: Issue Fee mailed Nov. 2, 2009, 12 pages.
U.S. Appl. No. 11/006,440: Issue Notification dated Dec. 2, 2009, 1 page.
U.S. Appl. No. 12/627,816: Continuation application filed Nov. 30, 2009, 95 pages.
U.S. Appl. No. 12/627,816: Notice of Missing Parts mailed Dec. 15, 2009, 2 pages.
U.S. Appl. No. 12/627,816: Response to Missing Parts filed Apr. 12, 2010, 21 pages.
U.S. Appl. No. 12/627, 816: Filing Receipt dated Apr. 20, 2010, 3 pages.
U.S. Appl. No. 12/627,816: Notice of Publication dated Jul. 29, 2010, 1 page.
U.S. Appl. No. 12/627,816: Non-Final OA, dated May 5, 2011, 19 pages.
U.S. Appl. No. 12/627,816: Non-Final OA response, dated Nov. 7, 2011, 12 pages.
U.S. Appl. No. 12/627,816: Final Rejection dated Nov. 17, 2011, 18 pages.
U.S. Appl. No. 12/627,816: RCE mailed Feb. 17, 2012, 20 pages.
U.S. Appl. No. 12/627,816: Terminal disclaimer review, mailed Mar. 7, 2012, 1 page.
U.S. Appl. No. 12/627,816: Notice of Allowance, dated Aug. 1, 2013, 16 pages.

(56) References Cited

OTHER PUBLICATIONS

U.S. Appl. No. 12/627,816: Issue fee payment and Rule 312 amendment, dated Nov. 1, 2013, 14 pages.
U.S. Appl. No. 12/627,816: Examiner response to rule 312 amendment, dated Nov. 13, 2013, 2 pages.
U.S. Appl. No. 12/627,816: Issue Notification, dated Nov. 26, 2013, 1 page.
U.S. Appl. No. 14/086,808: Application as filed Nov. 21, 2013, 87 Pages.
U.S. Appl. No. 14/086,808: Notice to File Missing Parts and Filing Receipt, dated Dec. 11, 2013, 5 Pages.
U.S. Appl. No. 14/086,808: Applicant Response to Pre-Exam Formalities Notice, dated Jun. 11, 2014, 53 Pages.
U.S. Appl. No. 14/086,808: Filing receipt, dated Jun. 17, 2014, 3 Pages.
U.S. Appl. No. 14/086,808: Notice of Publication, dated Sep. 25, 2014, 1 Page.
U.S. Appl. No. 14/086,808: Terminal Disclaimer, filed Oct. 24, 2014, 2 pages.
U.S. Appl. No. 14/086,808: Terminal Disclaimer Review Decision, mailed Oct. 29, 2014, 1 page.
U.S. Appl. No. 14/086,808: Terminal Disclaimer, filed Nov. 4, 2014.
U.S. Appl. No. 14/086,808: Terminal Disclaimer Review Decision, Mailed Nov. 13, 2014, 1 page.
U.S. Appl. No. 14/086,808: Examiner's search strategy and results, dated Nov. 17, 2014, 5 pages.
U.S. Appl. No. 14/086,808: Notice of Allowance and fees, dated Nov. 17, 2014, 16 pages.
U.S. Appl. No. 14/086,808: Issue Fee Payment and Rule 312 amendment, filed Feb. 17, 2015, 1 page.
U.S. Appl. No. 14/086,808: Amendment After Notice of Allowance, dated Feb. 17, 2015, 17 pages.
U.S. Appl. No. 14/086,808: Response to Amendment under Rule 312, dated Feb. 20, 2015, 2 pages.
U.S. Appl. No. 14/086,808: Response to Amendment under Rule 312, dated Feb. 25, 2015, 3 pages.
U.S. Appl. No. 14/086,808: Issue Notification, dated Mar. 18, 2015, 1 page.
U.S. Appl. No. 14/625,473: Application as filed Feb. 18, 2015, 92 pages.
U.S. Appl. No. 14/625,473: Filing Receipt, dated Mar. 18, 2015, 3 pages.
U.S. Appl. No. 14/625,473: Notice to File Missing Parts, mailed Mar. 18, 2015.
U.S. Appl. No. 14/625,473: Response to Pre-Exam Formalities Notice and Preliminary Amendment, filed May 18, 2015, 28 pages.
U.S. Appl. No. 14/625,473: Filing Receipt, dated May 20, 2015, 3 pages.
U.S. Appl. No. 14/625,473: Notice of Publication, dated Aug. 27, 2015, 1 page.
U.S. Appl. No. 14/625,473: Electronic Terminal Disclaimer Filed and Approved, filed Nov. 13, 2015, 3 pages.
U.S. Appl. No. 14/625,473: Notice of Allowance, dated Mar. 28, 2016, 19 pages.
U.S. Appl. No. 14/625,473: Issue Fee Payment and Amendments after Notice of Allowance, dated Jun. 28, 2016, 24 pages.
U.S. Appl. No. 14/625,473: Response to Amendment under Rule 312, dated Jun. 30, 2016, 1 page.
U.S. Appl. No. 14/625,473: Issue Notification, dated Jul. 20, 2016, 1 page.
U.S. Appl. No. 15/214,168: Application as filed with preliminary amendments, dated Jul. 19, 2016, 116 pages.
U.S. Appl. No. 15/214,168: Filing Receipt, dated Aug. 3, 2016, 4 pages.
U.S. Appl. No. 15/214,168: Corrected Filing Receipt, dated Oct. 12, 2016, 4 pages.
U.S. Appl. No. 15/214,168: Notice of Publication, dated Nov. 10, 2016, 1 page.
U.S. Appl. No. 15/214,168: Non-Final Rejection, dated Mar. 2, 2017, 20 pages.
U.S. Appl. No. 15/214,168: Amendment/Req. Reconsideration-After Non-Final Reject, dated Jun. 2, 2017, 39 pages.
U.S. Appl. No. 15/214,168: Terminal Disclaimer, filed Jul. 17, 2017, 4 pages.
U.S. Appl. No. 15/214,168: Notice of Allowance and Fees Due, dated Aug. 1, 2017, 26 pages.
U.S. Appl. No. 15/214,168: Amendment after Notice of Allowance, dated Nov. 1, 2017, 22 pages.
U.S. Appl. No. 15/214,168: Issue Notification, dated Nov. 21, 2017, 1 page.
U.S. Appl. No. 15/802,348: Application as filed with Preliminary Amendment, dated Nov. 2, 2017, 126 pages.
U.S. Appl. No. 15/802,348: Filing Receipt, dated Nov. 30, 2017, 4 pages.
U.S. Appl. No. 15/802,348: Notice to File Corrected Application Papers, filed Nov. 30, 2017, 2 pages.
U.S. Appl. No. 15/802,348: Applicant Response to Pre-Exam Formalities Notice, dated Jan. 9, 2018, 17 pages.
U.S. Appl. No. 15/802,348: Filing Receipt, dated Jan. 11, 2018, 4 pages.
U.S. Appl. No. 15/802,348: Notice of Publication, dated Apr. 19, 2018, 1 page.
U.S. Appl. No. 15/802,348: Preliminary Amendment, dated Oct. 26, 2018, 24 pages.
U.S. Appl. No. 11/006,446: Application filed Dec. 6, 2004, 91 pages.
U.S. Appl. No. 11/006,446: Notice of Missing Parts dated Jan. 24, 2005, 3 pages.
U.S. Appl. No. 11/006,446: Response to Notice to File Missing Parts dated Mar. 29, 2005, 8 pages.
U.S. Appl. No. 11/006,446: Preliminary Amendment filed Apr. 28, 2005, 118 pages.
U.S. Appl. No. 11/006,446: Office Action—Restriction Requirement dated Apr. 4, 2007, 5 pages.
U.S. Appl. No. 11/006,446: Response to Office Action—Restriction Requirement filed May 3, 2007, 6 pages.
U.S. Appl. No. 11/006,446: Non-final Office Action dated Jul. 26, 2007, 45 pages.
U.S. Appl. No. 11/006,446: Amendment filed Nov. 26, 2007, 38 pages.
U.S. Appl. No. 11/006,446: Non-final Office Action dated Feb. 20, 2008, 67 pages.
U.S. Appl. No. 11/006,446: Amendment filed Jul. 21, 2008, 33 pages.
U.S. Appl. No. 11/006,446: Final Office Action dated Oct. 28, 2008, 49 pages.
U.S. Appl. No. 11/006,446: Amendment filed Dec. 29, 2008, 33 pages.
U.S. Appl. No. 11/006,446: Advisory Action dated Jan. 7, 2009, 4 pages.
U.S. Appl. No. 11/006,446: RCE with Amendment filed Apr. 28, 2009, 38 pages.
U.S. Appl. No. 11/006,446: Non-final Office Action dated Jul. 7, 2009, 41 pages.
U.S. Appl. No. 11/006,446: Examiner Interview Summary and Search Results dated Oct. 26, 2009, 6 pages.
U.S. Appl. No. 11/006,446: Amendment dated Dec. 7, 2009, 33 pages.
U.S. Appl. No. 11/006,446: Examiner Interview Summary dated Mar. 19, 2010, 4 pages.
U.S. Appl. No. 11/006,446: Notice of Allowance/Allowability dated Mar. 19, 2010, 29 pages.
U.S. Appl. No. 11/006,446: Issue Fee Payment and 312 Amendment filed Jun. 21, 2010, 23 pages.
U.S. Appl. No. 11/006,446: Rule 312 Amendment dated Aug. 19, 2010, 2 pages.
U.S. Appl. No. 11/006,446: Formal drawings mailed Aug. 25, 2010, 29 pages.
U.S. Appl. No. 11/006,446: Issue Notification dated Sep. 1, 2010, 1 page.
U.S. Appl. No. 12/830,236: Divisional Application filed Jul. 2, 2010, 103 pages.

(56) References Cited

OTHER PUBLICATIONS

U.S. Appl. No. 12/830,236: Notice to File Corrected Application Papers mailed Jul. 16, 2010, 5 pages.
U.S. Appl. No. 12/830,236: Response to Notice to File Corrected Application Papers dated Aug. 25, 2010, 32 pages.
U.S. Appl. No. 12/830,236: Filing receipt dated Sep. 3, 2010, 3 pages.
U.S. Appl. No. 12/830,236: Notice of Publication dated Dec. 16, 2010, 1 page.
U.S. Appl. No. 12/830,236: Restriction requirement dated Mar. 18, 2011, 6 pages.
U.S. Appl. No. 12/830,236: Restriction requirement response, dated Apr. 18, 2011, 5 pages.
U.S. Appl. No. 12/830,236: Non-Final Office Action, dated May 11, 2011, 10 pages.
U.S. Appl. No. 12/830,236: Response to Non-Final Office Action dated Jul. 6, 2011, 18 pages.
U.S. Appl. No. 12/830,236: Final Office Action, dated Oct. 14, 2011, 18 pages.
U.S. Appl. No. 12/830,236: Amendment after final, filed Jan. 17, 2012, 26 pages.
U.S. Appl. No. 12/830,236: Advisory Action, dated Feb. 8, 2012, 6 pages.
U.S. Appl. No. 12/830,236: Notice of Appeal filed Mar. 8, 2012, 3 pages.
U.S. Appl. No. 12/830,236: RCE, filed Jun. 5, 2012, 23 pages.
U.S. Appl. No. 12/830,236: Non-Final Office Action, dated Jul. 31, 2012, 18 pages.
U.S. Appl. No. 12/830,236: Amendement, filed Nov. 1, 2012, 27 pages.
U.S. Appl. No. 12/830,236: Final Office Action, dated Feb. 27, 2013, 35 pages.
U.S. Appl. No. 12/830,236: Response after final, dated Jun. 27, 2013, 36 pages.
U.S. Appl. No. 12/830,236: Advisory Action, dated Jul. 12, 2013, 4 pages.
U.S. Appl. No. 12/830,236: Notice of appeal, filed Jul. 19, 2013, 2 pages.
U.S. Appl. No. 12/830,236: Appeal brief, filed Sep. 18, 2013, 44 pages.
U.S. Appl. No. 12/830,236: Examiners answer to appeal brief, mailed Dec. 18, 2013, 35 pages.
U.S. Appl. No. 12/830,236: Reply Brief as filed Feb. 18, 2014, 16 Pages.
U.S. Appl. No. 12/830,236: Appeal Docketing Notice, Mailed Mar. 12, 2014, 2 Pages.
U.S. Appl. No. 12/830,236: Patent Board Decision, filed Mar. 9, 2016, 6 pages.
U.S. Appl. No. 12/830,236: RCE and Amendments, dated Apr. 27, 2016, 15 pages.
U.S. Appl. No. 12/830,236: Non-Final Rejection and Examiner Search, dated Jun. 29, 2016, 75 pages.
U.S. Appl. No. 12/830,236: Amendment/Req. Reconsideration-After Non-Final Reject, dated Sep. 6, 2016, 12 pages.
U.S. Appl. No. 12/830,236: Final Rejection, dated Dec. 14, 2016, 22 pages.
U.S. Appl. No. 12/830,236: Response After Final Action, dated Feb. 13, 2017, 14 pages.
U.S. Appl. No. 12/830,236: Advisory Action, dated Mar. 3, 2017, 2 pages.
U.S. Appl. No. 12/830,236: RCE and Amendments, dated Apr. 14, 2017, 17 pages.
U.S. Appl. No. 12/830,236: Non-Final Rejection, dated Jun. 21, 2017, 30 pages.
U.S. Appl. No. 12/830,236: Amendment/Req. Reconsideration-After Non-Final Reject, dated Oct. 23, 2017, 18 pages.
U.S. Appl. No. 12/830,236: Non-Final Rejection, dated Feb. 6, 2018, 28 pages.
U.S. Appl. No. 12/830,236: Amendment/Req. Reconsideration-After Non-Final Reject, dated May 4, 2018, 26 pages.
U.S. Appl. No. 12/830,236: Final Rejection, dated Sep. 5, 2018, 30 pages.
U.S. Appl. No. 12/830,236: After Final Consideration Program Request, filed Nov. 5, 2018, 24 pages.
U.S. Appl. No. 11/385,257: Application filed Mar. 20, 2006, 118 pages.
U.S. Appl. No. 11/385,257: Notice of Missing Parts mailed May 3, 2006, 2 pages.
U.S. Appl. No. 11/385,257: Response to Missing Parts filed Aug. 3, 2006, 46 pages.
U.S. Appl. No. 11/385,257: Notice of Publication dated Nov. 30, 2006, 1 page.
U.S. Appl. No. 11/385,257: Non-final Office Action dated Apr. 29, 2008, 44 pages.
U.S. Appl. No. 11/385,257: Amendment filed Jul. 29, 2008, 29 pages.
U.S. Appl. No. 11/385,257: Final Office Action dated Dec. 9, 2008, 47 pages.
U.S. Appl. No. 11/385,257: RCE with Amendment filed May 11, 2009, 38 pages.
U.S. Appl. No. 11/385,257: Supplemental Amendment filed May 26, 2009, 32 pages.
U.S. Appl. No. 11/385,257: Notice of Non-Compliant Amendment dated Jun. 1, 2009, 3 pages.
U.S. Appl. No. 11/385,257: Amendment filed Jun. 30, 2009, 34 pages.
U.S. Appl. No. 11/385,257: Non-final Office Action dated Sep. 14, 2009, 60 pages.
U.S. Appl. No. 11/385,257: Response to Non-Final Office Action filed Jan. 13, 2010, 34 pages.
U.S. Appl. No. 11/385,257: Final Office Action dated Apr. 12, 2010, 47 pages.
U.S. Appl. No. 11/385,257: RCE mailed Aug. 12, 2010, 35 pages.
U.S. Appl. No. 11/385,257: Office Action dated Sep. 30, 2010, 39 pages.
U.S. Appl. No. 11/385,257: Office Action response, dated Mar. 29, 2011, 31 pages.
U.S. Appl. No. 11/385,257: Final Rejection dated Jun. 1, 2011, 40 pages.
U.S. Appl. No. 11/385,257: Request for continued Examination dated Nov. 1, 2011, 30 pages.
U.S. Appl. No. 11/385,257: Non-Final Office Action, dated Jan. 9, 2012, 40 pages.
U.S. Appl. No. 11/385,257: Amendment, dated Apr. 6, 2012, 30 pages.
U.S. Appl. No. 11/385,257: Notice of allowance and Examiner interview summary, dated Jun. 22, 2012, 36 pages.
U.S. Appl. No. 11/385,257: Office communication concerning previous IDS filing, dated Oct. 4, 2012, 4 pages.
U.S. Appl. No. 11/385,257: Miscellaneous Communication to Applicant, mailed Oct. 15, 2012, 3 pages.
U.S. Appl. No. 11/385,257: Rule 312 Amendment, dated Dec. 12, 2012, 10 pages.
U.S. Appl. No. 11/385,257: Issue Notification, dated Dec. 22, 2012, 1 page.
U.S. Appl. No. 13/625,812: Application as filed Sep. 24, 2012, 123 pages.
U.S. Appl. No. 13/625,812: Notice to file missing parts, mailed Oct. 15, 2012, 6 pages.
U.S. Appl. No. 13/625,812: Response to Notice to filed missing parts and preliminary amendment, dated Mar. 8, 2013, 47 pages.
U.S. Appl. No. 13/625,812: Notice of incomplete reply, dated Mar. 15, 2013, 3 pages.
U.S. Appl. No. 13/625,812: Response to incomplete reply notice, dated Apr. 2, 2013, 5 pages.
U.S. Appl. No. 13/625,812: Non-Final office action, dated Jul. 26, 2013, 29 pages.
U.S. Appl. No. 13/625,812: Publication notice, dated Aug. 1, 2013, 1 page.
U.S. Appl. No. 13/625,812: Response to non-final office action, dated Oct. 9, 2013, 15 pages.
U.S. Appl. No. 13/625,812: Final rejection, dated Dec. 3, 2018, 28 pages.

(56) References Cited

OTHER PUBLICATIONS

U.S. Appl. No. 13/625,812: Response After Final Action, dated Apr. 1, 2014, 1 Page.
U.S. Appl. No. 13/625,812: Advisory Action (PTOL-303), dated Apr. 9, 2014, 3 Pages.
U.S. Appl. No. 13/625,812: Notice of Appeal, filed May 5, 2014, 1 Page.
U.S. Appl. No. 13/625,812: Request for Continued Examination, dated Aug. 4, 2014, 18 Pages.
U.S. Appl. No. 13/625,812: Request for Corrected Filing Receipt, dated Aug. 21, 2014, 6 Pages.
U.S. Appl. No. 13/625,812: Filing Receipt, dated Aug. 27, 2014, 3 Pages.
U.S. Appl. No. 13/625,812: Notice of Allowance and Fees, dated Dec. 9, 2014, 20 pages.
U.S. Appl. No. 13/625,812: Filing Receipt, dated Feb. 2, 2015, 3 pages.
U.S. Appl. No. 13/625,812: Filing Receipt, dated Feb. 6, 2015, 3 pages.
U.S. Appl. No. 13/625,812: Terminal Disclaimer filed Mar. 2, 2015, 1 page.
U.S. Appl. No. 13/625,812: Post Allowance Arguments/Amendments, filed Mar. 6, 2015, 6 pages.
U.S. Appl. No. 13/625,812: Amendment After Notice of Allowance, filed Mar. 9, 2015, 3 pages.
U.S. Appl. No. 13/625,812: Issue Fee Payment, filed Mar. 9, 2015, 1 page.
U.S. Appl. No. 13/625,812: Terminal Disclaimer Review Decision, mailed Mar. 12, 2015.
U.S. Appl. No. 14/641,735: Application as filed Mar. 9, 2015, 126 pages.
U.S. Appl. No. 14/641,735: Filing Receipt, dated Mar. 20, 2015, 3 pages.
U.S. Appl. No. 14/641,735: Notice to File Missing Parts, mailed Mar. 20, 2015, 2 pages.
U.S. Appl. No. 14/641,735: Notice of Incomplete Reply, dated Jun. 26, 2015, 2 pages.
U.S. Appl. No. 14/641,735: Applicant Response to Pre-Exam Formalities Notice and Amendments, filed Jul. 8, 2015, 32 pages.
U.S. Appl. No. 14/641,735: Electronic Terminal Disclaimer, filed Aug. 27, 2015, 3 pages.
U.S. Appl. No. 14/641,735: Notice of Publication, dated Oct. 29, 2015, 1 page.
U.S. Appl. No. 14/641,735: Preliminary Amendment, dated Jan. 14, 2016, 8 pages.
U.S. Appl. No. 14/641,735: Non-Final Rejection, dated Jul. 14, 2017, 14 pages.
U.S. Appl. No. 14/641,735: Letter Restarting Period for Response, filed Aug. 24, 2017, 22 pages.
U.S. Appl. No. 14/641,735: Amendment/Req. Reconsideration-After Non-Final Reject, dated Nov. 24, 2017, 28 pages.
U.S. Appl. No. 14/641,735: Final Rejection, dated Mar. 15, 2018, 25 pages.
U.S. Appl. No. 14/641,735: Response After Final Action, dated May 15, 2018, 28 pages.
U.S. Appl. No. 14/641,735: Advisory Action, dated Jun. 8, 2018, 4 pages.
U.S. Appl. No. 14/641,735: Internet Communications Authorized, filed Jun. 23, 2018, 2 pages.
U.S. Appl. No. 14/641,735: RCE and Amendments, dated Jul. 16, 2018, 34 pages.
U.S. Appl. No. 14/641,735: Preliminary Amendment, dated Oct. 26, 2018, 10 pages.
U.S. Appl. No. 14/641,735: Non-Final Rejection, dated Nov. 2, 2018, 28 pages.
U.S. Appl. No. 11/319,758: Application filed Dec. 27, 2005, 79 pages.
U.S. Appl. No. 11/319,758: Notice of Missing Parts mailed Feb. 1, 2006, 2 pages.
U.S. Appl. No. 11/319,758: Response to Missing Parts filed Jul. 3, 2006, 15 pages.
U.S. Appl. No. 11/319,758: Non-final Office Action dated Nov. 12, 2008, 46 pages.
U.S. Appl. No. 11/319,758: Amendment filed May 12, 2009, 40 pages.
U.S. Appl. No. 11/319,758: Final Office Action dated Aug. 3, 2009, 39 pages.
U.S. Appl. No. 11/319,758: RCE filed Jan. 4, 2010, 45 pages.
U.S. Appl. No. 11/319,758: Non-Final Office Action dated Mar. 30, 2010, 39 pages.
U.S. Appl. No. 11/319,758: Office Action response dated Jul. 29, 2010, 30 pages.
U.S. Appl. No. 11/319,758: Final Office Action dated Oct. 28, 2010, 31 pages.
U.S. Appl. No. 11/319,758: Request for Continued Examination, dated Mar. 28, 2011, 32 pages.
U.S. Appl. No. 11/319,758: Non-Final office action dated Jun. 3, 2011, 31 pages.
U.S. Appl. No. 11/319,758: Non-Final Office Action Response dated Nov. 3, 2011, 29 pages.
U.S. Appl. No. 11/319,758: Final Office Action, dated Jan. 17, 2012, 22 pages.
U.S. Appl. No. 11/319,758: Amendment after final, dated May 17, 2012, 34 pages.
U.S. Appl. No. 11/319,758: Advisory Action, dated Jun. 20, 2012, 3 pages.
U.S. Appl. No. 11/319,758: Amendment after final, dated Jun. 28, 2019, 29 pages.
U.S. Appl. No. 11/319,758: Notice of Allowance and examiner's interview summary, dated Jul. 17, 2012, 10 pages.
U.S. Appl. No. 11/319,758: Issue Fee payment, Rule 312 and Miscellaneous Communication, dated Oct. 12, 2012, 12 pages.
U.S. Appl. No. 11/319,758: Issue Notification, dated Oct. 31, 2012, 1 page.
U.S. Appl. No. 13/632,581: Application as filed Oct. 1, 2012, 88 Pages.
U.S. Appl. No. 13/632,581: Notice to File Missing Parts and Filing Receipt, dated Oct. 22, 2012, 27 Pages.
U.S. Appl. No. 13/632,581: Filing Receipt, mailed 3/5/4, 3 Pages.
U.S. Appl. No. 13/632,581: Notice of Publication, dated Jun. 13, 2013, 1 Page.
U.S. Appl. No. 13/632,581: Non-final Office Action, dated Jul. 3, 2013, 22 Pages.
U.S. Appl. No. 13/632,581: Non-Final Office Action Response, dated Sep. 11, 2013, 23 Pages.
U.S. Appl. No. 13/632,581: Final Office Action, dated Dec. 18, 2013, 27 Pages.
U.S. Appl. No. 13/632,581: Response After Final Action, dated Mar. 18, 2014, 37 Pages.
U.S. Appl. No. 13/632,581: Advisory Action (PTOL-303), dated Apr. 3, 2014, 4 Pages.
U.S. Appl. No. 13/632,581: Notice of Appeal filed Jul. 17, 2014, 2 Pages.
U.S. Appl. No. 13/632,581: Request for Continued Examination, dated Jul. 16, 2014, 23 Pages.
U.S. Appl. No. 13/632,581: Notice Non-Compliant Amendment, dated Oct. 20, 2014, 5 pages.
U.S. Appl. No. 13/632,581: Amendment/Req Reconsideration after Non-Final Reject, filed Nov. 4, 2014, 16 pages.
U.S. Appl. No. 13/632,581: Non-Final Rejection, dated Jan. 27, 2015, 16 pages.
U.S. Appl. No. 13/632,581: Amendment/Req Reconsideration Non-Final Rejection and Amendments, filed Apr. 20, 2015, 24 pages.
U.S. Appl. No. 13/632,581: Final Rejection, dated Jul. 20, 2015, 21 pages.
U.S. Appl. No. 13/632,581: After Final Consideration Request and Response, dated Sep. 21, 2015, 28 pages.
U.S. Appl. No. 13/632,581: Advisory Action and After Final Decision, dated Oct. 2, 2015, 18 pages.
U.S. Appl. No. 13/632,581: RCE and Amendments, dated Nov. 30, 2015, 55 pages.

(56) References Cited

OTHER PUBLICATIONS

U.S. Appl. No. 13/632,581: Notice of Allowance and Fees, dated Dec. 17, 2015, 5 pages.
U.S. Appl. No. 13/632,581: Filing Receipt, dated Jan. 22, 2016, 4 pages.
U.S. Appl. No. 13/632,581: Electronic Terminal Disclaimer, filed Mar. 7, 2016, 3 pages.
U.S. Appl. No. 13/632,581: Issue Fee Payment, filed Mar. 16, 2016, 1 page.
U.S. Appl. No. 13/632,581: Amendment after Notice of Allowance, dated Mar. 16, 2016 19 pages.
U.S. Appl. No. 13/632,581: Response to Amendment under Rule 312, dated Mar. 22, 2016, 2 pages.
U.S. Appl. No. 13/632,581: Issue Notification, dated Apr. 13, 2016, 1 page.
U.S. Appl. No. 15/081,612: Application as filed Mar. 25, 2016, 87 Pages.
U.S. Appl. No. 15/081,612: Notice to File Missing Parts and Filing Receipt, dated Apr. 11, 2016, 4 Pages.
U.S. Appl. No. 15/081,612: Filing Receipt, dated Apr. 11, 2016, 3 Pages.
U.S. Appl. No. 15/081,612: Applicant Response to Pre-Exam Formalitites Notice and Preliminary Amendments, dated Jun. 13, 2016, 34 pages.
U.S. Appl. No. 15/081,612: Preliminary Amendment, dated Jun. 14, 2016, 4 pages.
U.S. Appl. No. 15/081,612: Filing Receipt, dated Jun. 21, 2016, 3 pages.
U.S. Appl. No. 15/081,612: Non-Final Rejection, dated Jul. 27, 2016, 9 pages.
U.S. Appl. No. 15/081,612: Electronic Terminal Disclaimer, filed Sep. 23, 2016, 3 pages.
U.S. Appl. No. 15/081,612: Notice of Publication, dated Sep. 29, 2016, 1 page.
U.S. Appl. No. 15/081,612: Amendment/Req. Reconsideration-After Non-Final Reject, dated Oct. 17, 2016, 10 pages.
U.S. Appl. No. 15/081,612: Notice of Allowance and Fees, dated Oct. 27, 2016, 5 pages.
U.S. Appl. No. 15/081,612: RCE, filed Jan. 30, 2017, 2 pages.
U.S. Appl. No. 15/081,612: Issue Fee Payment, filed Jan. 30, 2017, 1 page.
U.S. Appl. No. 15/081,612: Notice of Allowance and Fees Due, dated Jan. 30, 2017, 2 pages.
U.S. Appl. No. 15/081,612: Notice of Allowance and Fees Due, dated Feb. 13, 2017, 7 pages.
U.S. Appl. No. 15/081,612: Amendment After Notice of Allowance, dated Mar. 20, 2017, 4 pages.
U.S. Appl. No. 15/081,612: Issue Fee Payment, filed Mar. 20, 2017, 1 page.
U.S. Appl. No. 15/081,612: Issue Notification, dated Apr. 20, 2017, 1 page.
U.S. Appl. No. 15/464,205: Application as filed Mar. 20, 2017, 84 pages.
U.S. Appl. No. 15/464,205: Notice to File Missing Parts, filed Mar. 28, 2017, 5 pages.
U.S. Appl. No. 15/464,205: Applicant Response to Pre-Exam Formalities Notice, filed May 31, 2017, 86 pages.
U.S. Appl. No. 15/464,205: Filing Receipt, dated Mar. 28, 2017, 4 pages.
U.S. Appl. No. 15/464,205: Preliminary Amendment, dated May 31, 2017, 8 pages.
U.S. Appl. No. 15/464,205: Filing Receipt, dated Jun. 2, 2017, 4 pages.
U.S. Appl. No. 11/006,842: Application as filed Dec. 7, 2004, 58 pages.
U.S. Appl. No. 11/006,842: Notice to file missing parts filed Jan. 10, 2005, 2 pages.
U.S. Appl. No. 11/006,842: Response to Notice to file missing parts mailed Apr. 1, 2005, 7 pages.

U.S. Appl. No. 11/006,842: Preliminary Amendment dated May 2, 2005, 93 pages.
U.S. Appl. No. 11/006,842: Restriction Requirement dated Jan. 23, 2008, 5 pages.
U.S. Appl. No. 11/006,842: Response to Restriciton Requirement dated Feb. 25, 2008, 25 pages.
U.S. Appl. No. 11/006,842: Restriction Requirement dated May 13, 2008, 5 pages.
U.S. Appl. No. 11/006,842: Response to Restriciton Requirement dated Aug. 13, 2008, 24 pages.
U.S. Appl. No. 11/006,842: Non-Final Office Action dated Nov. 3, 2008.
U.S. Appl. No. 11/006,842: Response to Non-Final Office Action dated May 4, 2009, 35 pages.
U.S. Appl. No. 11/006,842: Supplemental Response dated Jul. 17, 2009, 23 pages.
U.S. Appl. No. 11/006,842: Notice of Allowance dated Jul. 27, 2009, 13 pages.
U.S. Appl. No. 11/006,842: Issue Fee filed Oct. 27, 2009, 1 page.
U.S. Appl. No. 11/006,842: Issue notification dated Nov. 18, 2009, 1 page.
U.S. Appl. No. 12/613,450: Continuation application filed Nov. 5, 2009, 63 pages.
U.S. Appl. No. 12/613,450: Notice of Missing Parts mailed Nov. 18, 2009, 2 pages.
U.S. Appl. No. 12/613,450: Preliminary Amendment and Response to Missing Parts filed Jan. 19, 2010, 16 pages.
U.S. Appl. No. 12/613,450: Filing receipt dated Jan. 27, 2010, 3 pages.
U.S. Appl. No. 12/613,450: Notice of Publication dated May 6, 2010, 1 page.
U.S. Appl. No. 12/613,450: Restriction requirement dated Jun. 10, 2011, 5 pages.
U.S. Appl. No. 12/613,450: Response to restriction requirement dated Jul. 6, 2011, 17 pages.
U.S. Appl. No. 12/613,450: Non-Final Office Action, dated Aug. 25, 2011, 15 pages.
U.S. Appl. No. 12/613,450: Non-Final OA response dated Dec. 27, 2011, 28 pages.
U.S. Appl. No. 12/613,450: Final rejection, dated Feb. 14, 2012, 14 pages.
U.S. Appl. No. 12/613,450: Amendment after final, dated Jun. 8, 2012, 23 pages.
U.S. Appl. No. 12/613,450: Advisory Action, dated Jun. 20, 2012, 4 pages.
U.S. Appl. No. 12/613,450: RCE, mailed Jul. 12, 2012, 25 pages.
U.S. Appl. No. 12/613,450: Notice of Allowance, dated Oct. 7, 2013, 20 pages.
U.S. Appl. No. 12/613,450: Electronic Terminal Disclaimer filed and approved, filed Jan. 2, 2014, 2 pages.
U.S. Appl. No. 12/613,450: Amendment After Final or Under 37CFR 1.312, initialed by the Examiner, dated Jan. 14, 2014, 2 Pages.
U.S. Appl. No. 12/613,450: Issue Notificaton, dated Jan. 22, 2014, 1 Page.
U.S. Appl. No. 14/149,749: Application as filed Jan. 7, 2014, 59 Pages.
U.S. Appl. No. 14/149,749: Notice to File Missing Parts and Filing Receipt, dated Jan. 23, 2014, 6 Pages.
U.S. Appl. No. 14/149,749: Applicant Response to Pre-exam Formalities Notice, dated May 23, 2014, 12 Pages.
U.S. Appl. No. 14/149,749: Applicant Response to Pre-Exam Formalities Notice, Mailed Aug. 25, 2014, 103 Pages.
U.S. Appl. No. 14/149,749: Filing Receipt, dated Sep. 4, 2014, 3 Pages.
U.S. Appl. No. 14/149,749: Notice of Publication, dated Dec. 11, 2014, 1 page.
U.S. Appl. No. 14/149,749: Electronic Terminal Disclaimer Filed and Approved filed Feb. 23, 2015.
U.S. Appl. No. 14/149,749: Examiner Initiated Interview Summary, dated Feb. 24, 2015, 2 pages.
U.S. Appl. No. 14/149,749: Notice of Allowance and Fees and Examiner Search, dated Apr. 17, 2015, 30 pages.

(56) References Cited

OTHER PUBLICATIONS

U.S. Appl. No. 14/149,749: Amendment after Notice of Allowance, filed May 27, 2015, 10 pages.
U.S. Appl. No. 14/149,749: Issue Fee Payment, filed May 27, 2015, 1 page.
U.S. Appl. No. 14/149,749: Electronic Terminal Disclaimer Filed and Approved, filed May 27, 2015, 3 pages.
U.S. Appl. No. 14/149,749: Response to Amendment under Rule 312, dated May 29, 2015, 1 page.
U.S. Appl. No. 14/149,749: Response to Amendment under Rule 312, dated Jun. 1, 2015, 3 pages.
U.S. Appl. No. 14/149,749: Issue Notification, dated Jun. 17, 2015, 1 page.
U.S. Appl. No. 14/726,192: Application as filed May 29, 2015, 39 pages.
U.S. Appl. No. 14/726,192: Filing Receipt, dated Jun. 9, 2015, 3 pages.
U.S. Appl. No. 14/726,192: Notice to File Missing Parts, mailed Jun. 9, 2015, 2 pages.
U.S. Appl. No. 14/726,192: Applicant Response to Pre-Exam Formalities Notice and Amendments, filed Aug. 12, 2015, 114 pages.
U.S. Appl. No. 14/726,192: Filing Receipt, dated Aug. 20, 2016, 3 pages.
U.S. Appl. No. 14/726,192: Electronic Terminal Disclaimer Filed and Approved, filed Nov. 20, 2015, 3 pages.
U.S. Appl. No. 14/726,192: Notice of Publication, dated Nov. 27, 2015, 1 page.
U.S. Appl. No. 14/726,192: Issue Fee Payment and Amendment after Notice of Allowance, dated Jul. 18, 2016, 13 pages.
U.S. Appl. No. 14/726,192: Response to Amendment under Rule 312, dated Jul. 21, 2016, 1 page.
U.S. Appl. No. 14/726,192: Response to Amendment under Rule 312, dated Jul. 22, 2016, 2 pages.
U.S. Appl. No. 14/726,192: Issue Notification, dated Aug. 3, 2016, 1 page.
U.S. Appl. No. 15/240,964: Application and Preliminary Amendments as filed Aug. 18, 2016, 70 pages.
U.S. Appl. No. 15/240,964: Filing Receipt, dated Aug. 31, 2016, 3 pages.
U.S. Appl. No. 15/240,964: Notice of Publication, dated Dec. 8, 2016.
U.S. Appl. No. 15/240,964: Non-Final Rejection, dated Mar. 14, 2017, 23 pages.
U.S. Appl. No. 15/240,964: Amendment/Req. Reconsideration-After Non-Final Reject, dated Jun. 14, 2017, 27 pages.
U.S. Appl. No. 15/240,964: Final Rejection, dated Aug. 9, 2017, 25 pages.
U.S. Appl. No. 15/240,964: After Final Consideration Program Request, filed Oct. 10, 2017, 30 pages.
U.S. Appl. No. 15/240,964: Advisory Action, dated Oct. 30, 2017, 3 pages.
U.S. Appl. No. 15/240,964: RCE and Amendments, dated Nov. 9, 2017, 31 pages.
U.S. Appl. No. 15/240,964: Non-Final Rejection, dated Jul. 30, 2018, 32 pages.
U.S. Appl. No. 15/240,964: Amendment/Req. Reconsideration-After Non-Final Reject, dated Oct. 30, 2018, 43 pages.
U.S. Appl. No. 11/320,538: Application filed Dec. 27, 2005, 76 pages.
U.S. Appl. No. 11/320,538: Notice of Missing Parts mailed Feb. 2, 2006, 2 pages.
U.S. Appl. No. 11/320,538: Response to Missing Parts filed Aug. 2, 2006, 36 pages.
U.S. Appl. No. 11/320,538: Non-final Office Action dated Apr. 1, 2009, 27 pages.
U.S. Appl. No. 11/320,538: Amendment filed Jul. 1, 2009, 54 pages.
U.S. Appl. No. 11/320,538: Final Office Action dated Nov. 2, 2009, 29 pages.
U.S. Appl. No. 11/320,538: Response to Final Office Action filed Jan. 4, 2010, 23 pages.
U.S. Appl. No. 11/320,538: Advisory Action dated Jan. 19, 2010, 3 pages.
U.S. Appl. No. 11/320,538: RCE and Amendment filed Apr. 2, 2010, 26 pages.
U.S. Appl. No. 11/320,538: Non-Final Office Action dated Jun. 9, 2010, 24 pages.
U.S. Appl. No. 11/320,538: Office action dated Dec. 22, 2010, 10 pages.
U.S. Appl. No. 11/320,538: Notice of Appeal, mailed May 23, 2011, 6 pages.
U.S. Appl. No. 11/320,538: Pre-brief appeal conference decision mailed Jun. 30, 2011, 2 pages.
U.S. Appl. No. 11/320,538: Request for Continued Examination dated Dec. 23, 2011, 21 pages.
U.S. Appl. No. 11/320,538: Non-Final Office Action, dated Dec. 19, 2012, 12 pages.
U.S. Appl. No. 11/320,538: Response to Non-final office action, dated Apr. 17, 2013, 20 pages.
U.S. Appl. No. 11/320,538: Notice of allowance, dated Aug. 1, 2013, 25 pages.
U.S. Appl. No. 11/320,538: Issue fee payment, mailed Nov. 1, 2013, 7 pages.
U.S. Appl. No. 11/320,538: Rule 312 amendment, dated Nov. 19, 2013, 20 pages.
U.S. Appl. No. 11/320,538: Issue Notification, dated Dec. 4, 2013, 1 page.
U.S. Appl. No. 14/086,741: Application as filed Dec. 12, 2013, 77 Pages.
U.S. Appl. No. 14/086,741: Filing Receipt and Notice to File Missing Parts, dated Dec. 12, 2013, 6 Pages.
U.S. Appl. No. 14/086,741: Applicant Response to Pre-Exam Formalities Notice, Mailed Jun. 12, 2014, 60 Pages.
U.S. Appl. No. 14/086,741: Filing Receipt, dated Jun. 17, 2014, 3 Pages.
U.S. Appl. No. 14/086,741: Notice of Publication, dated Sep. 25, 2014, 1 Page.
U.S. Appl. No. 14/086,741: Terminal Disclaimer as filed Sep. 29, 2014, 1 Page.
U.S. Appl. No. 14/086,741: Terminal Disclaimer Review Decision, Mailed Sep. 30, 2014, 1 Page.
U.S. Appl. No. 14/086,741: Notice of Allowance and Fees and Examiner Summary, dated Oct. 3, 2014, 21 pages.
U.S. Appl. No. 14/086,741: Notice of Allowance and Fees Due, filed Oct. 3, 2014, 22 pages.
U.S. Appl. No. 14/086,741: Amendment after Notice of Allowance, filed Jan. 5, 2015, 14 pages.
U.S. Appl. No. 14/086,741: Issue Fee Payment, filed Jan. 5, 2015, 1 page.
U.S. Appl. No. 14/086,741: Response to Amendment under Rule 312, dated Jan. 22, 2015, 2 pages.
U.S. Appl. No. 14/086,741: Notice of Allowance and Fees and Examiner Search strategy, dated Mar. 16, 2015, 40 pages.
U.S. Appl. No. 14/086,741: Issue Notification, dated Apr. 1, 2015, 1 page.
U.S. Appl. No. 14/596,154: Application as filed Jan. 13, 2015, 60 pages.
U.S. Appl. No. 14/596,154: Filing Receipt, dated Jan. 27, 2015, 3 pages.
U.S. Appl. No. 14/596,154: Notice to File Missing Parts, mailed Jan. 27, 2015, 3 pages.
U.S. Appl. No. 14/596,154: Applicant Response to Pre Exam Formalities Notice with Preliminary Amendments, filed Mar. 27, 2015, 85 pages.
U.S. Appl. No. 14/596,154: Filing Receipt, dated Apr. 2, 2015, 3 pages.
U.S. Appl. No. 14/596,154: Notice of Publication, dated Jul. 9, 2015, 1 page.
U.S. Appl. No. 14/596,154: Electronic Terminal Disclaimer Filed and Approved, filed Nov. 20, 2015, 3 pages.
U.S. Appl. No. 14/596,154: Non-Final Rejection, dated Sep. 21, 2017, 19 pages.
U.S. Appl. No. 14/596,154: Amendment/Req. Reconsideration-After Non-Final Reject, dated Dec. 21, 2017, 37 pages.

(56) References Cited

OTHER PUBLICATIONS

U.S. Appl. No. 14/596,154: Notice of Allowance and Fees Due, dated May 2, 2018, 8 pages.
U.S. Appl. No. 14/596,154: Issue Notification, dated Aug. 21, 2018, 1 page.
U.S. Appl. No. 16/048,119: Application as filed Jul. 27, 2018, 81 pages.
U.S. Appl. No. 16/048,119: Filing Receipt, dated Aug. 24, 2018, 3 pages.
U.S. Appl. No. 16/048,119: Notice to File Missing Parts, filed Aug. 24, 2018, 2 pages.
U.S. Appl. No. 16/048,113: Applicant Response to Pre-Exam Formalities Notice and Amendment, dated Oct. 22, 2018, 38 pages.
U.S. Appl. No. 16/048,113: Filing Receipt, dated Oct. 24, 2018, 3 pages.
U.S. Appl. No. 11/361,500: Application as filed Feb. 23, 2006, 72 pages.
U.S. Appl. No. 11/361,500: Notice to file missing parts mailed Mar. 23, 2006, 2 pages.
U.S. Appl. No. 11/361,500: Response to Notice to File Missing Parts mailed Jul. 19, 2006, 27 pages.
U.S. Appl. No. 11/361,500: Notice of Publication dated Nov. 16, 2006, 1 page.
U.S. Appl. No. 11/361,500: Office Action dated May 27, 2019, 18 pages.
U.S. Appl. No. 11/361,500: Response to Office Action dated Aug. 27, 2009, 34 pages.
U.S. Appl. No. 11/361,500: Notice of Allowance dated Dec. 11, 2009, 8 pages.
U.S. Appl. No. 11/361,500: Issue Fee Payment and Rule 312 Amendment dated Jan. 6, 2010, 28 pages.
U.S. Appl. No. 11/361,500: Response to Rule 312 Amendment dated Jan. 25, 2010, 4 pages.
U.S. Appl. No. 11/361,500: Issue Notification dated Feb. 24, 2010, 1 page.
U.S. Appl. No. 12/702,243: Continuation Application with Preliminary Amendment filed Feb. 8, 2010, 83 pages.
U.S. Appl. No. 12/702,243: Notice of Missing Parts mailed Feb. 25, 2010, 2 pages.
U.S. Appl. No. 12/702,243: Response to Missing Parts filed Apr. 26, 2010, 8 pages.
U.S. Appl. No. 12/702,243: Filing receipt dated May 4, 2010, 3 pages.
U.S. Appl. No. 12/702,243: Notice of Publication dated Aug. 12, 2010, 1 page.
U.S. Appl. No. 12/702,243: Non-Final rejection, dated Aug. 30, 2012, 8 pages.
U.S. Appl. No. 12/702,243: Amendment, dated Nov. 20, 2012, 14 pages.
U.S. Appl. No. 12/702,243: Terminal Disclaimer, mailed Jan. 2, 2015, 5 pages.
U.S. Appl. No. 12/702,243: Terminal Disclaimer decision, mailed Jan. 4, 2013, 1 page1.
U.S. Appl. No. 12/702,243: Notice of allowance and fees due and examiner interview summary, dated Jan. 10, 2013, pages.
U.S. Appl. No. 12/702,243: Issue notification, dated Apr. 24, 2013, 1 page.
U.S. Appl. No. 13/860,482: Application as filed Apr. 10, 2013, 98 Pages.
U.S. Appl. No. 13/860,482: Notice to File Missing Parts and Filing Receipt, Mailed May 21, 2013, 5 Pages.
U.S. Appl. No. 13/860,482: Applicant Response to Pre-Exam Formalities Notice, dated Oct. 22, 2013, 3 Pages.
U.S. Appl. No. 13/860,482: Notice of Publication, dated Feb. 6, 2014, 1 Page.
U.S. Appl. No. 13/860,482: Non-Final Office Action, dated Jun. 9, 2014, 11 Pages.
U.S. Appl. No. 13/860,482: Non-Final Office Action Response, dated Sep. 8, 2014, 19 Pages.
U.S. Appl. No. 13/860,482: Tereminal Disclaimer Review Decision, filed Sep. 9, 2014, 1 page.
U.S. Appl. No. 13/860,482: Terminal Disclaimer filed, Oct. 8, 2014, 1 page.
U.S. Appl. No. 13/860,482: Terminal Disclaimer Review Decision, filed Oct. 9, 2014, 1 page.
U.S. Appl. No. 13/860,482: Notice of Allowance and Fees Due, dated Nov. 5, 2014, 8 Pages.
U.S. Appl. No. 13/860,482: Issue Fee Payment and Rule 312 Amendments, filed Feb. 4, 2015, 4 pages.
U.S. Appl. No. 14/614,292: Application as filed Feb. 4, 2015, 76 pages.
U.S. Appl. No. 13/860,482: Issue Notification, dated Mar. 4, 2015, 1 page.
U.S. Appl. No. 14/614,292: Notice to File Missing Parts and Filing Receipt, dated Feb. 20, 2015, 5 pages.
U.S. Appl. No. 14/614,292: Applicant Response to Pre-Exam Formalities Notice and Amendments, filed Apr. 17, 2015, 30 pages.
U.S. Appl. No. 14/614,292: Filing Receipt, dated Apr. 24, 2015, 3 pages.
U.S. Appl. No. 14/614,292: Notice of Publication, dated Aug. 6, 2015, 1 page.
U.S. Appl. No. 14/614,292: Electronic Terminal Disclaimer Filed and Approved, filed Nov. 20, 2015, 3 pages.
U.S. Appl. No. 14/614,292: Non-Final Rejection, dated May 19, 2016, 10 pages.
U.S. Appl. No. 14/614,292: Amendment/Req. Reconsideration-After Non-Final Rejection, dated Aug. 18, 2016, 20 pages.
U.S. Appl. No. 14/614,292: Notice of Allowance and Fees, dated Sep. 21, 2016, 8 pages.
U.S. Appl. No. 14/614,292: Issue Fee Payment and Amendment after Notice of Allowance, dated Dec. 21, 2016, 4 pages.
U.S. Appl. No. 14/614,292: Issue Notification, dated Jan. 18, 2017, 1 page.
U.S. Appl. No. 15/411,823: Application as filed, Jan. 20, 2017, 77 pages.
U.S. Appl. No. 15/411,823: Preliminary Amendment, dated Jan. 20, 2017, 25 pages.
U.S. Appl. No. 15/411,823: Filing Receipt, dated Jan. 31, 2017, 3 pages.
U.S. Appl. No. 15/411,823: Notice of Publication, dated May 11, 2017, 1 page.
U.S. Appl. No. 15/411,823: Non-Final Rejection, dated Jan. 25, 2018, 10 pages.
U.S. Appl. No. 15/411,823: Amendment/Req. Reconsideration-After Non-Final Rejection, dated Apr. 24, 2018, 18 pages.
U.S. Appl. No. 15/411,823: Terminal Disclaimer—Filed and Approved, filed Apr. 24, 2018, 3 pages.
U.S. Appl. No. 15/411,823: Notice of Allowance and Fees Due, dated Jul. 13, 2018, 8 pages.
U.S. Appl. No. 16/164,430: Application as filed Oct. 18, 2018, 79 pages.
U.S. Appl. No. 16/164,430: Notice to Filed Missing Parts, filed Nov. 6, 2018, 2 pages.
U.S. Appl. No. 16/164,430: Filing Receipt, dated Nov. 6, 2018, 4 pages.
U.S. Appl. No. 11/412,417: Application filed Apr. 26, 2006, 96 pages.
U.S. Appl. No. 11/412,417: Notice of Missing Parts mailed May 19, 2006, 2 pages.
U.S. Appl. No. 11/412,417: Response to Notice of Missing Parts filed Jul. 19, 2006, 14 pages.
U.S. Appl. No. 11/412,417: Non-final Office Action dated Apr. 1, 2008, 53 pages.
U.S. Appl. No. 11/412,417: Amendment filed Aug. 1, 2008, 34 pages.
U.S. Appl. No. 11/412,417: Final Office Action dated Nov. 13, 2008, 40 pages.
U.S. Appl. No. 11/412,417: RCE and Amendment filed May 12, 2009, 36 pages.
U.S. Appl. No. 11/412,417: Non-final Office Action dated Jun. 30, 2009, 141 pages.

(56) References Cited

OTHER PUBLICATIONS

U.S. Appl. No. 11/412,417: Examiner Interview Summary dated Oct. 30, 2009, 3 pages.
U.S. Appl. No. 11/412,417: Amendment filed Oct. 30, 2009, 33 pages.
U.S. Appl. No. 11/412,417: Final Office Action dated Jan. 4, 2010, 37 pages.
U.S. Appl. No. 11/412,417: RCE with Amendment filed May 4, 2010, 27 pages.
U.S. Appl. No. 11/412,417: Supplemental Office Action Response dated Jun. 22, 2010, 22 pages.
U.S. Appl. No. 11/412,417: Notice of Allowance and bibliographic data sheet dated Jul. 6, 2010, 9 pages.
U.S. Appl. No. 11/412,417: RCE mailed Oct. 5, 2010, 4 pages.
U.S. Appl. No. 11/412,417: Notice of Allowance and bibliographic data sheet dated Oct. 26, 2010, 4 pages.
U.S. Appl. No. 11/412,417: Issue Fee Payment and Comments on Reasons for Allowance dated Jan. 26, 2011, 6 pages.
U.S. Appl. No. 11/412,417: Issue Notification dated Feb. 9, 2011, 1 page.
U.S. Appl. No. 13/030,084: Application filed Feb. 17, 2011, 103 pages.
U.S. Appl. No. 13/030,084: Filing receipt and Notice to File Missing parts dated Mar. 3, 2011, 6 pages.
U.S. Appl. No. 13/030,084: Response to Notice to File Missing Parts, dated Aug. 3, 2011, 23 pages.
U.S. Appl. No. 13/030,084: Updated filing receipt, dated Aug. 11, 2011, 3 pages.
U.S. Appl. No. 13/030,084: Non-Final Rejection dated Oct. 26, 2011, 34 pages.
U.S. Appl. No. 13/030,084: Notice of Publication dated Nov. 17, 2011, 1 page.
U.S. Appl. No. 13/030,084: Amendment, dated Jan. 26, 2012, 35 pages.
U.S. Appl. No. 13/030,084: Notice regarding non-compliant amendment, dated Jan. 31, 2012, 4 pages.
U.S. Appl. No. 13/030,084: Amendment, dated Feb. 9, 2012, 35 pages.
U.S. Appl. No. 13/030,084: Final Rejection, dated Mar. 28, 2012, 62 pages.
U.S. Appl. No. 13/030,084: Amendment after final, dated Jun. 14, 2012, 88 pages.
U.S. Appl. No. 13/030,084: Advisory Action, dated Jun. 26, 2012, 4 pages.
U.S. Appl. No. 13/030,084: RCE, mailed Jul. 23, 2012, 89 pages.
U.S. Appl. No. 13/030,084: Notice regarding non-compliant amendment, dated Jul. 25, 2012, 2 pages.
U.S. Appl. No. 13/030,084: Amendment, dated Jan. 2, 2013, 40 pages.
U.S. Appl. No. 13/030,084: Refund request, mailed Jan. 23, 2013, 17 pages.
U.S. Appl. No. 13/030,084: Non-Final office action, dated Apr. 30, 2013, 39 pages.
U.S. Appl. No. 13/030,084: Response to non-final office action, dated Jul. 30, 2013, 28 pages.
U.S. Appl. No. 13/030,084: Non-final office action, dated Oct. 10, 2013, 44 pages.
U.S. Appl. No. 13/030,084: Response after Non-Final Reject, dated Jan. 2, 2014, 1 Page.
U.S. Appl. No. 13/030,084: Final Rejection, dated Mar. 19, 2014, 41 Pages.
U.S. Appl. No. 13/030,084: Amendment Submitted/Entered with Filing of CPA/RCE, dated May 19, 2014, 38 Pages.
U.S. Appl. No. 13/030,084: Advisory Action (PTOL-303), dated Jun. 6, 2014, 4 Pages.
U.S. Appl. No. 13/030,084: Applicant Initiated Interview Summary (PTOL-413), dated Jul. 1, 2014, 3 Pages.
U.S. Appl. No. 13/030,084: Request for Contiuned Examination, dated Aug. 15, 2014, 26 Pages.
U.S. Appl. No. 13/030,084: Non-Final Rejection and Examiner's Search, dated Mar. 24, 2015, 24 pages.
U.S. Appl. No. 13/030,084: Amendment/Req. Reconsideration After Non-Final Rejection, filed Jun. 24, 2015, 28 pages.
U.S. Appl. No. 13/030,084: Terminal Disclaimer filed and Approved, filed Sep. 10, 2015, 3 pages.
U.S. Appl. No. 13/030,084: Notice of Allowance and Fees, dated Sep. 17, 2015, 24 pages.
U.S. Appl. No. 13/030,084: Issue Fee Payment and Amendment, dated Dec. 10, 2015, 4 pages.
U.S. Appl. No. 14/968,429: Application as filed Dec. 14, 2015.
U.S. Appl. No. 14/968,429: Filing Receipt, dated Jan. 4, 2016, 3 pages.
U.S. Appl. No. 14/968,429: Applicant Response to Pre-Exam Formalities Notice, dated Jan. 14, 2016, 35 pages.
U.S. Appl. No. 14/968,429: Filing Receipt, dated Jan. 21, 2016, 3 pages.
U.S. Appl. No. 14/968,429: Notice of Publication, dated Apr. 28, 2016, 1 page.
U.S. Appl. No. 14/968,429: Non-Final Rejection, dated May 15, 2017, 8 pages.
U.S. Appl. No. 14/968,429: Amendment/Req. Reconsideration-After Non-Final Reject, dated Aug. 9, 2017, 19 pages.
U.S. Appl. No. 14/968,429: Final Rejection, dated Oct. 24, 2017, 10 pages.
U.S. Appl. No. 14/968,429: Response After Final Action, dated Dec. 26, 2017, 28 pages.
U.S. Appl. No. 14/968,429: Advisory Action, dated Jan. 11, 2018, 5 pages.
U.S. Appl. No. 14/968,429: Terminal Disclaimer—Filed and Approved, filed Feb. 7, 2018, 3 pages.
U.S. Appl. No. 14/968,429: Response After Final Action, dated Feb. 7, 2018, 13 pages.
U.S. Appl. No. 14/968,429: Notice of Allowance and Fees Due, dated Feb. 26, 2018, 8 pages.
U.S. Appl. No. 14/968,429: Notice of Allowance and Fees Due, dated Mar. 19, 2018, 6 pages.
U.S. Appl. No. 14/968,429: Amendment after Notice of Allowance, dated May 31, 2018, 12 pages.
U.S. Appl. No. 14/968,429: Amendment after Notice of Allowance, dated Jun. 13, 2018, 12 pages.
U.S. Appl. No. 14/968,429: Response to Amendment under Rule 312, dated Jul. 10, 2018, 2 pages.
U.S. Appl. No. 14/968,429: Response to Amendment under Rule 312, dated Jul. 23, 2018, 2 pages.
U.S. Appl. No. 14/968,429: Issue Notification, dated Aug. 1, 2018, 1 page.
U.S. Appl. No. 11/480,094: Application filed Jun. 29, 2006, 125 pages.
U.S. Appl. No. 11/480,094: Notice to File Corrected Application Papers dated Aug. 2, 2006, 2 pages.
U.S. Appl. No. 11/480,094: Response to Notice to File Corrected Application Papers filed Nov. 2, 2006, 32 pages.
U.S. Appl. No. 11/480,094: Filing Receipt dated Dec. 7, 2006, 3 pages.
U.S. Appl. No. 11/480,094: Non-final Office Action dated Nov. 7, 2008, 28 pages.
U.S. Appl. No. 11/480,094: Amendment filed May 7, 2009, 37 pages.
U.S. Appl. No. 11/480,094: Final Office Action dated Jul. 28, 2009, 16 pages.
U.S. Appl. No. 11/480,094: RCE with Amendment filed Dec. 28, 2009, 39 pages.
U.S. Appl. No. 11/480,094: Office Action dated Dec. 15, 2010, 15 pages.
U.S. Appl. No. 11/480,094: Office Action response, dated May 16, 2011, 29 pages.
U.S. Appl. No. 11/480,094: Final Office Action, dated Aug. 1, 2011, 13 pages.
U.S. Appl. No. 11/480,094: Amendment after final dated Nov. 1, 2011, 32 pages.
U.S. Appl. No. 11/480,094: Advisory Action dated Nov. 14, 2011, 3 pages.

(56) References Cited

OTHER PUBLICATIONS

U.S. Appl. No. 11/480,094: Notice of Appeal mailed Nov. 28, 2011, 1 page.
U.S. Appl. No. 11/480,094: Abandonment, dated Jul. 31, 2012, 2 pages.
U.S. Appl. No. 16/209,872: Application as filed, Dec. 4, 2018, 129 pages.
U.S. Appl. No. 16/209,872: Notice to File Missing Parts, filed Dec. 28, 2018, 2 pages.
U.S. Appl. No. 16/209,872: Filing Receipt, dated Dec. 28, 2018, 3 pages.
U.S. Appl. No. 16/209,872: Applicant Response to Pre-Exam Formalities Notice, filed Feb. 21, 2019, 17 pages.
U.S. Appl. No. 16/209,872: Filing Receipt, dated Feb. 26, 2019, 3 pages.
U.S. Appl. No. 15/043,267: Non-Final Rejection, dated Apr. 2, 2019, 21 pages.
U.S. Appl. No. 15/250,118: Terminal Disclaimer, filed Dec. 11, 2018, 4 pages.
U.S. Appl. No. 15/250,118: Notice of Allowance and Fees Due, dated Jan. 8, 2019, 32 pages.
U.S. Appl. No. 15/250,118: Amendment after Notice of Allowance, dated Jan. 23, 2019, 18 pages.
U.S. Appl. No. 15/250,118: Issue Fee Payment, filed Apr. 5, 2019, 20 pages.
U.S. Appl. No. 16/379,674: Application as filed Apr. 9, 2019, 83 pages.
U.S. Appl. No. 16/379,674: Filing Receipt, dated Apr. 24, 2019, 4 pages.
U.S. Appl. No. 15/802,348: Non-Final Rejection, dated Feb. 11, 2019, 18 pages.
U.S. Appl. No. 15/802,348: Amendment/Req. Reconsideration-After Non-Final Reject, dated May 13, 2019, 22 pages.
U.S. Appl. No. 12/830,236: Notice of Allowance and Fees Due, dated Apr. 2, 2019, 15 pages.
U.S. Appl. No. 14/641,735: Amendment/Req. Reconsideration-After Non-Final Reject, dated Feb. 4, 2019, 27 pages.
U.S. Appl. No. 14/641,735: Notice of Allowance and Fees Due, dated Apr. 15, 2019, 47 pages.
U.S. Appl. No. 15/464,205: Preliminary Amendment, dated Feb. 22, 2019, 11 pages.
U.S. Appl. No. 15/240,964: Notice of Allowance and Fees Due, dated Feb. 21, 2019, 26 pages.
U.S. Appl. No. 16/048,113: Notice of Publication, dated Jan. 31, 2019, 1 page.
U.S. Appl. No. 15/411,823: Notice of Publication, dated May 2, 2019, 1 page.
U.S. Appl. No. 16/164,430: Applicant Response to Pre-Exam Formalities Notice, filed Jan. 18, 2019, 29 pages.
U.S. Appl. No. 16/164,430: Filing Receipt, dated Jan. 23, 2019, 4 pages.
U.S. Appl. No. 16/164,430: Notice of Publication, dated May 2, 2019, 1 page.
U.S. Appl. No. 16/164,535: Application as filed Oct. 18, 2018, 115 pages.
U.S. Appl. No. 16/164,535: Filing Receipt, dated Nov. 7, 2018, 4 pages.
U.S. Appl. No. 16/164,535: Notice to File Corrected Application Papers, filed Nov. 7, 2018, 2 pages.
U.S. Appl. No. 16/164,535: Applicant Response to Pre-Exam Formalities Notice, filed Jan. 7, 2019, 23 pages.
U.S. Appl. No. 16/164,535: Filing Receipt, dated Jan. 11, 2019, 4 pages.
Paik et al, "Mining Association Rules in Tree Structured XML Data", ACM, pp. 807-811 (Year: 2009).
Knott, "A Balanced Tree Storage and Retrieval Algorithm", ACM, pp. 175-196 (Year: 1971).
Li, "An Immediate Approach to Balancing Nodes in Binary Search Trees", ACM, pp. 238-245 (Year 2006).

U.S. Appl. No. 14/870,744, Issue Fee, filed Dec. 4, 2018, 21 pages, Doc. 1139.
U.S. Appl. No. 14/870,744, Interview Summary, dated Mar. 8, 2019, 2 pages, Doc 1140.
U.S. Appl. No. 14/870,744, Issue Notification, dated Mar. 20, 2019, 1 page, Doc 1141.
U.S. Appl. No. 16/209,872, Notice of Publication, dated Jun. 6, 2019, 1 page, Doc 1144.
U.S. Appl. No. 16/209,872, Office Action, dated Sep. 17, 2020, 63 pages, Doc 2155.
U.S. Appl. No. 16/209,872, Response to Office Action, dated Sep. 17, 2020, 63 pages, Doc 2156.
U.S. Appl. No. 16/209,872, Terminal Disclaimer, filed Sep. 17, 2020, 6 pages, Doc 2157.
U.S. Appl. No. 16/820,457, Application, filed Mar. 16, 2020, 148 pages, Doc 1147.
U.S. Appl. No. 16/820,457, Filing Receipt, dated Mar. 31, 2020, 3 pages, Doc 1148.
U.S. Appl. No. 16/820,457, Notice of Publication, dated Jul. 9, 2020, 1 page, Doc 1149.
U.S. Appl. No. 17/158,804, Application, filed Jan. 26, 2021, 146 pages, Doc 2158.
U.S. Appl. No. 15/043,267, Informational Notice, dated Mar. 7, 2016, 1 page, Doc 1206.
U.S. Appl. No. 15/043,267, Response to Informational Notice, dated Oct. 14, 2016, 5 pages, Doc 1209.
U.S. Appl. No. 15/043,267, Response to Office Action, dated Jul. 2, 2019, 24 pages, Doc 1212.
U.S. Appl. No. 15/043,267, Final Office Action, dated Oct. 18, 2019, 14 pages, Doc 1213.
U.S. Appl. No. 15/043,267, Response to Final Office Action, dated Jan. 21, 2020, 20 pages, Doc 1214.
U.S. Appl. No. 15/043,267, Advisory Action, dated Jan. 29, 2020, 12 pages, Doc 1215.
U.S. Appl. No. 15/043,267, RCE Amendment, dated Mar. 3, 2020, 21 pages, Doc 1216.
U.S. Appl. No. 15/043,267, Notice of Allowance, dated Mar. 23, 2020, 9 pages, Doc 1217.
U.S. Appl. No. 15/043,267, Issue Fee, filed Jun. 23, 2020, 18 pages, Doc 1218.
U.S. Appl. No. 15/043,267, Issue Notification, dated Jul. 15, 2020, 1 page, Doc 1218.
U.S. Appl. No. 16/911,282, Application, filed Jun. 24, 2020, 98 pages, Doc 1220.
U.S. Appl. No. 16/911,282, Filing Receipt and Notice to File Missing Parts, filed Jul. 7, 2020, 7 pages, Doc 1221.
U.S. Appl. No. 16/911,282, Response to Notice to File Missing Parts, filed Sep. 8, 2020, 18 pages, Doc 2145.
U.S. Appl. No. 16/911,282, Upated Filing Receipt, dated Sep. 10, 2020, 5 pages, Doc 2146.
U.S. Appl. No. 16/911,282, Notice of Publication, dated Dec. 17, 2020, 1 page, Doc 2159.
U.S. Appl. No. 12/573,829: Notice of Allowance dated May 21, 2019, 32 pages, Doc 1318.
U.S. Appl. No. 12/573,829: Issue Fee & Terminal Disclaimer filed Aug. 21, 2019, 12 pages, 1320.
U.S. Appl. No. 12/573,829: Issue Notification dated Sep. 18, 2019, 1 page, Doc 1322.
U.S. Appl. No. 16/549,185: Application filed Sep. 23, 2019, 73 pages, Doc. 1323.
U.S. Appl. No. 16/549,185: Filing Receipt and Notice to File Missing Parts dated Sep. 4, 2019, 6 pages, Doc. 1324.
U.S. Appl. No. 16/549,185: Response to Notice to File Missing Parts filed Sep. 5, 2019, 18 pages, Doc. 2147.
U.S. Appl. No. 16/549,1851: Notice of Publication dated Dec. 19, 2019, 1 page, Doc. 1325.
U.S. Appl. No. 16/549,1851: Update Filing Receipt dated Sep. 6, 2019, 4 pages, Doc. 1326.
U.S. Appl. No. 15/250,118: Issue Notification dated May 29, 2019, 1 page, Doc. 2160.
U.S. Appl. No. 16/379,674: Notice of Publication, dated Aug. 1, 2019, 1 page, Doc. 2150.

(56) References Cited

OTHER PUBLICATIONS

U.S. Appl. No. 16/379,674: Office Action, dated Oct. 19, 2020, 69 pages, Doc. 2151.
U.S. Appl. No. 16/710,577: Reissue Application, filed Dec. 11, 2019, 88 pages, Doc. 1473.
U.S. Appl. No. 16/710,577: Filing Receipt dated Jan. 10, 2020, 5 pages, Doc. 1474.
U.S. Appl. No. 15/802,348: Final Rejection dated Jul. 9, 2019, 104 pages, Doc. 1483.
U.S. Appl. No. 15/802,348: Response After Final Action filed Aug. 20, 2019, 29 pages, Doc. 1484.
U.S. Appl. No. 15/802,348: Advisory Action dated Sep. 4, 2019, 5 pages, Doc. 1485.
U.S. Appl. No. 15/802,348: Request for Continued Examination filed Sep. 16, 2019, 32 pages, Doc. 1486.
U.S. Appl. No. 15/802,348: Terminal Disclaimer filed Mar. 18, 2020, 9 pages, Doc. 1488.
U.S. Appl. No. 15/802,348: Notice of Allowance and Fees Due dated Mar. 27, 2020, 178 pages, Doc. 1489.
U.S. Appl. No. 15/802,348: Issue Fee Payment filed Jun. 19, 2020, 9 pages, Doc. 1490.
U.S. Appl. No. 15/802,348: Issue Notification dated Jul. 8, 2020, 1 page, Doc. 1494.
U.S. Appl. No. 16/909,899: Application filed Jun. 23, 2020, 98 pages, Doc. 2140.
U.S. Appl. No. 16/909,899: Filing Receipt and Notice to File Missing Parts dated Jul. 6, 2020, 8 pages, Doc. 2141.
U.S. Appl. No. 16/909,899: Applicant Response to Pre-Exam Formalities Notice filed Sep. 8, 2020, 31 pages, Doc. 2142.
U.S. Appl. No. 16/909,899: Filing Receipt dated Sep. 10, 2020, 6 pages, Doc. 2143.
U.S. Appl. No. 16/909,899: Notice of Publication dated Dec. 17, 2020, 6 pages, Doc. 2161.
U.S. Appl. No. 12/830,236: Advisory Action dated Nov. 19, 2018, 7 pages, Doc. 1569.
U.S. Appl. No. 12/830,236: Request for Continued Examination filed Dec. 31, 2018, 30 pages, Doc. 1570.
U.S. Appl. No. 12/830,236: Issue Fee filed Jul. 1, 2019, 3 pages, Doc. 2152.
U.S. Appl. No. 12/830,236: Issue Notification dated Jul. 24, 2019, 1 page, Doc. 1575.
U.S. Appl. No. 16/459,930: Application filed Jul. 2, 2019, 99 pages, Doc. 1576.
U.S. Appl. No. 16/459,930: Filing Receipt and Notice to File Missing Parts and Filing Receipt dated Jul. 18, 2019, 7 pages, Doc. 1577.
U.S. Appl. No. 16/459,930: Applicant Response to Pre-Exam Formalities Notice filed Sep. 4, 2019, 22 pages, Doc. 1578.
U.S. Appl. No. 16/459,930: Filing Receipt dated Sep. 6, 2019, 5 pages, Doc. 1579.
U.S. Appl. No. 16/459,930: Notice of Publication dated Dec. 12, 2019, 1 page, Doc. 1580.
U.S. Appl. No. 13/625,812: Issue Notification dated Apr. 8, 2015, 1 page, Doc. 1641.
U.S. Appl. No. 14/641,735: Issue Fee filed Jul. 12, 2019, 8 pages, Doc. 2162.
U.S. Appl. No. 14/641,735: Issue Notification dated Aug. 7, 2019, 1 page, Doc. 1669.
U.S. Appl. No. 16/513,021: Application filed Jul. 16, 2019, 128 pages, Doc. 1670.
U.S. Appl. No. 16/513,021: Filing Receipt and Notice to File Missing Parts dated Jul. 30, 2019, 7 pages, Doc. 1671.
U.S. Appl. No. 16/513,021: Applicant Response to Pre-Exam Formalities Notice filed Sep. 11, 2019, 48 pages, Doc. 1672.
U.S. Appl. No. 16/513,021: Filing Receipt dated Sep. 12, 2019, 5 pages, Doc. 1673.
U.S. Appl. No. 16/513,021: Notice of Publication dated Dec. 19, 2019, 1 page, Doc. 1674.
U.S. Appl. No. 15/464,205: Non-Final Rejection dated Jul. 25, 2019, 142 pages, Doc. 1749.
U.S. Appl. No. 15/464,205: Response to Non-Final Rejection filed Oct. 22, 2019, 21 pages, Doc. 1750.
U.S. Appl. No. 15/464,205: Final Rejection dated Nov. 14, 2019, 50 pages, Doc. 1751.
U.S. Appl. No. 15/464,205: Response to Final Rejection filed Feb. 12, 2020, 18 pages, Doc. 1752.
U.S. Appl. No. 15/464,205: Advisory Action dated Feb. 25, 2020, 10 pages, Doc. 1753.
U.S. Appl. No. 15/464,205: Request for Continued Examination filed Mar. 5, 2020, 23 pages, Doc. 1754.
U.S. Appl. No. 15/464,205: Non-Final Rejection dated Mar. 27, 2020, 52 pages, Doc. 1755.
U.S. Appl. No. 15/464,205: Response to Non-Final Rejection, 19 pages, Doc. 1756.
U.S. Appl. No. 15/464,205: Final Rejection dated Sep. 3, 2020, 100 pages, Doc. 1757.
U.S. Appl. No. 15/464,205: Interview Summary dated Oct. 26, 2020, 8 pages, Doc. 1758.
U.S. Appl. No. 15/464,205: Response to Final Rejection filed Nov. 3, 2020, 21 pages, Doc. 1759.
U.S. Appl. No. 15/464,205: Advisory Action dated Nov. 16, 2020, 10 pages, Doc. 1760.
U.S. Appl. No. 15/464,205: Request for Continued Examination filed Nov. 20, 2020, 24 pages, Doc. 1761.
U.S. Appl. No. 15/240,964: e-Terminal Disclaimer Filed and Approved filed Feb. 8, 2019, 8 pages, Doc. 1848.
U.S. Appl. No. 15/240,964: Notice of Allowance dated Feb. 21, 2019, 276 pages, Doc. 1849.
U.S. Appl. No. 15/240,964: Issue Fee Payment filed May 16, 2019, 14 pages, Doc. 1851.
U.S. Appl. No. 15/240,964: Notice to File Corrected Application Papers filed May 16, 2019, 3 pages, Doc. 2153.
U.S. Appl. No. 15/240,964: List of References Cited by Applicant and Considered by Examiner filed Aug. 7, 2019, 1 page, Doc. 1854.
U.S. Appl. No. 15/240,964: Issue Notification dated Aug. 21, 2019, 1 page, Doc. 1855.
U.S. Appl. No. 16/427,054: Applicaton filed May 30, 2019, 68 pages, Doc. 1856.
U.S. Appl. No. 16/427,054: Filing Receipt and Notice to File Missing Parts dated Jun. 6, 2019, 7 pages, Doc. 1857.
U.S. Appl. No. 16/427,054: Applicant Response to Pre-Exam Formalities Notice filed Aug. 8, 2019, 21 pages, Doc. 1858.
U.S. Appl. No. 16/427,054: Filing Receipt dated Aug. 12, 2019, 5 pages, Doc. 1859.
U.S. Appl. No. 16/427,054: Notice of Publication dated Nov. 21, 2019, 1 page, Doc. 1860.
U.S. Appl. No. 16/427,054: Non-Final Rejection dated Nov. 9, 2020, 367 pages, Doc. 1861.
U.S. Appl. No. 16/427,054: Response to Non-Final Rejection dated Feb. 8, 2021, 22 pages, Doc. 2163.
U.S. Appl. No. 16/427,054: Terminal Disclaimer filed Feb. 8, 2021, 5 pages, Doc. 2164.
U.S. Appl. No. 16/710,731: Reissue Application filed Dec. 11, 2019, 91 pages, Doc. 1914.
U.S. Appl. No. 16/710,731: Filing Receipt dated Dec. 12, 2019, 5 pages, Doc. 1915.
U.S. Appl. No. 16/710,731: Request for Corrected Filing Receipt filed Feb. 19, 2020, 16 pages, Doc. 1916.
U.S. Appl. No. 16/710,731: Filing Receipt dated Feb. 24, 2020, 4 pages, Doc. 1917.
U.S. Appl. No. 16/710,731: Non-Final Rejection dated Nov. 24, 2020, 15 pages, Doc. 1918.
U.S. Appl. No. 16/048,113: Non-Final Rejection dated Oct. 2, 2020, 130 pages, Doc. 1924.
U.S. Appl. No. 16/048,113: Response to Non-Final Rejection dated Feb. 2, 2021, 22 pages, Doc. 2165.
U.S. Appl. No. 16/048,113: Terminal Disclaimer filed Oct. 2, 2020, 5 pages, Doc. 2166.
U.S. Appl. No. 15/411,823: Issue Fee Payment filed Oct. 15, 2018, 8 pages, Doc. 2004.
U.S. Appl. No. 15/411,823: Issue Notification dated Nov. 7, 2018, 1 page, Doc. 2008.

(56) References Cited

OTHER PUBLICATIONS

U.S. Appl. No. 16/164,430: Non-Final Rejection dated Oct. 18, 2019, 122 pages, Doc. 2014.
U.S. Appl. No. 16/164,430: Response to Non-Final Rejection filed Jan. 21, 2020, 15 pages, Doc. 2015.
U.S. Appl. No. 16/164,430: Notice of Allowance dated Mar. 6, 2020, 86 pages, Doc. 2016.
U.S. Appl. No. 16/164,430: Issue Fee Payment filed Jun. 8, 2020, 4 pages, Doc. 2017.
U.S. Appl. No. 16/164,430: Issue Notification dated Jun. 17, 2020, 1 page, Doc. 2154.
U.S. Appl. No. 16/164,430: Request for Certificate of Correction filed Sep. 3, 2020, 6 pages, Doc. 2021.
U.S. Appl. No. 16/164,430: Certificate of Correction filed Oct. 6, 2020, 1 page, Doc. 2023.
U.S. Appl. No. 16/898,134: Application filed Jun. 10, 2020, 84 pages, Doc. 2024.
U.S. Appl. No. 16/898,134: Filing Receipt and Notice to File Missing Parts dated Jun. 19, 2020, 8 pages, Doc. 2025.
U.S. Appl. No. 16/898,134: Applicant Response to Pre-Exam Formalities Notice filed Aug. 18, 2020, 39 pages, Doc. 2026.
U.S. Appl. No. 16/898,134: Filing Receipt dated Aug. 21, 2020, 6 pages, Doc. 2027.
U.S. Appl. No. 16/898,134: Notice of Publication dated Nov. 27, 2020, 2 pages, Doc. 2028.
U.S. Appl. No. 13/030,084: Issue Notification dated Jan. 16, 2016, 1 page, Doc. 2086.
U.S. Appl. No. 16/164,535: Notice to File Corrected Application Papers and Filing Receipt dated Nov. 7, 2018, 7 pages, Doc. 2119.
U.S. Appl. No. 16/164,535: Applicant Response to Pre-Exam Formalities Notice filed Jan. 7, 2019, 27 pages, Doc. 2120.
U.S. Appl. No. 16/164,535: Filing Receipt dated Jan. 11, 2019, 5 pages, Doc. 2121.
U.S. Appl. No. 16/164,535: Notice of Publication dated Apr. 25, 2019, 1 page, Doc. 2122.
U.S. Appl. No. 16/164,535: Non-Final Rejection dated Nov. 24, 2020, 76 pages, Doc. 2123.
U.S. Appl. No. 16/164,535: Response to Non-Final Rejection filed Feb. 19, 2021, 17 pages, Doc. 2169.
U.S. Appl. No. 16/164,535: Terminal Disclaimer filed Feb. 19, 2021, 6 pages, Doc. 2170.
U.S. Appl. No. 16/209,872/312 Amendment After filed Apr. 30, 2021, 11 pages, Doc 2245.
U.S. Appl. No. 16/209,872/Notice of Allowance/Allowability dated Jun. 10, 2021, 4 pages, Doc 2297.
U.S. Appl. No. 16/209,872/Request for Continued Examination and Amendment filed Jun. 25, 2021, 17 pages, Doc 2299.
U.S. Appl. No. 16/379,674/Final Office Action dated Apr. 9, 2021, 21 pages, Doc 2301.
U.S. Appl. No. 16/379,674/Request for Continued Examination, Amendment and Terminal Disclaimer filed Jul. 1, 2021, 25 pages, Doc 2302.
U.S. Appl. No. 16/459,930/Non-final Office Action dated Jun. 9, 2021, 17 pages, Doc 2304.
U.S. Appl. No. 16/513,021/Non-final Office Action dated May 5, 2021, 36 pages, Doc 2290.
U.S. Appl. No. 15/464,205/Notice of Allowance/Allowability dated May 26, 2021, 20 pages, Doc 2305.
U.S. Appl. No. 16/710,731/Non-Final Rejection dated Apr. 21, 2021, 11 pages, Doc 2292.
U.S. Appl. No. 16/048,113/Issue Fee Payment and 312 Response filed Jul. 6, 2021, 12 pages, Doc 2307.
U.S. Appl. No. 16/898,134/Non-final Office Action dated Jun. 30, 2021, 57 pages, Doc 2308.
U.S. Appl. No. 16/164,535/Request for Continued Examination and Amendment filed Jun. 17, 2021, 58 pages, Doc 2309.
U.S. Appl. No. 16/164,535/Notice of Allowance/Allowability and Examiner-Initialed SB08 Listing dated Jul. 8, 2021, 20 pages, Doc 2311.
Jaiswal, "Local Pattern Transformation Based Feature Extraction Techniques for Classification of Epileptic EEG Signals", Biomedical Signal Processing and Control (2017) pp. 81-92, 12 pages, Doc 2205.
Minn, "Linear Transformation of Multi-Level Signal Set in Multi-Code CDMA", IEEE (2001) pp. 1239-1243, 5 pages, Doc 2214.
Murray, "Code Transformation and Instruction Set Extension", Journal of the Association for Computing Machinery (2009) pp. 1-31, 32 pages, Doc 2215.
Rizum, "Code Transformation by Direct Transformation of ASTs", Journal of the Association for Computing Machinery (2015) pp. 1-7, 7 pages, Doc 2220.
Spinellis, "Declarative Peephole Optimization Using String Pattern Matching", Journal of the Association for Computing Machinery (1999) pp. 47-51, 5 pages, Doc 2229.
Stefanov "Algorithmic Transformation Techniques for Efficient Exploration of Alternative Application Instances" Journal for the Association for Computing Machinery (ACM) (2002) pp. 7-12, 6 pages, Doc 2234.
U.S. Appl. No. 16/209,872/Notice of Allowance and Allowability dated Mar. 26, 2021, 17 pages, Doc 2171.
U.S. Appl. No. 17/158,804/Filing Receipt dated Feb. 9, 2021, 5 pages, Doc 2172.
U.S. Appl. No. 17/158,804/Notice of Publication dated Feb. 9, 2021, 1 page, Doc 2246.
U.S. Appl. No. 16/379,674/Response to Office Action filed Feb. 19, 2021, 21 pages, Doc 2173.
U.S. Appl. No. 16/379,674/Final Office Action dated Apr. 5, 2021, 21 pages, Doc 2289.
U.S. Appl. No. 16/710,577/Non-final Office Action dated Mar. 19, 2021, 11 pages, Doc 2174.
U.S. Appl. No. 16/459,930/Non-Final Rejection dated Oct. 6, 2020, 43 pages, Doc 1581.
U.S. Appl. No. 16/459,930/Response to Non-Final Rejection filed Mar. 8, 2021, 19 pages, Doc 2175.
U.S. Appl. No. 15/464,205/Notice of Allowance/Allowability filed May 26, 2020, 20 pages, Doc 2291.
U.S. Appl. No. 16/427,054/Final Office Action dated Mar. 25, 2021, 22 pages, Doc 2176.
U.S. Appl. No. 16/710,731/Non-Final Rejection dated Nov. 24, 2020, 21 pages, Doc 2177.
U.S. Appl. No. 16/710,731/Response to Non-Final Rejection filed Mar. 23, 2021, 21 pages, Doc 2307.
U.S. Appl. No. 16/048,113/Notice of Allowance/Allowability dated Apr. 6, 2021, 75 pages, Doc 2293.
U.S. Appl. No. 16/164,535/Notice of Allowance/Allowability dated Feb. 19, 2021, 6 pages, Doc 2295.

* cited by examiner

| Natural # | BEL Trees |
|---|---|
| 0 |  |
| 1 |  |
| 2 |  |
| 3 |  |
| 4 |  |
| 5 |  |
| 6 |  |

P(1) = 2

P(2) = 3

P(3) = 5

P(4) = 7

P(2k − 1)

P(2k)

MANIPULATION AND/OR ANALYSIS OF HIERARCHICAL DATA

RELATED APPLICATION

This application claims priority to U.S. Provisional Patent Application Ser. No. 60/675,987 filed Apr. 29, 2005, entitled MANIPULATION AND/OR ANALYSIS OF HIERARCHICAL DATA, assigned to the assignee of claimed subject matter.

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

Figure 1:
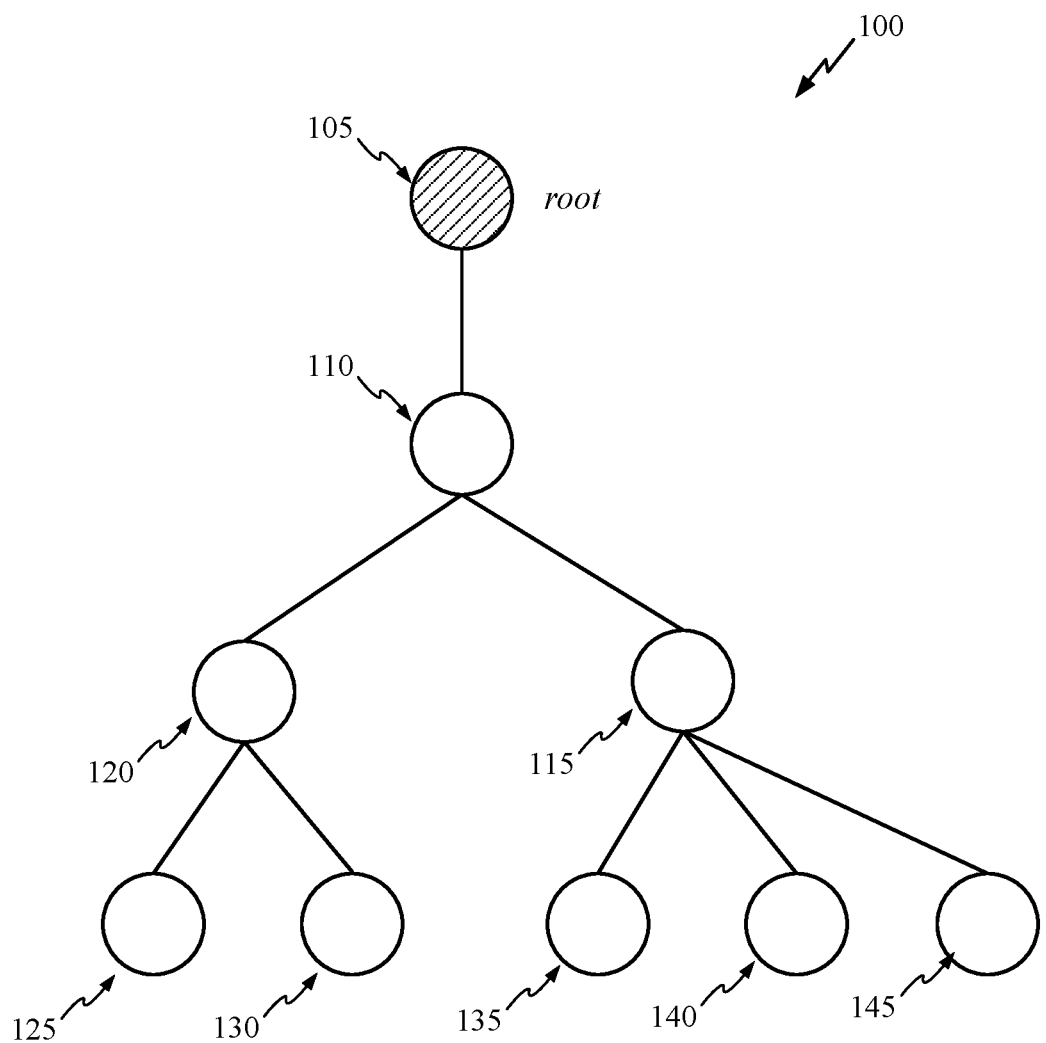
FIG. 1 is a schematic diagram of one embodiment of a tree.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "transforming," "converting," "factoring," "enumerating," "representing," "storing," "associating," "substituting," "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices. Further, unless specifically stated otherwise, processes described herein, with reference to flow diagrams or otherwise, may also be executed and/or controlled, in whole or in part, by such a computing platform.

In a variety of fields, data or sets of data may be represented in a hierarchical fashion. This form of representation may, for example, convey information, such as particular relationships between particular pieces of data and the like. However, manipulating such data representations is not straight forward, particularly where the data is arranged in a complex hierarchy. Without loss of generality, one example may include a relational data base. Techniques for performing operations on such a data base for example, may be computationally complex or otherwise cumbersome. A continuing need, therefore, exists for additional techniques for manipulating data hierarchies.

As previously discussed, in a variety of fields, it is convenient or desirable to represent data, a set of data and/or other information in a hierarchical fashion. In this context, such a hierarchy of data shall be referred to as a "tree." In a particular embodiment, a tree may comprise a finite, rooted, connected, unordered, acyclic graph. This is illustrated here, for example, in FIG. 1 by embodiment 100. As illustrated, the root of this particular embodiment encompasses node 105. In addition to 105, there are eight other nodes designated 110 to 140, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete backtracking loop. Here, unordered refers to the notion that there is no implied ordering or precedence among nodes attached to a common node, despite the appearance of ordering in a graphical illustration.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data or values may be limited to binary data, that is, in this example, either a binary one or a binary zero. Here, such an embodiment may be referred to as a binary edge labeled tree (BELT), as shall be discussed in more detail hereinafter.

Figure 2:
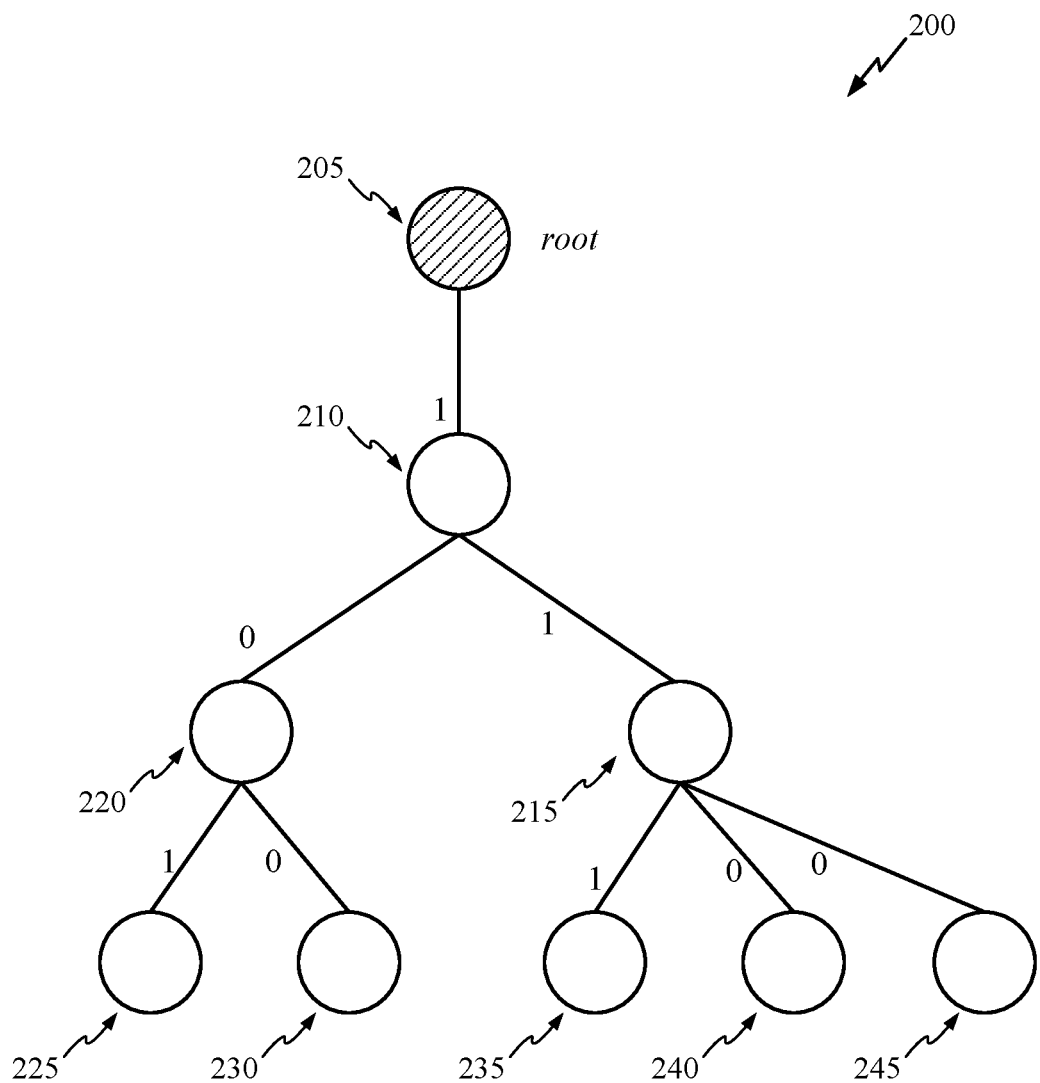
FIG. 2 is a schematic diagram illustrating one embodiment of a binary edge labeled tree (BELT)
Figure 3:
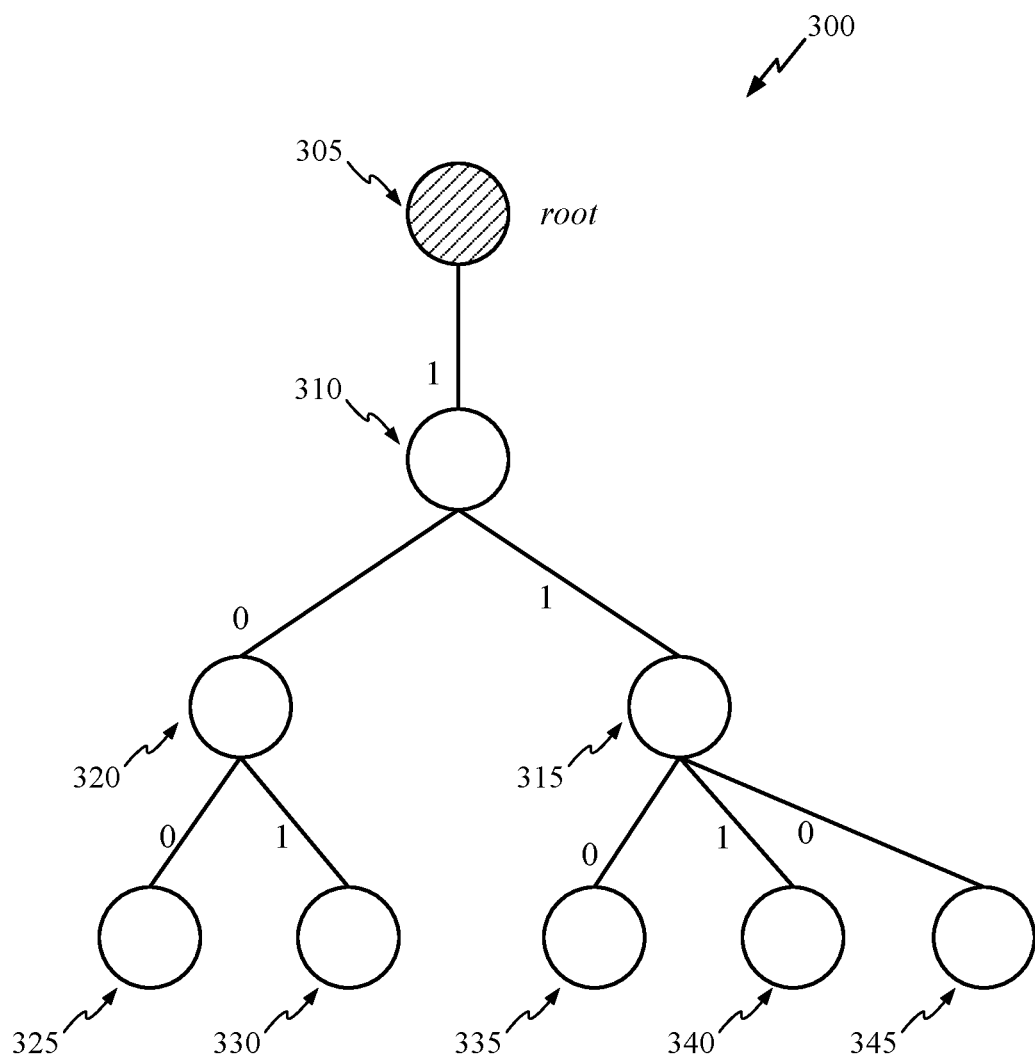
FIG. 3 is a schematic diagram illustrating another embodiment of a BELT.

One example of a BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different binary edge labeled tree. It is noted that this tree is similar to the embodiment of FIG. 2. Without belaboring the present discussion, additional descriptions of how BELTs may represent a hierarchy of data may be found in U.S. patent application Ser. No. 11/005,859, filed on Dec. 6, 2004, by J. J. LeTourneau, titled, "Manipulating Sets of Hierarchical Data," assigned to the assignee of the subject matter claimed herein.

Figure 4:
FIG. 4 is a table illustrating a particular embodiment of an association between natural numerals and BELTs.
Figure 4:
Figure 4:
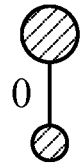
Figure 4:
Figure 4:
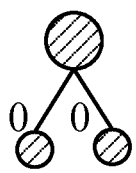
Figure 4:
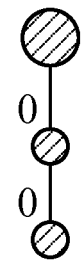
Figure 4:
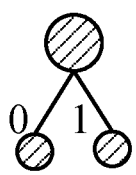

The terms "non-composite numeral" and "primary numeral" shall be used interchangeably herein. Being trees, BELTs may also be enumerated. Thus, for this particular embodiment, although claimed subject matter is not limited in scope in this respect, a method of enumerating a set of trees begins with enumeration of an empty binary edge labeled tree and a one node binary edge labeled tree. Here, the empty tree is associated with the zero and has a symbolic representation as illustrated in FIG. 4 (circle). Likewise, the one node tree, which holds no data, is associated with the numeral one and has a graphical representation of a single node. For higher positive natural numerals, however, this embodiment of a method of enumerating a set of trees comprises positioning a tree at location k, k being a positive numeral greater than three, where k is the product of u and v, u and v comprising positive numerals greater than one, such that the tree is formed by a union of the trees at positions u and v. Likewise, for those locations that are not a product of other natural positive numerals greater than one, that is, for locations that comprise non-composite numerals, denoted here by j, for example, j being a positive natural numeral greater than one, a tree is positioned at location j such that the tree is formed by finding the first tree in the prior enumeration such that the binary edge labeled tree obtainable from this first tree by attaching a node to the particular tree as a new root node and labeling the edge between the new root node and the prior root node with a binary "0" label is not in the enumeration at some position lower than j; however, if the binary edge labeled tree obtainable from that first tree, as just described, is present in the enumeration with a binary "0" label for the new edge, but not with a binary "1" label, then the tree at position j is that tree with a binary "1" label for the new edge. This may be illustrated, for example in FIG. 4, as described in more detail below.

However, for this particular embodiment, although claimed subject matter is not limited in scope in this respect, a method of enumerating a set of ordered trees may begin with enumeration of an empty binary edge labeled tree and a one node binary edge labeled tree. Thus, the empty tree is associated with numeral zero and has a symbolic representation as illustrated in FIG. 4 (circle). Likewise, the one node tree, which holds no data, is associated with numeral one and has a graphical representation of a single node. For higher positive natural numerals, ordered trees may be generated by a process described, for example, in "The Lexicographic Generation of Ordered Trees," by S. Zaks, The Journal of Theoretical Computer Science, Vol. 10(1), pp. 63-82, 1980, or "Enumerating Ordered Trees Lexicographically," by M. C. Er, Computation Journal, Vol. 28, Issue 5, pp. 538-542, 1985.

As illustrated, for this particular embodiment, and as previously described, the empty tree has zero nodes and is associated with numeral zero. Likewise, the one node tree root comprises a single node and is associated with numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, in order to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the numeral two. Likewise, to obtain the binary edge labeled tree for position five, begin with the binary edge labeled tree for position two and follow the previously articulated approach of adding a root and an edge and labeling it with a binary zero.

Figure 5:
FIG. 5 is a table illustrating a portion of the Kleene enumeration of non-composite numerals.

In this context, adding a root node and an edge and labeling it binary zero is referred to as a "zero-push" operation and adding a root node and an edge and labeling it binary one is referred to as a "one-push" operation. Based at least in part on the prior description, for this particular embodiment, it may now be demonstrated that if k is any positive natural numeral and a tree x is positioned at location k, then a non-composite numeral is associated with the zero-push of that tree and a non-composite numeral is associated with the one-push for that tree. Furthermore, the non-composite index of the zero-push of the tree comprises 2k−1, whereas the non-composite index of the one-push of the tree comprises 2k, where the index corresponds to the argument of the well-known Kleene enumeration on positive natural numerals of non-composite numerals, as illustrated, for example, in part in FIG. 5. Thus, referring again to FIG. 4, the one-push of the root tree is the tree at position three. This follows from FIG. 5 since P(2*1)=P(2)=3. Likewise, the tree at position five is the zero-push of the tree at position 2. Again, this follows from FIG. 5 since P(2*2−1)=P(3)=5.

In this context, the approach just described may be referred to as vectorizing non-composite numerals. In the embodiment just described, this was accomplished in pairs, although, of course, claimed subject matter is not limited in scope in this respect. This may be accomplished in any number of numeral combinations, such as triplets, quadruplets, etc. Thus, using a quadruplet example, it is possible to construct trees such that if k is any positive natural numeral and a tree x is positioned at location k, then a non-composite numeral is associated with the zero-push of that tree, a non-composite numeral is associated with the one-push for that tree, a non-composite numeral is associated with the two-push for that tree, and a non-composite number is associated with the three-push for that tree. Furthermore, the index of the non-composite numeral is such that for a zero-push of the tree, the index comprises (4k−3), for a one-push of a tree, the index comprises (4k−2), for a two-push of a tree, the index comprises (4k−1), and for a three-push of a tree the index comprise (4k), where the index corresponds to the Kleene enumeration of non-composite numerals, P(index), such as provided in FIG. 5.

In the previously described enumeration of binary edged labeled trees, a mechanism may be employed to reduce or convert and/or transform complex manipulations of hierarchical data to multiplication of natural numerals. For example, if it is desired to combine, or merge at their roots, two trees of hierarchical data, a complex task both computationally and graphically, instead, for this particular embodiment, the two trees may be transformed to numerical data by using the previously described association embodiment between binary edge labeled trees and natural numerals. The resulting numerical data from the prior conversion may then be multiplied, and the resulting product may then be transformed to a binary edge labeled tree by using a table look up of the previously described association embodiment. It is noted that a subtle distinction may be made between an enumeration embodiment and an association embodiment. Enumeration may comprise listing, in this example, a particular ordered embodiment of BELTs, whereas an association provides a relationship between, in this example, a particular ordered embodiment of BELTs and natural numerals. It is, of course, appreciated that many different enumeration and association embodiments may be employed to execute the operations discussed above and hereinafter, and claimed subject matter is intended to cover all such enumeration and association embodiments.

Likewise, a process embodiment that is a reversal to the previously described embodiments may also be employed. Thus, complex hierarchies of data may be split or divided, when this is desired. For example, a binary edge labeled tree to be divided may be transformed to a piece of numerical data, such as by using the previously described association embodiment. This data may then be factored into two pieces of numerical data whose product produces the previously mentioned piece of numerical data. These two pieces of numerical data may then be transformed to trees, again, by using the prior association embodiment, for example.

Another form of manipulating hierarchical sets of data may involve ordering or hashing. This may be desirable for any one of a number of different operations to be performed on the sets of data. One approach is similar to the previously described embodiment. For example, it may be desired to order a given set of trees. Doing so may involve transforming the trees to numerical data, as previously described, using an association embodiment. The numerical data may then be ordered and the numerical data may then be transformed back to binary edge labeled trees using the previously described association embodiment, or an alternate association embodiment, for example.

It is noted that there may be any one of a number of different ways of transforming from numerals or numerical data values to a binary edge labeled tree or from a binary string to a binary edge labeled tree, and vice-versa. Nonetheless, a convenient method for doing so with this particular embodiment includes storing an array providing an association embodiment between natural numerals, binary strings and binary edge labeled trees, such as the embodiment previously described. Thus, once it is desired to convert from one to the other, such as from a binary string to a BELT, from a natural numeral to a BELT, or vice-versa, for example, a table look up operation may be performed using the association embodiment.

Techniques for performing table look ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store an array as just described, although, claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that claimed subject matter cover such embodiments.

Much of the prior discussion was provided in the context of binary edge labeled trees. Nonetheless, as alluded to previously, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing binary edge labeled trees, the previously described embodiments may alternatively be performed using binary node labeled trees. As one example embodiment, operations and/or manipulations may be employed using binary edge labeled trees and then the resulting binary edge labeled tree may be converted to a binary node labeled tree. However, in another embodiment, operations and/or manipulations may be performed directly using binary node labeled trees where a different association embodiment, that is, in this example, one that employs binary node labeled trees, is employed.

In accordance with claimed subject matter, therefore, any tree, regardless of whether it is binary edge labeled, binary node labeled, non-binary, a feature tree, or otherwise, may be manipulated and/or operated upon in a manner similar to the approach of the previously described embodiments. Typically, different association embodiments shall be employed, depending at least in part, for example, upon the particular type of tree. For example, and as shall be described in more detail below in connection with FIG. 6, a node labeled tree in which the nodes are labeled with natural numerals or data values may be converted to a binary edge labeled tree. Furthermore, this may be accomplished with approximately the same amount of storage. For example, for this particular embodiment, this may involve substantially the same amount of node and/or edge data label values.

Figure 6:
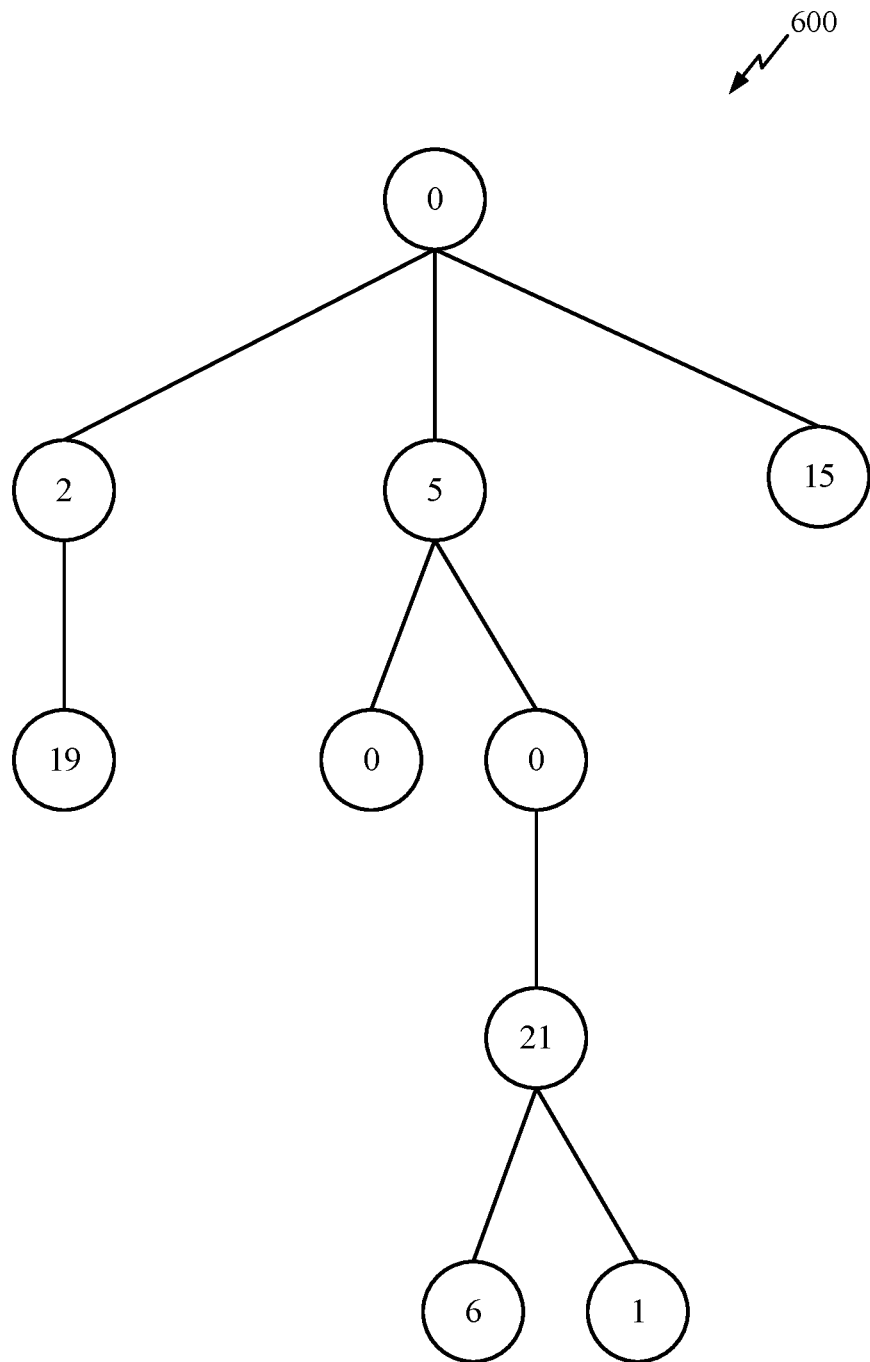
FIG. 6 is a schematic diagram of an embodiment of a node labeled tree.

As previously noted, claimed subject matter is not limited in scope to this particular example, however, as illustrated in more detail hereinafter, the tree illustrated in FIG. 6 is converted to a binary edge labeled tree through a sequence of processing depicted here as graph operations, although such a conversion may alternatively be implemented by operations implemented otherwise, one such example being a computing platform, for example. Alternatively, it may be desirable, depending upon the particular embodiment, to convert trees to, for example binary node labeled trees. Likewise, other embodiments in which trees of one form are converted to trees of another form are also included within the scope of the claimed subject. However, for this particular embodiment, it will be assumed that the association between trees and numerals, such as previously described, is depicted or enumerated in terms of binary edge labeled trees, as previously illustrated, for example. Thus, in this example, a particular tree, embodiment 600, is illustrated in FIG. 6, comprises a node labeled tree rather than an edge labeled tree. Without belaboring the present discussion, a process of converting a node labeled tree such as that illustrated in FIG. 6 to a BELT may be found in U.S. patent application Ser. No. 11/005,859, filed on Dec. 6, 2004, by J. J. LeTourneau, titled, "Manipulating Sets of Hierarchical Data," assigned to the assignee of the presently claimed subject matter.

Figure 7:
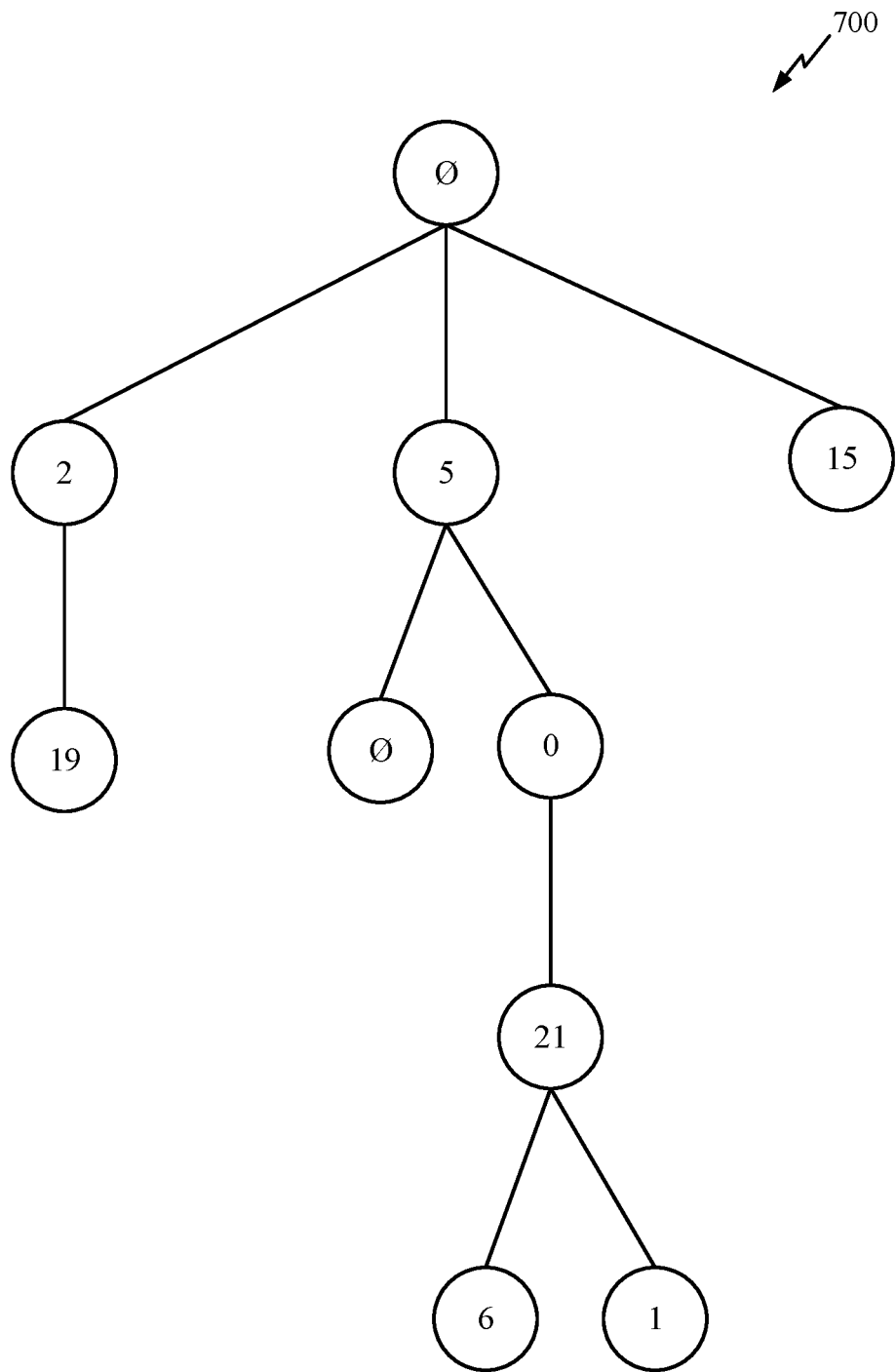
FIG. 7 is a schematic diagram illustrating another embodiment of a node labeled tree.

In another embodiment, however, a particular tree may include null types or, more particularly, some node values denoted by the empty set. This is illustrated, for example, by the tree in FIG. 7, although, of course, this is simply one example. An advantage of employing null types includes the ability to address a broader array of hierarchical data sets. For example, without loss of generality and not intending to limit the scope of claimed subject matter in any way, a null type permits representing in a relational database, as one example, situations where a particular attribute does not exist. As may be appreciated, this is different from a situation, for example, where a particular attribute may take on a numeral value of zero. Thus, it may be desirable to be able to address both situations when representing, operating upon and/or manipulating hierarchical sets of data. A tree with nulls may be converted to a tree without nulls as described in U.S. patent application Ser. No. 11/005,859, filed on Dec. 6, 2004, by J. J. LeTourneau, titled, "Manipulating Sets of Hierarchical Data," assigned to the assignee of the presently claimed subject matter.

Likewise, in an alternative embodiment, a node labeled tree may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied. Furthermore, for one embodiment, a tree in which nodes are labeled with numerals or numerical data, rather than binary data, may be transformed to a binary edge labeled tree and/or binary node labeled tree, and, for another embodiment, a tree in which edges are labeled with numerals or numerical data, rather than binary data, may be transformed to a binary edge labeled tree and/or binary node labeled tree.

Furthermore, a tree in which both the nodes and the edges are labeled may be referred to in this context as a feature tree and may be transformed to a binary edge labeled tree and/or binary node labeled tree. For example, without intending to limit the scope of claimed subject matter, in one approach, a feature tree may be transformed by converting any labeled node with its labeled outgoing edge to an ordered pair of labels for the particular node. Using the embodiment described above, this tree may then be transformed to a binary edge labeled tree.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be transformed to binary edge labeled trees, such as by applying the previously described embodiment, for example.

As previously described, trees may be employed to graphically represent a hierarchy of data or a hierarchy of a set of data. This has been illustrated in some detail for binary edge labeled trees, for example. As the previous figures, illustrate, however, such graphical hierarchical representations typically employ two spatial dimensions to depict the relationship among different pieces of data. This may be disadvantageous in some situations where a one dimensional representation or arrangement of symbols, such as is employed with alphabetic letters, for example, that are combined to create a linear collection of successive symbols or notations, such as words, would be more convenient.

According to an embodiment, a tree may comprise one or more "subtrees" coupled at the root node of the tree. A subtree of a larger tree may comprise a "subtree root" node other than the root node of the larger and independently have properties of a tree, except that the subtree is part of the larger tree. In addition to a subtree root node, a subtree comprises terminal nodes of a larger tree which descend from the subtree root node, and edges and intermediate nodes connecting these terminal nodes with the subtree root node. In one embodiment, the subtree root node may be connected to the root node of the larger tree by a single edge. In another embodiment, the subtree node may be coupled to the root node of the larger tree by two or more edges and one or more intermediate nodes coupled between the root node of the larger tree and the subtree root node. While a subtree may comprise a portion of a larger tree, the size and shape of the subtree may express information like that of a tree having the same size and shape as the subtree. Subtrees coupled together at the root node of a larger tree may be referred to as "subtree children" of the root node where a subtree may be referred to as a "subtree child" of the tree in this embodiment.

According to an embodiment, a tree may comprise one or more "partial subtrees" (PSTs) representing at least a portion of the hierarchical data represented by the tree. Here, a PST may a subset of the nodes of a larger tree. This subset of nodes is connected by edges and a single node of the subset of nodes provides a "root" node of the PST. In a particular embodiment, a PST may represent a set of data and/or other information in a hierarchical fashion and may be represented as a finite, rooted, connected, unordered and acyclic graph. Accordingly, a PST has properties of a tree as illustrated above with reference to FIGS. 1-7, except that the PST is a part of a larger tree. As such, in a particular embodiment, any labels associated with nodes and edges in the full tree may also be associated with corresponding nodes and edges in any component PST. Also, in a particular embodiment, such a component PST may be represented by a natural numeral according to an association of natural numerals and trees such as that illustrated above with reference to FIG. 4, for example. However, this is merely an example of how a PST may be associated with a numeral according to a particular association embodiment and claimed subject matter may cover associations of PSTs to numerals according to other association embodiments. Unlike a subtree, a PST need not comprise terminal nodes of the larger tree. According to an embodiment, a PST may comprise a "rooted PST" (RPST) having properties of a PST with the additional feature that the root node of the RPST is the same as the root node of the larger tree.

Since a tree is finite, there are a finite number of paths between a root node of the tree and other nodes in the tree. Similarly, there are a finite number of combinations of paths between the root node of a tree and individual ones of the other nodes in the tree. Accordingly, in a particular embodiment, a finite number of RPSTs may be enumerated from a tree having a root node. Numerals may be associated with the enumerated RPSTs based, at least in part, on an association between trees and natural numerals such as, for example, illustrated above with reference to FIG. 4. However, this is merely an example of how RPSTs may be associated with numerals according to a particular embodiment and claimed subject matter is not limited in this respect.

According to an embodiment, the enumerated RPSTs of a tree may be represented as a "set" containing a collection of unordered elements. In a particular embodiment, the elements of the set of enumerated RPSTs may contain as elements natural numerals representing individual ones of the enumerated RPSTs according to the aforementioned association between trees and numerals. The elements of such a set may be alternatively expressed as graphical representations of the individual ones of the enumerated RPSTs. In a particular embodiment, a one-to-one mapping may relate elements of the set of RPSTs expressed as natural numerals and elements of the set of RPSTs expressed as graphical representations. Here, such a mapping may enable transforming graphical representations of RPSTs to corresponding natural numerals and manipulation of such natural numerals to provide resulting natural numerals. The resulting natural numerals may then be transformed back to graphical representations. However, these are merely examples of how a set of enumerated RPSTs may be expressed and claimed subject matter is not limited in these respects.

The term "depth" referred to herein in connection with a tree means the longest separation between the tree's root node and a terminal node of the tree. In a particular embodiment, although claimed subject matter is not limited in this respect, a depth may be quantified as a number of successively descending nodes are connected to the root node. In tree 100 of FIG. 1, for example, root node 105 is separated from terminal node 125 by three successively descending nodes, nodes 110, 120 and 125. However, quantifying a depth of a tree by a number of nodes between the root node and the furthest terminal node of the tree is merely an example of how depth may be quantified for a particular embodiment, and claimed subject matter is not limited in these respects.

As illustrated above, a tree is capable of storing, expressing and/or representing hierarchical data. As such, in particular embodiments of trees, it may be desirable to locate and/or detect particular elements and/or aspects of hierarchical data which is capable of being stored, expressed and/or represented in a tree. In one particular example, a tree may store, express and/or represent hierarchical data that is in a document that may comprise a piece of information that is of interest. In another embodiment, a tree may store, express and/or represent features of a pattern as hierarchical data where one or more features of the pattern may be of interest. Techniques for locating and/or detecting hierarchical data in a tree may include, for example, executing a process to traverse nodes of a tree that is stored in a memory. Such techniques may be computationally intensive.

According to an embodiment, a "target tree" may comprise hierarchical data that may or may not include a particular piece of information of interest. An embodiment of a process may represent portions of the tree as one or more "target numerals" according to an association of trees and numerals. The particular piece of information of interest may be represented as a probe numeral that is compared with the one or more target numerals to determine a match. In one embodiment, although claimed subject matter is not limited in this respect, such a match may indicate a presence of a particular piece of information that is of interest.

In a particular embodiment, although claimed subject matter is not limited in this respect, a piece of information of interest may be stored, expressed and/or represented as a "probe tree" having nodes and/or edges and having properties of a tree. As such, a probe tree may be associated with a "probe numeral" according to an association of trees and numerals such as that illustrated above with reference to FIG. 4, for example. In particular embodiments, the piece of information of interest may also be associated with a probe numeral irrespective of any representation and/or expression of the piece of information of interest as a probe tree. In one particular embodiment, although claimed subject matter is not limited in this respect, a probe tree and/or probe numeral may represent a query for locating and/or detecting a piece of information of interest that is represented in a tree. However, this is merely an example of how a probe tree and/or probe numeral may be applied in a particular embodiment and claimed subject matter is not limited in this respect.

Figure 8:
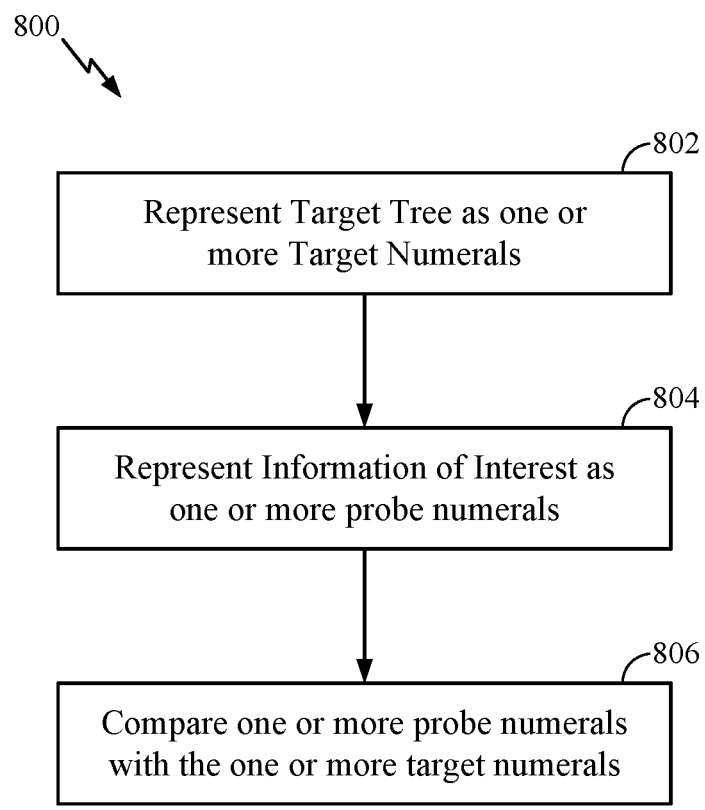
FIG. 8 is a flow diagram illustrating a process embodiment to detect and/or locate information in hierarchical data of a target tree according to an embodiment.

FIG. 8 is a flow diagram illustrating a process embodiment 800 to detect and/or locate information in hierarchical data of a target tree according to an embodiment. Block 802 represents a target tree as one or more numerals according to an association of trees and numerals. According to a particular embodiment of block 802, a computing device and/or computing platform may be used to represent the target tree as one or more target numerals according to an association of trees and numerals. Here, for example, such a computing device and/or computing platform may comprise one or more processors with a limited native word size. In executing processes to determine the target numerals, the one or more processors may also comprise limited memory. Also, as described in the aforementioned U.S. patent application Ser. No. 11/005,859, particular embodiments of enumerating numerals associated with trees may employ the use of non-composite numerals. Implementations of particular processes to enumerate such numerals associated with trees may only be capable of generating non-composite numerals up to a predetermined maximum non-composite numeral. Accordingly, a particular implementation of process embodiment 800, although claimed subject matter is not limited in this respect, may entail partitioning the target tree into smaller trees comprising clusters and/or subsets of the nodes making up the larger target tree. Block 802 may then determine the one or more target numerals based, at least in part, on numerals associated with the smaller trees according to an association of trees and numerals.

Block 804 represents information of interest as a probe numeral. Here, the information of interest may be represented and/or expressed as a probe tree as discussed above. Accordingly, block 804 may represent the information of interest as a probe numeral that is associated with the probe tree according to an association of trees and numerals such as that illustrated above with reference to FIG. 4, for example. However, this is merely an example of how a probe tree may be associated with a numeral according to a particular association embodiment, and claimed subject matter is not limited in these respects. Having properties of a tree, according to a particular embodiment, a probe tree may comprise nodes which are connected by edges in addition to node and/or edge label values. In particular embodiments, a target tree may comprise large amounts of data and be much larger than a probe tree. However, this is merely a comparison of a target tree and a probe tree in a particular embodiment and claimed subject matter is not limited in these respects. Further, a probe tree comprises a root node, and may comprise one or more terminal nodes. Although claimed subject matter is not limited in this respect, block 804 may employ techniques illustrated in the aforementioned U.S. patent application Ser. No. 11/005,859 to associate a probe tree with a probe numeral according to an association of trees and numerals.

Block 806 compares the probe numeral determined at block 804 with the one or more numerals representing the target tree to find a match. If a match is found, process 800 may determine that the target tree comprises the information of interest that is represented by the probe numeral.

Figure 9:
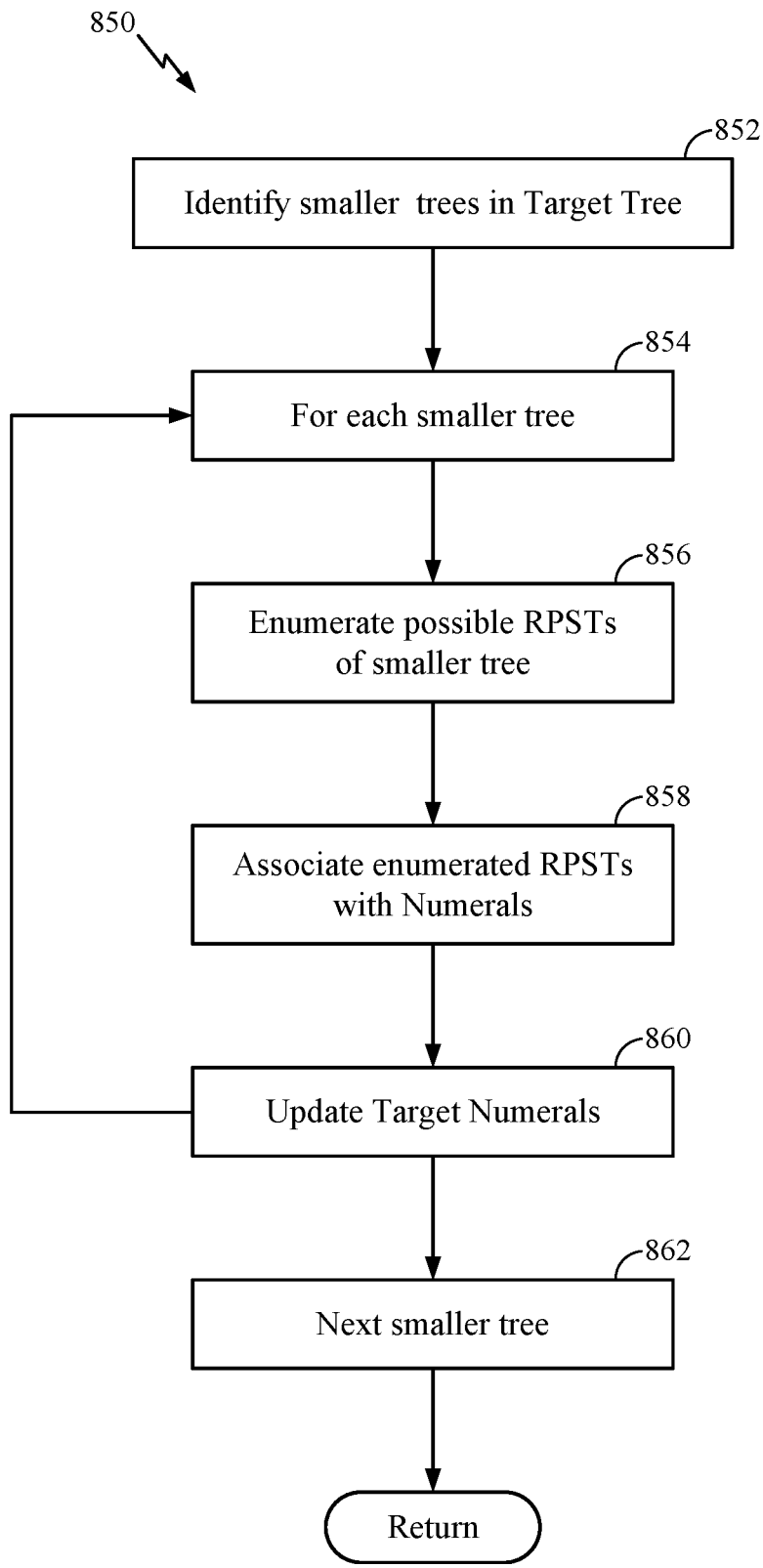
FIG. 9 is a flow diagram illustrating a process embodiment to represent a target tree as one or more numerals according to an embodiment of the process illustrated in FIG. 8.

FIG. 9 is a flow diagram illustrating a process embodiment 850 to represent a target tree as one or more numerals according to an embodiment of the process embodiment illustrated in FIG. 8. According to an embodiment, although claimed subject matter is not limited in this respect, process 850 may generate target numerals for an array. Block 806 (FIG. 8) may then compare the probe numeral with target numerals in the array for determining a match. Block 852 identifies smaller trees in the target tree. Process embodiment 850 generates the target numerals for the array through sequential iteration of blocks 854 through 862. Here, for each smaller tree identified at block 852, block 856 may enumerate possible RSPTs of the smaller tree as illustrated below with reference to a particular embodiment and in U.S. Provisional Patent Application No. 60/640,427, titled "Enumeration of Rooted Partial Subtrees" by Karl Schiffmann, J. J. LeTourneau and Mark Andrews, filed on Dec. 30, 2004.

Block 858 may then associate the enumerated RPSTs with numerals according to an association of trees and numerals as illustrated below and in the aforementioned U.S. Provisional Application No. 60/640,427. Numerals determined at block 858 may then be combined with numerals in the array of target numerals at block 860 to provide an updated array.

Figure 10A:
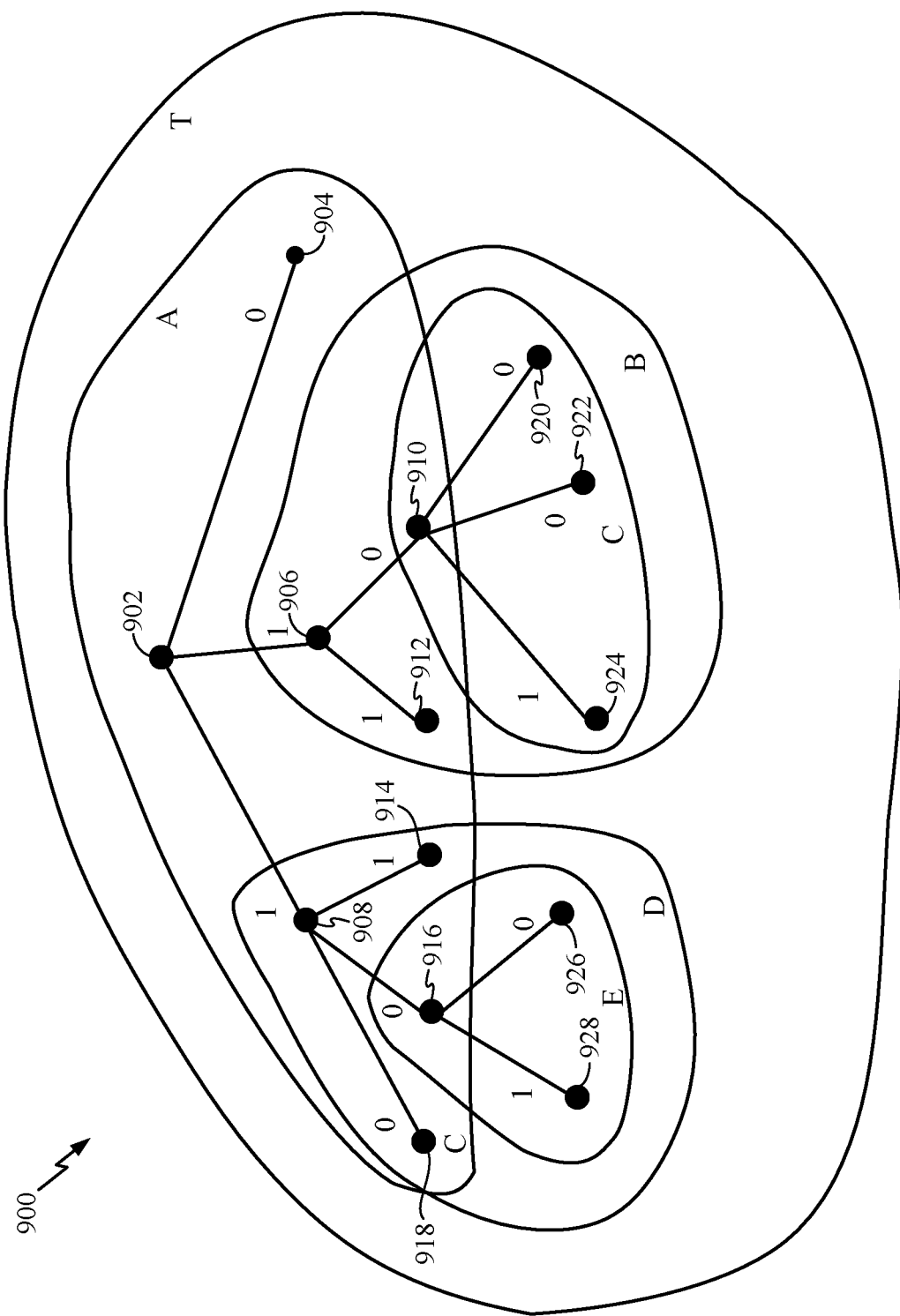
FIG. 10A is a schematic diagram of a target tree according to an embodiment.
Figure 10B:
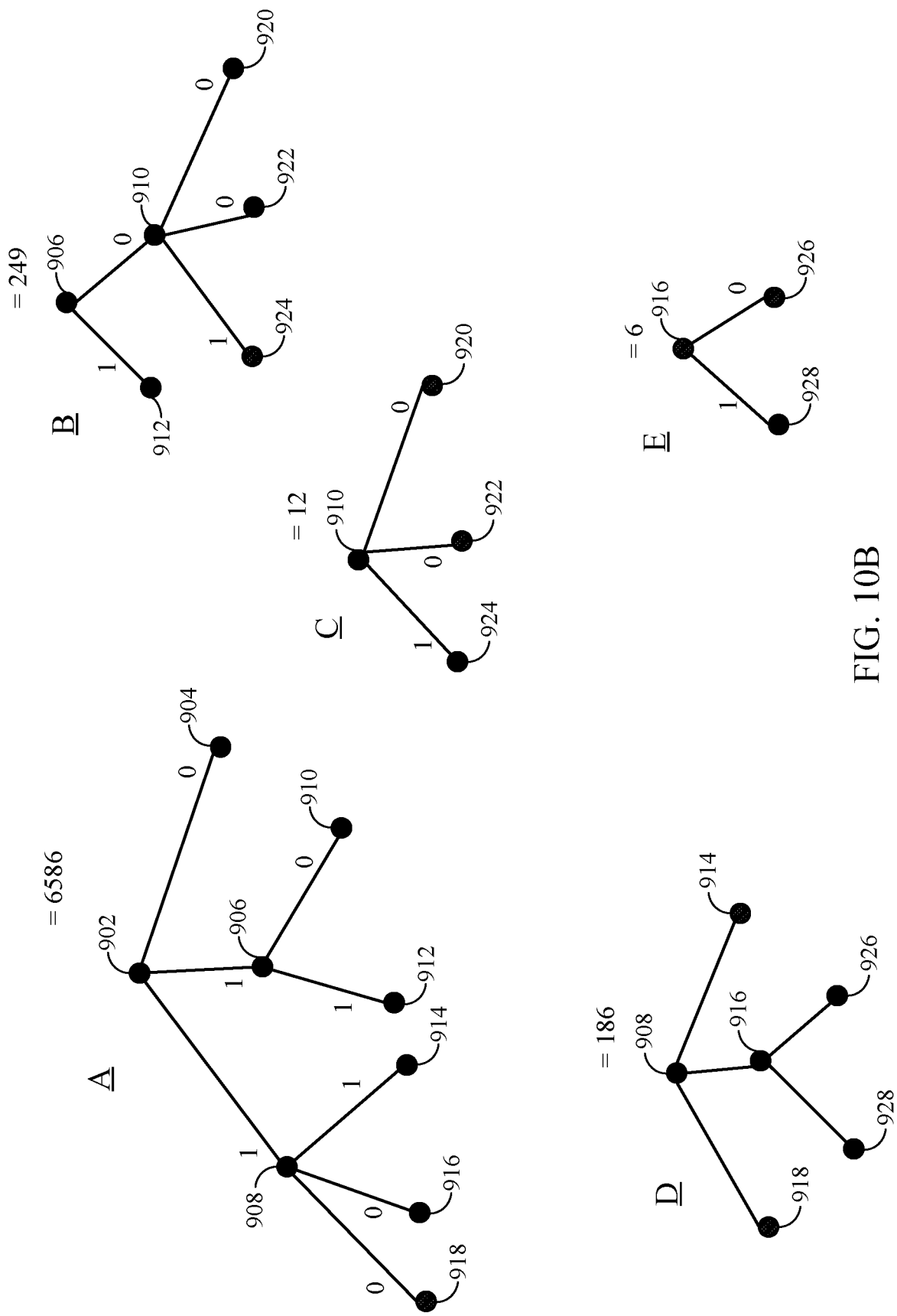
FIG. 10B is a schematic diagram of an embodiment of smaller trees of a target tree according to an embodiment of the target tree shown in FIG. 10A.

Returning to block 852 for identifying smaller trees of a target tree, in a particular example a target tree 900 shown in FIG. 10A comprises smaller trees A through E as shown in FIG. 10A and in FIG. 10B. In this particular embodiment, although claimed subject matter is not limited in this respect, tree 900 is shown comprising a BELT. However, this is merely an example of a tree of a particular type and/or configuration for a target tree, and other target trees may comprising different types and/or configurations such as, for example, node labeled trees, unlabeled and/or other edge labeled trees. In this particular embodiment, for an individual node in target tree 900 block 852 may identify smaller trees as comprising the individual node and nodes descending from the individual node up to a predetermined depth.

As illustrated below with reference to FIG. 10A, a larger target tree is expressed as a plurality of smaller trees according to a depth descending from root nodes from the smaller trees. In this particular embodiment, smaller tree may comprise a root node of the smaller trees and nodes descending from the root node up to a predetermined depth. In other embodiments, however, a target tree may be expressed as a plurality of smaller trees using other techniques. In a particular embodiment of an ordered target tree, for example, smaller trees expressing the target tree may be determined based, at least in part, on an order of nodes in the target tree. Again, these are merely examples of how a target tree may be expressed as a plurality of smaller trees and claimed subject matter is not limited in these respects.

In the particular embodiment illustrated with reference to FIG. 10A, although claimed subject matter is not limited in this respect, a smaller tree identified at block 852 may comprise the individual node and nodes descending from the individual node down to a depth of two. For example, smaller tree A comprises root node 902, nodes descending from root node 902 at a depth of one (nodes 904, 906 and 908) and nodes descending from root node 902 descending at a depth two (nodes 910, 912, 914 and 916), but does not comprising nodes descending at a depth of three (nodes 920 through 928). Block 852 may similarly identify smaller trees corresponding with other nodes in target tree 900 comprising at least one child node. In this particular example, block 852 may identify smaller tree B comprising node 906 as its root node, smaller tree C comprising node 910 as its root node, smaller tree D comprising node 908 as its root node and smaller tree E comprising node 916 as its root node.

It should be observed that smaller trees C and E, having nodes 910 and 916 as respective root nodes, comprise nodes descending from a root node at a depth of one but no nodes descending at a depth of two. Accordingly, for an individual node having at least one descendant child node, block 852 may identify a smaller tree comprising nodes descending down to the predetermined depth, to the extent that there are nodes descending from the individual node at the predetermined depth.

Figure 11:
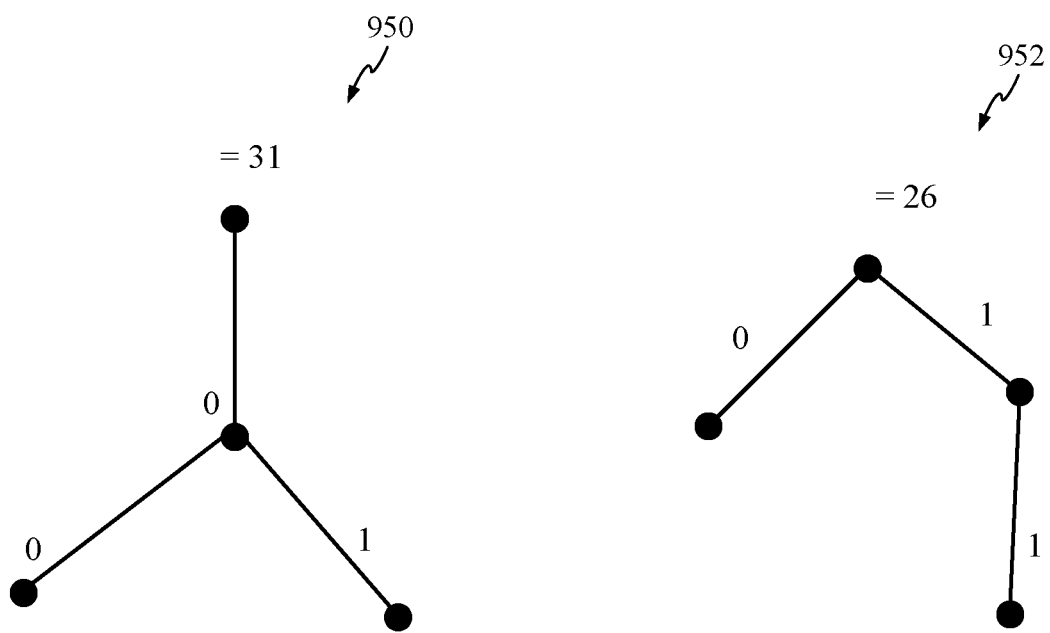
FIG. 11 is a schematic diagram of probe trees according to an embodiment.

As shown in FIG. 10A, according to a particular embodiment, smaller trees A through E are shown as overlapping in that some of the nodes in target tree 900 are a part of more than one of the smaller trees A through E. In this particular embodiment, smaller trees A through E comprise PSTs of target tree 900. Accordingly, possible PSTs of target tree 900 up to a particular depth (a depth of two in this particular example) may be identified as smaller trees in block 852. In a particular embodiment, although claimed subject matter is not limited in this respect, a depth of smaller trees may be based, at least in part, on an expected and/or maximum depth of a probe tree. Here, for example, a depth of smaller trees may be selected as a maximum depth of a probe tree to enable matching the probe tree with a smaller tree. Accordingly, in this particular embodiment, a probe numeral associated with such a maximum depth probe tree may be capable of matching one or more target numerals representing the target tree at block 806. FIG. 11 shows probe trees 950 and 952 comprising a depth of two. By identifying smaller trees of target tree 900 having up to a depth of two thus enables finding a match of probe numerals (associated with respective probe trees 950 and/or 952) with one or more numerals associated with RPSTs of smaller trees A through E.

It should be understood that the particular predetermined depth used for identifying smaller trees in this particular example is arbitrary and that other depths of one or greater may be chosen. In one particular embodiment, although claimed subject matter is not limited in this respect, a particular depth may be chosen based, at least in part, on resources available at a computing device and/or computing platform for enumerating RPSTs at block 856 and associating numerals with enumerated RPSTs at block 858. Here, for example, blocks 856 and/or 858 may be capable of performing these operations for a smaller tree having a shorter depth with fewer computing resources than for a smaller tree having a longer depth. On the other hand, as discussed above, the particular predetermined depth used for identifying smaller trees may also be based, at least in part, on an expected size of a probe tree.

While nodes of a smaller tree may be determined based, at least in part, on a depth descending from a root node of the smaller tree in particular embodiments, such nodes of a smaller tree may be determined using other techniques and claimed subject matter is not limited in this respect. In one alternative embodiment, for example, one or more nodes of a smaller tree may be determined, at least in part, on node and/or edge label values associated with the one or more nodes. Here, for example, a node descending from a root node of a smaller tree may determined to be included in the smaller tree based, at least in part, on a node and/or edge label value associated with the descending. Again, this is merely another example of how descending nodes may be determined to be included as part of the smaller tree and claimed subject matter is not limited in this respect.

Process embodiments 800 and 850 will be illustrated by way of example with reference to FIGS. 10A, 10B and 11. Here, tree 900 comprises a target tree which expresses and/or represents hierarchical data. Trees 950 and 952, in this particular example, are probe trees representing pieces of information that are of interest. Block 802 represents the target tree 900 as one or more target numerals. Here, according to a particular embodiment, process embodiment 850 may identify smaller trees having a depth of two as A through E of the target tree 900 as illustrated above with reference to FIG. 10. Here, as illustrated in FIG. 10B, these smaller trees A through E may be associated with numerals according to the association of BELTs and numerals illustrated above with reference to FIG. 4 as follows:

A: 6586
B: 249
C: 12
D: 186
E: 6

However, it should be understood that these are numerals associated with smaller trees A through E according to a particular association of trees with numerals and that claimed subject matter is not limited in this respect.

For a particular embodiment, a "full tree" is defined as an integral tree comprising all of its nodes, edges coupling the nodes to one another and any labels associated with the nodes or edges. Therefore, a full tree includes all of its nodes and elements completely connected. Also, such a full tree may be represented by a numeral denoted here as "FT" according to an association of trees and numerals. The notation "{RPSTs:: FT}" provides a shorthand notation for this particular embodiment to indicate the set of unique, unordered RPSTs that may be formed from a full tree "FT." In one embodiment, the elements of {RPSTs:: FT} may comprise natural numerals representing corresponding member RPSTs.

Returning to process embodiment 850, in this particular example, blocks 854 through 862 may generate an array of numerals comprising numerals associated with RPSTs of smaller trees A through E. In particular, based at least in part on numerals associated with respective smaller trees A through E according to a particular association of trees and numerals, blocks 854 through 862 may form an array of target numerals to comprise {RPSTs:: 6586} U {RPSTs:: 249} U {RPSTs:: 12} U {RPSTs:: 186} U {RPSTs:: 6}. The discussion below with reference to FIGS. 8 through 18 describes a particular embodiment of a process for enumerating RPSTs to determine member numerals for the individual expressions {RPSTs:: 6586}, {RPSTs:: 249}, {RPSTs:: 12}, {RPSTs:: 186} and {RPSTs:: 6} corresponding with smaller trees A, B, C, D and E, respectively. The discussion below with reference to FIGS. 19 through 28 illustrates a particular numerical example for determining member numerals of {RPSTs:: 249} corresponding with smaller tree B in this particular embodiment. It should be understood that the process embodiment described with reference to FIGS. 8 through 18 may be similarly applied to determine member numerals of {RPSTs:: 249} and the remaining expressions corresponding with smaller trees A, C, D and E as follows:

A: {RPSTs:: 6586}={2, 3, 6, 7, 9, 13, 14, 18, 19, 21, 26, 37, 38, 39, 42, 49, 57, 74, 78, 89, 91, 98, 111, 114, 133, 169, 178, 182, 222, 247, 259, 266, 267, 338, 481, 494, 518, 534, 623, 703, 962, 1157, 1246, 1369, 1406, 2314, 2738, 3293, 6586};
B: {RPSTs:: 249}={2, 3, 5, 6, 11, 15, 17, 31, 33, 51, 83, 93, 249};
C: {RPSTs:: 12}={2, 3, 4, 6, 12};
D: {RPSTs:: 186}={2, 3, 4, 5, 6, 10, 11, 12, 15, 22, 30, 31, 33, 62, 66, 93, 166}; and
E: {RPSTs:: 6}={2, 3, 6}.

Probe trees 950 and 952, shown in FIG. 11, have a depth of two corresponding with the maximum depth of the smaller trees A through E. Returning to process embodiment 800 in this particular example, block 804 represents probe trees 950 and 952 (FIG. 11) as probe numerals. Here, probe trees 950 and 952 may be associated with numerals "31" and "26", respectively, according to an association of trees and numerals as illustrated with reference to FIG. 4 in this particular example (although probe trees 950 and 952 may be associated with different numerals according to a different association between trees and numerals). Accordingly, probe numerals determined at block 804 may comprise "31" and "26" in this particular embodiment. Here, block 806 may determine a match of probe numeral "26" with a target numeral associated with an RSPT of smaller tree A, and determine a match of probe numeral "31" with a target numeral associated with an RSPT of smaller trees B and D. A match of probe numeral "26" may be graphically observed as a match of probe tree 952 with the PST of target tree 900 (in smaller tree A) formed by nodes 902, 904, 908 and 914, and binary labeled edges connecting these nodes. Similarly, a first match of probe numeral "31" may be graphically observed as a match of probe tree 950 with a first PST of tree 900 (in smaller tree B) formed by nodes 906, 910, 920 (and/or 922) and 924, and binary labeled edges connecting these nodes. A second match of probe numeral "31" may be graphically observed as a match of probe tree 950 with a second PST of tree 900 (in smaller tree D) formed by nodes 908, 916, 926 and 928, and binary labeled edges connecting these nodes.

The embodiments described above relate to, among other things, detecting a presence of a piece of information of interest in hierarchical data represented and/or expressed as a target tree. In other embodiments, although claimed subject matter is not limited in this respect, a location of the detected piece of information of interest may be determined. Here, particular elements of a target tree (e.g., nodes, edges and/or smaller trees) may themselves be associated with particular data locations in a hierarchical database, for example. As illustrated above, target numerals may be associated with particular smaller trees formed from a larger target tree. In addition to finding a match between a probe numeral and a target numeral generated from any of the smaller trees, process 800 may also provide an indication of which smaller tree produced matching target numeral(s). In the example above, for the purposes of illustration, probe numeral "26" matches a target numeral from smaller tree A and probe numeral "31" matches target numerals from smaller trees B and D. With smaller tree A being associated with a particular location in a database, in a particular example, matching probe numeral "26" with a target numeral from smaller tree A may indicate a location of information of interest in a location of the database associated smaller tree A. Similarly, with smaller trees B and D being associated with particular locations in a database, in a particular example, matching probe numeral "31" may indicate a location of information of interest in locations of the database associated with smaller trees B and D.

In one particular example of the above described process applied to biometric pattern recognition, although claimed subject matter is not limited in this respect, a known biometric pattern (e.g., facial features) may be modeled as hierarchical data in a target tree. One or more detected features of a subject or specimen may be modeled as hierarchical data in a probe tree. One or more target numerals may represent the known biometric pattern and a probe numeral may represent the detected features. A comparison of the target numerals with the probe numerals may then indicate whether the one or more detected features are present in the known biometric pattern upon detection of one or more matches.

In another particular example, the technique described above may be used for processing queries to an extensible markup language (XML) document or set of documents. Here, hierarchical data in an XML document or set of documents may be expressed and/or represented as one or more target trees. A query to the one or more XML documents may be represented as a probe tree. Applying the techniques above, according to a particular embodiment, the target tree representing the one or more XML documents may be represented as one or more target numerals and the probe tree may be represented as a probe numeral. The probe numerals, representing the probe tree and the query, may then be compared with the one or more target numerals, representing the target tree and hierarchical data in the one or more XML documents. Detecting a match with a probe numeral with one or more of the target numeral may indicate a presence of information in the one or more XML documents that is the subject of the query. However, this is merely a particular example of an application of the above described process and claimed subject matter is not limited in this respect.

Embodiments described above with reference to FIGS. 8 through 11 employ a particular example which represents and/or expresses hierarchical data in the form of a BELT. However, process embodiments 800 and 850 may employ representations of hierarchical data in other types of trees which are associated with numerals according to an association of trees and numerals. In other embodiments, for example, a target tree and/or probe tree may comprise node labeled trees, trees with neither edge nor node labels, or m-ary edge labeled trees having edges capable of storing, holding and/or representing three or more possible values. Regardless of a particular form of a target tree and/or probe tree in any particular embodiment, a target tree may be represented as one or more target numerals according to an association of trees and numerals. Information of interest, represented by a probe tree in the particular form for example, may similarly be represented as a probe numeral for comparison with the one or more target numerals.

Figure 12:
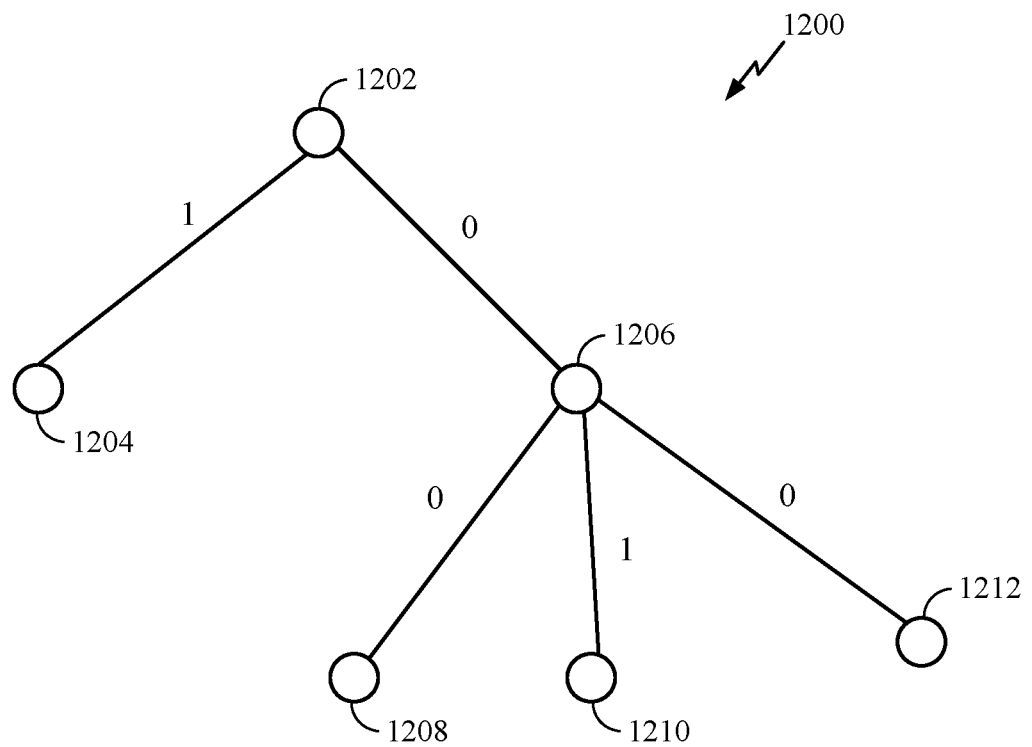
FIGS. 12 through 15 are schematic diagrams illustrating, by way of example, rooted partial subtrees (RPSTs) according to an embodiment.

FIGS. 12 through 31 illustrate an embodiment of a process to enumerate RPSTs of a tree (e.g., a smaller PST of a target tree as illustrated above). As shown in FIGS. 12 through 15, where FT represents tree 1200, elements of {RPSTs:: FT} comprise the component RPSTs shown in FIGS. 13, 14 and 15 (among other component RPSTs as illustrated below). FIG. 12 is a schematic diagram of a tree 1200 illustrating, by way of example, RPSTs of tree 1200. Tree 1200 comprises a root node 1202 and nodes 1204, 1206, 1208, 1210 and 1212 coupled to the root node 1202 by edges and intermediate nodes. In the presently illustrated embodiment, tree 1200 comprises a BELT. It should be understood, however, that other types of trees (either labeled trees or unlabeled structure trees) may similarly comprise RPSTs and that claimed subject matter is not limited in this respect.

Figure 13:
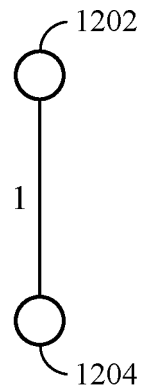
Figure 14:
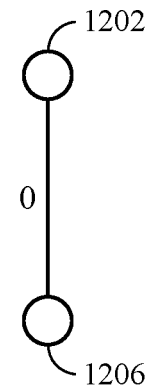
Figure 15:
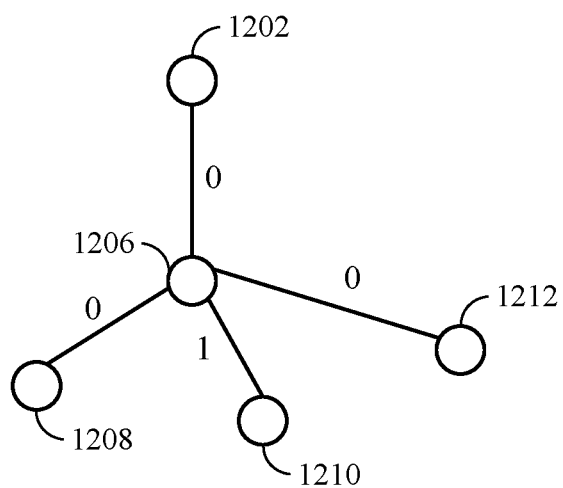

FIGS. 13, 14 and 15 are schematic diagrams of some RPSTs of tree 1200 according to an embodiment. These RPSTs include root node 1202 of tree 1200, at least one other node of tree 1200, and any edges or intermediate nodes in tree 1200 coupling the at least one other node to the root node 1202. However, it should also be understood that the set of RPSTs of tree 1200 may also include, for example, a single node 1202 or the full tree 1200. FIGS. 13 and 14 show RPSTs including root node 1202 and one other node in tree 1200 which connected via an edge in tree 1200 between root node 1202 and the one other node. FIG. 15 shows an RPST including root node 1202, nodes 1208, 1210 and 1212, and intermediate node 1206 coupling the root node 1202 to the nodes 1208, 1210 and 1212. It should be understood that FIGS. 13, 14 and 15 are merely examples of RPSTs that may be formed from tree 1200, and that these examples are not intended to provide an exhaustive enumeration of RPSTs that may be formed from tree 1200.

Figure 16:
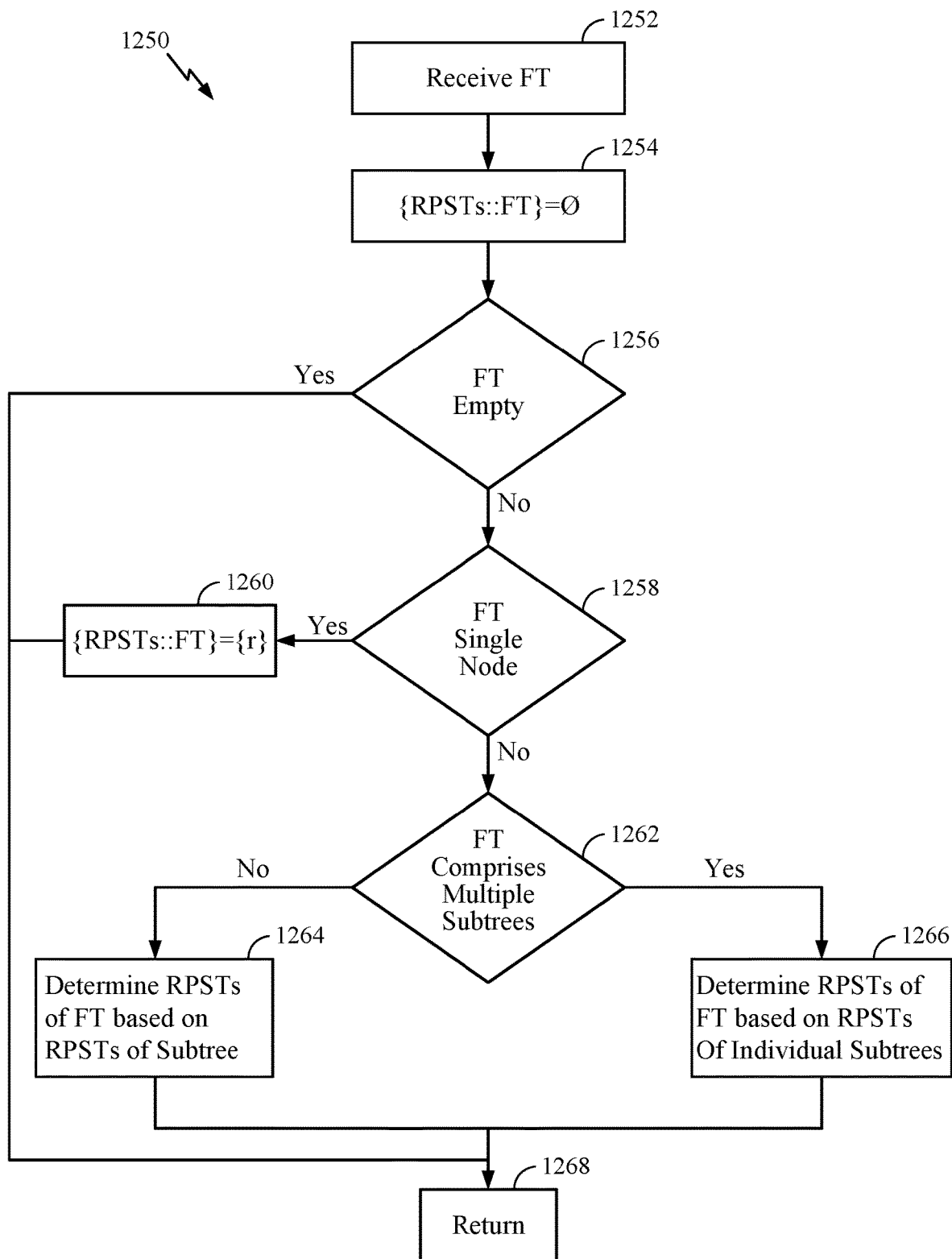
FIG. 16 is a flow diagram illustrating a process to enumerate RPSTs from a tree according to an embodiment.

FIG. 16 is a flow diagram illustrating a process 1250 to enumerate RPSTs from a tree according to an embodiment. In this particular embodiment, the process 1250 may enumerate the RPSTs of full tree FT to define elements of {RPSTs:: FT} as a result. FT may be represented as a natural numeral received at block 1252. {RPSTs:: FT} may be initialized as the empty set at block 1254 to be subsequently filled with elements representing RPSTs enumerated in subsequent portions or process 1250.

According to an embodiment, the process 1250 recognizes that the full tree may represent any one of four different configurations: an empty tree; a single node tree; a tree comprising a single subtree connected to a root node of the full tree by an edge; and two or more subtrees connected to the root node of the full tree by respective edges. Accordingly, the process 1250 enumerates the RPSTs of the full tree based, at least in part, on the particular configuration of the full tree. Diamond 1256 determines whether FT represents an empty tree containing no nodes. If so, {RPSTs:: FT} remains defined as the empty set and process 1250 terminates at block 1268. If diamond 1258 determines that FT contains a single node tree, block 1260 updates {RPSTs:: FT} to include a natural numeral expressing a single node tree (here, {r}).

At diamond 1262 through block 1268, process 1250 enumerates RPSTs based, at least in part, on the configuration of the full tree as having either a single subtree connected to the root node of the full tree by an edge, or two or more subtrees connected to the root node by respective edges. If FT represents a single subtree connected to the root node of the full tree by an edge, block 1264 enumerates the RPSTs of the single subtree. Here, the RPSTs of the full tree may be determined, at least in part, from the RPSTs of the single subtree.

If FT represents a full tree having two or more subtrees connected to the root node of the tree by respective edges, block 1266 may enumerate the RPSTs of the individual ones of the two or more subtrees. At least some of the RPSTs of the full tree may be determined, at least in part, from RPSTs of the individual subtrees. Block 1266 may then enumerate additional RPSTs of the full tree based, at least in part, combinations of the enumerated RPSTs merged at the root node of the full tree.

According to an embodiment, blocks 1264 and 1266 may be carried out by recursive execution of at least a portion of the process 1250. At block 1264, for example, the single subtree of the full tree may itself comprise two or more subtree children connected by respective edges to a node. Block 1264 may execute portions of block 1266 to enumerate the RPSTs of the subtree based, at least in part, on RPSTs enumerated from individual ones of the subtree children of the single subtree. Similarly, block 1266 may enumerate RPSTs of individual ones of the subtrees connected to the root node of the full tree by executing portions of block 1264.

Figure 17:
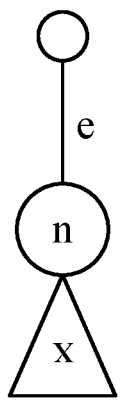
FIG. 17 is a schematic diagram illustrating a representation of an embodiment of a subtree according to an embodiment.

FIG. 17 is a schematic diagram illustrating a representation an embodiment of a subtree comprising an edge having a label "e" with a subtree root node having a label "n" where "e" and "n" may be represented by discrete values (e.g., Boolean, binary, integer, natural numeral and/or whole numeral values). A value associated with a "child tree" of the subtree may be represented by "x" which may represent information expressed as a natural numeral according to an association of natural numerals with trees as illustrated above with reference to FIG. 4. Like a tree, subtree and RPST, such a child tree may have properties of a tree and be associated with a natural numeral according to an association between trees and natural numerals. However, this is merely an example of a representation of a subtree and its child tree, and claimed subject matter is not limited in this respect.

As described below in connection with relation (1), a push operation may define a relationship between a subtree and a child tree of the subtree. As an association between trees and natural numerals may associate particular trees with natural numerals (e.g., as illustrated in FIG. 4), a push operation may define a relationship between a natural numeral associated with a subtree and a natural numeral associated with a child tree of the subtree. Similarly, a push operation may also define a relationship between natural numerals representing RPSTs of the child tree and natural numerals associated with at least some of the RPSTs of the subtree. A value of, or natural numeral associated with, the subtree shown in FIG. 17 may be expressed as the result of a push operation on the child tree having the value x. Such a push operation on the child tree may be represented in relation (1) as follows:

$$\text{push}(j,k,x) = P[kx+j-k+(2-r)], \text{ if } j < k \text{ and } k > 0 \qquad (1)$$

where:
P(m)=Kleene enumeration function for generating a sequence of non-composite numerals illustrated with reference to FIG. 5;
k=total number of values possible for a label;
j=actual computed label index value;
x=value of, or natural numeral associated with, "pushed" child tree; and
r=defined value of tree system root/single node tree (e.g., either 0 or 1).

It should be understood that while the push operation of relation (1) is suitable for performing specific embodiments described herein, this push operation is merely an example of how a push operation may be performed and claimed subject matter is not limited in this respect. Additionally, it should be noted that the value of "r" is selected based upon a particular association of natural numerals and trees according to an association embodiment. Here, such an association of natural numerals may define a particular natural numeral to represent a tree comprising a single node. In the association of natural numeral with trees of FIG. 4, for example, the single node is associated with "1" defining r=1. However, this is merely an example of how a natural numeral may represent a single node for a particular association embodiment and claimed subject matter is not limited in this respect.

It should also be noted that "j" (the actual computed label index value associating the root node with the pushed subtree) is a function of the specific values of "e" (the specific edge label) and "n" (the specific node label). In the particular case of a BELT, for example, there may be no node values such that "j"="e". The value of "k" (total number of possible index values) may be determined as function of the possibilities of values of "e" (edge label value) and "n" (node label value) and, in a particular embodiment, "k" may be determined as the number of possibilities for "e" multiplied by the number of possibilities for "n." Again, in the particular case of a BELT, "k" equals the number of possibilities for the value "e" since there are no node labels.

The techniques described herein for enumerating RPSTs of a full tree may be applied to any particular type of tree. For illustration purposes, particular examples described herein are directed to enumerating RPSTs of a BELT. Accordingly, while it is understood that an actual computed index value associating the root node with the pushed subtree may be determined from node labels (having a value "n") and/or edge labels (having a value "e"), for simplicity the remaining discussion will denote the actual computed label index value "j" as an edge label value of an edge connecting a root node of a tree to a pushed child tree.

In enumerating at least some RPSTs of a tree based, at least in part, on enumerated RPSTs of a subtree of the RPST, it may be useful to express a push operation on multiple RPSTs in a single push operation. In addition to applying a push operation to a tree having a value x, the push operation may be applied to multiple trees or tree elements of a set (here, an unordered collection of elements representing trees, RPSTs, subtrees and/or child trees of a subtree) in relation (2) as follows:

$$push[j,k,\{a,b,c\}] = \{push(j,k,a)\} \cup \{push(j,k,b)\} \cup \{push(j,k,c)\} \quad (2)$$

where a, b and c are numerical representations of tree elements in the pushed set. The result of the operation of relation (2) may be referred to as a "pushed set" of tree elements.

Figure 18:
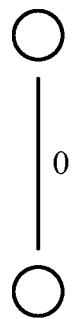
FIGS. 18 and 19 are schematic diagrams illustrating applications of one embodiment of a push operation according to an embodiment.
Figure 19:

FIGS. 18 and 19 illustrate applications of the push operation of relation (1) to specific subtrees. FIG. 18 shows a BELT having a value of "2" according to the association of trees and natural numerals shown in FIG. 4. As such, a push operation on this tree would define x=2, k=2 and r=1. FIG. 19 illustrates the result of a push of the tree in FIG. 18 by an edge having a label zero (i.e., a zero-push). The value of j for this push operation is zero. Accordingly, the push operation provides a numeral associated with the pushed BELT as follows:

$$push(j,k,x) = P[2*2+0-2+2-1] = P[3] = 5.$$

It should be understood, however, the application of the push operation of relation (1) to a BELT as illustrated in FIGS. 18 and 19 are merely particular examples of the push operation and the push operation may be similarly applied to non-BELT trees.

To enumerate RPSTs of a subtree of a full tree, it may be useful to determine a numeral associated with a child tree of the subtree based, at least in part, on a numeral associated with the subtree (the natural numerals being based, at least in part, on an association between trees and numerals). Like the push operation of relation (1), according to an embodiment, an "inverse push" operation may define a relationship between a subtree (e.g., a subtree of a parent full tree) and the child tree of the subtree (as illustrated in FIG. 13). Here, such an inverse push operation may define a relationship between numerals associated with such subtrees and numerals associated with respective child trees of such subtrees. Operating on such a natural numeral associated with a subtree (according to an association of trees with natural numerals as illustrated with reference to FIG. 4, for example), an inverse push operation may provide a natural numeral associated with a child tree portion. In a particular embodiment, an inverse push operation may provide as a result as (1) a natural numeral representing a child tree ("Child") and an edge label value linking the child tree with the root node of the parent full tree ("j"). For example, an inverse push operation on a tree may be represented in relation (3) as follows:

$$push^{-1}(r,k,ST) = <Child, j>$$

$$Child = Int[(P^{-1}(ST)+k-(2-r))/k]; \text{ and}$$

$$j = [P^{-1}(ST)+k-(2-r)] \text{modulo}[k] \quad (3)$$

where:
$P^{-1}(h)$ = an inverse of the Kleene enumeration function for generating a sequence of non-composite numbers illustrated with reference to FIG. 5;
ST=value of, or natural numeral associated with, subtree with edge label value "j";
Child=natural numeral representing child tree of subtree represented by ST;
j=edge label value linking the child tree with the root node of parent full tree;
k=total number of possible edge label index values linking the child tree with the root node of parent full tree; and
r=defined value of tree system root/singleton node (either 0 or 1).

It should also be understood that the inverse push operation of relation (3) is merely an example of an inverse push operation used to determine a natural numeral associated with a child tree based, at least in part on a natural numeral associated with a parent subtree, and that claimed subject matter is not limited in this respect. For example, for simplicity relation (3) assumes that information of a computed index value "j" associating the root node of the parent full tree and the child tree may be derived from edge label values in the absence of node label values (e.g., as in the case of a BELT). However, relation (3) may be expanded to apply to other non-BELT trees. Applied to the tree of FIG. 17, for example, the inverse push operation of relation (3) may be expanded to yield a natural numeral representing the child tree as the value "x" and the label index value j (being a function of edge and node label values "e" and "n").

In the particular embodiment of an inverse push operation illustrated in relation (3), the inverse Kleene enumeration function, $P^{-1}(h)$, provides a result based upon ST (value of, or natural numeral associated with the subtree). Since the Kleene enumeration function generates non-composite natural numerals, the domain of $P^{-1}(h)$ may be limited to non-composite natural numerals. In connection with the association of natural numerals and trees illustrated with reference to FIG. 4, accordingly, the inverse push operation of relation (3) may be applied to natural numerals representing trees having a root node coupled to a single node (or having a single subtree connected to the root node). In one particular implementation of the inverse of the Kleene enumeration function, $P^{-1}(h)$, a look-up table may associate values of h and $P^{-1}(h)$ as shown in Table 1 as follows:

TABLE 1

| h | $P^{-1}(h)$ |
| --- | --- |
| 2 | 1 |
| 3 | 2 |
| 5 | 3 |
| 7 | 4 |
| 11 | 5 |
| 13 | 6 |
| 17 | 7 |
| 19 | 8 |
| 23 | 9 |
| 29 | 10 |
| 31 | 11 |
| 37 | 12 |
| 41 | 13 |
| 43 | 14 |
| 47 | 15 |
| 53 | 16 |
| 59 | 17 |
| 61 | 18 |
| 67 | 19 |
| 71 | 20 |
| 73 | 21 |
| 79 | 22 |
| 83 | 23 |

To enumerate at least some of the RPSTs of a full tree having two or more subtrees connected to the root node of FT by different edges, it may be useful to determine combinations of RPSTs enumerated from the different subtrees. In the case of a full tree comprising two subtrees connected to the root node by two edges, in a particular example, individual elements of a first set of RPSTs of the full tree derived from a first subtree (denoted as "X" for the purposes of illustration) may be combined or merged with individual elements of a second set of RSPTs of the tree derived from a second subtree (denoted as "Y" for the purposes of illustration). Here, the elements of X and Y may represent individually enumerated RPSTs of the tree derived from the first and second subtrees, respectively. In a particular embodiment, the elements of X and Y may be represented as natural numerals associated with enumerated RPSTs derived from the respective first and second subtrees (according to an association of trees and natural numerals as illustrated in FIG. 4, for example). Accordingly, a merger of an RPST represented by an element in X with an RPST represented by an element in Y at the root node of the tree may be represented by a multiplication of these natural numerals resulting in a natural numeral representing the RPST resulting from the merger.

Figure 20:
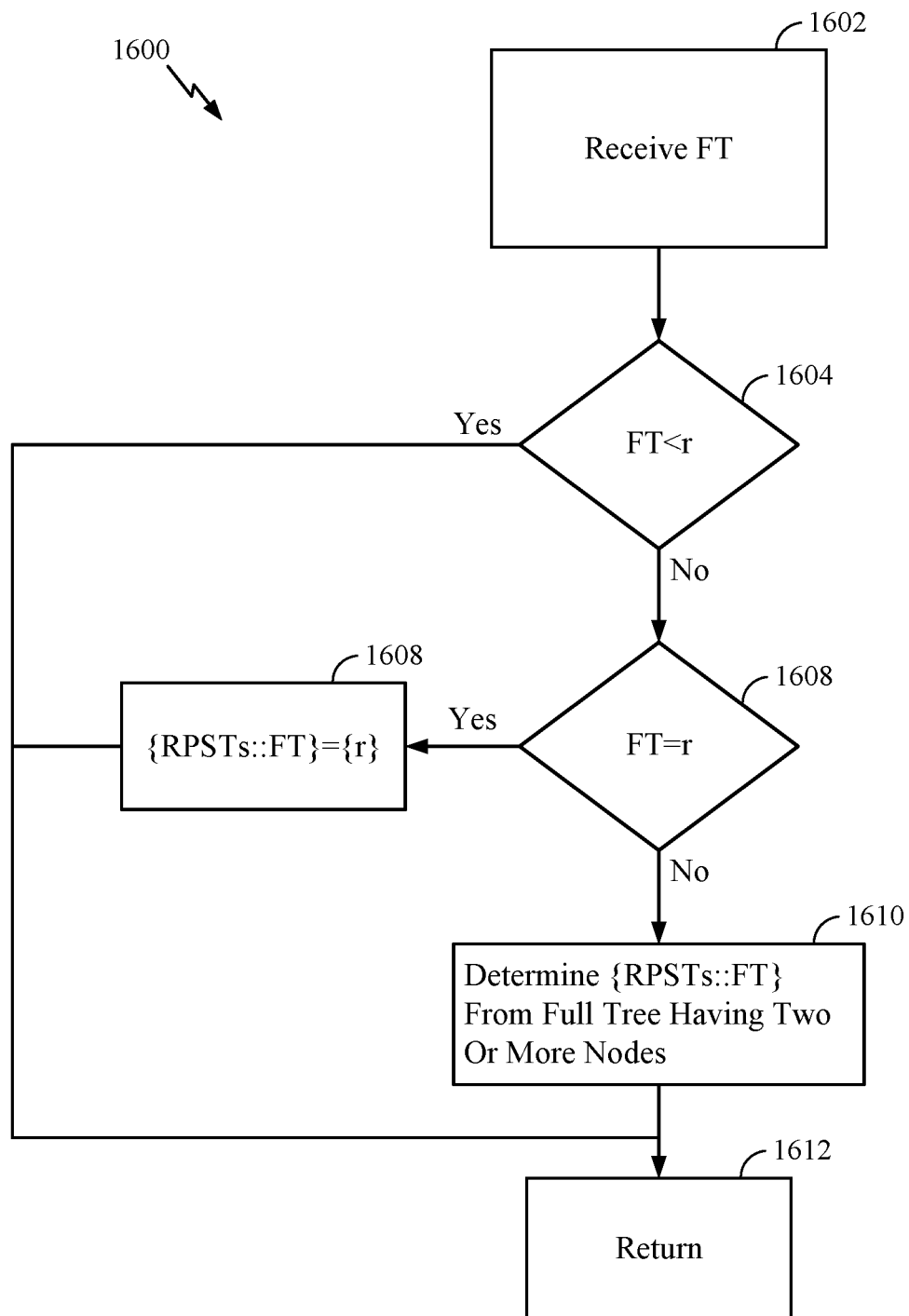
FIGS. 20, 21 and 22 are flow diagrams illustrating a process to enumerate RPSTs from a tree according to an embodiment.
Figure 21:
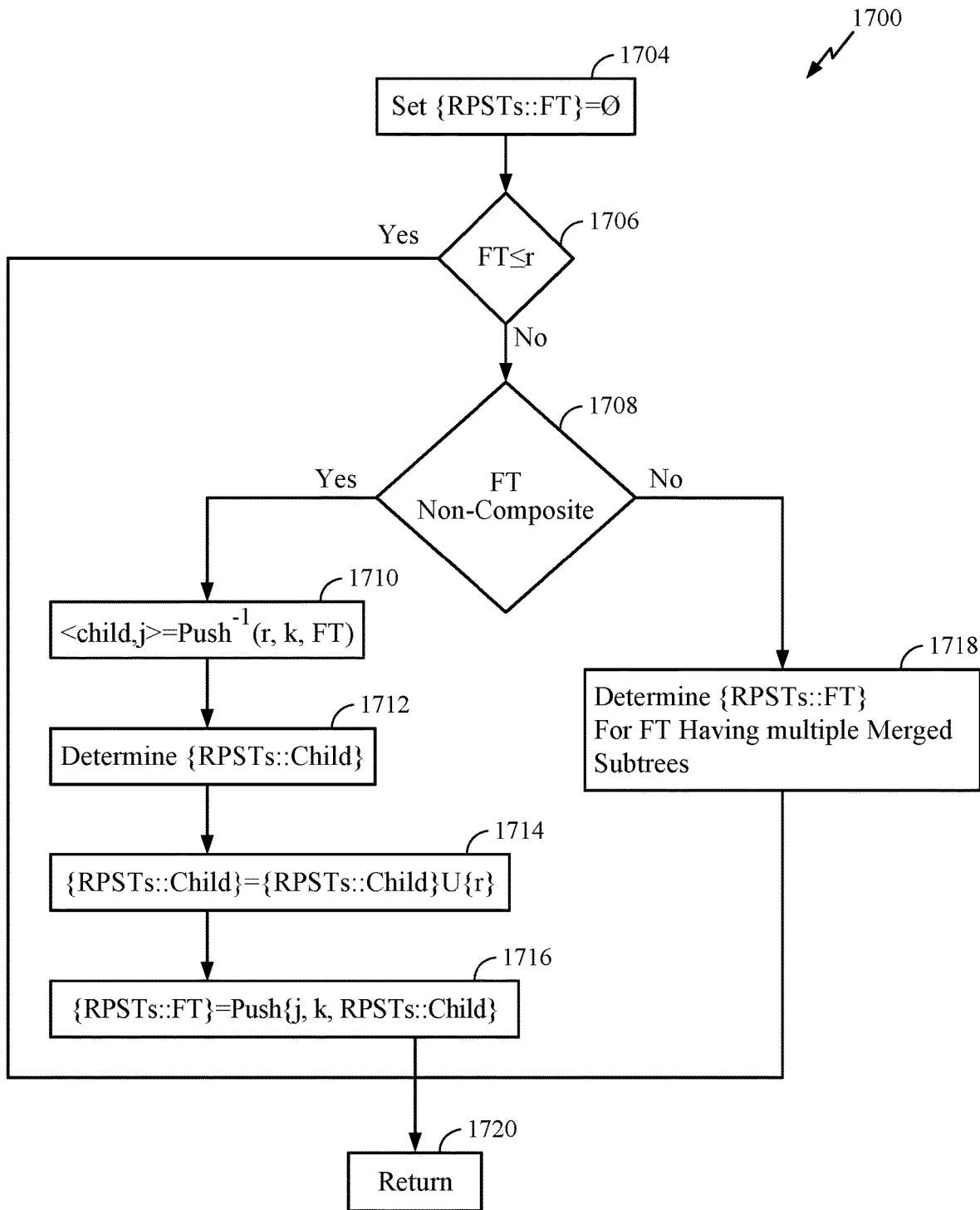
Figure 22:
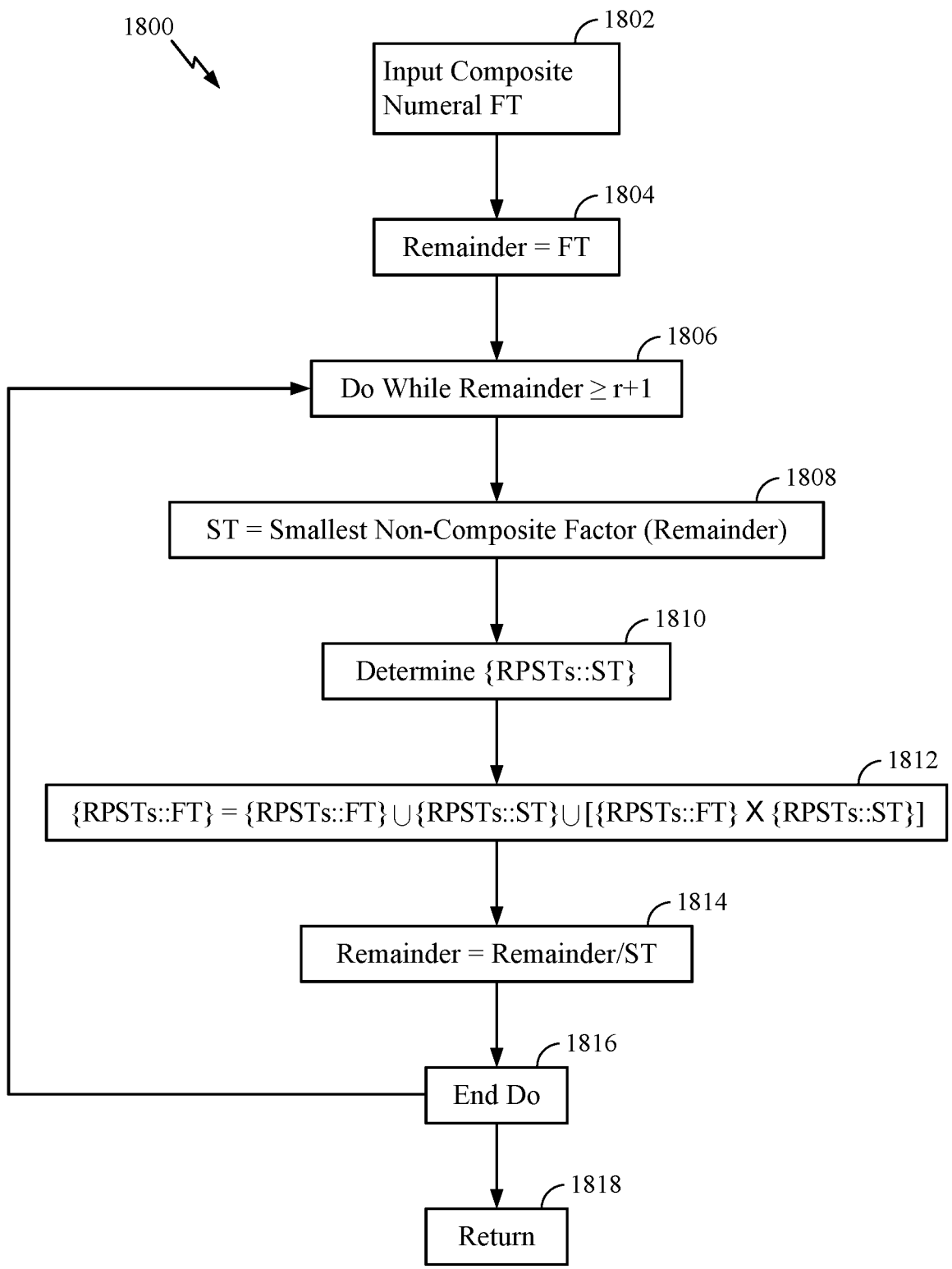

According to one embodiment, a merger operation discussed above (e.g., for combining trees at their root nodes to provide a graphical and numerical expression of the resulting merged trees) may be expanded to create a set merger operation to include a merger among RPSTs (e.g., derived from different subtrees as illustrated above). Here, a member RPST of a first set merges with a member RPST of a second set to provide a member of a third, merged set containing the merged RPSTs as elements, for all members of both first and second sets. Regarding the aforementioned representation of the RPSTs as natural numerals, the set merger operation to merge sets X and Y may be expressed as follows:

$$X \times Y = \{x_1, x_2, x_3, \ldots, x_n\} \times \{y_1, y_2, y_3, \ldots, y_m\} == \quad (4)$$
$$\{x_1*y_1, x_1*y_2, x_1*y_3, \ldots, x_1*y_m\} U \{x_2*y_1, x_2*y_2,$$
$$x_2*y_3, \ldots, x_1*y_m\} U \{x_3*y_2, x_3*y_2, x_3*y_3, \ldots, x_3*y_m\}$$
$$U \ldots U \{x_n*y_1, x_n*y_2, x_n*y_3, \ldots, x_n*y_m\}$$

where:

$x_1, x_2, x_3, \ldots x_n$ are the natural numerals representing RPSTs in set X; and $y_1, y_2, y_3, \ldots y_m$ are the natural numerals representing RPSTs in set Y;

FIGS. 20, 21 and 22 are flow diagrams illustrating a process to enumerate RPSTs from a full tree which applies the aforementioned push operations, inverse push operation and set merger operation of relations (1) through (4) according to a particular embodiment. FIG. 20 illustrates a process 1600 to receive a natural numeral representing a full tree, FT, at block 1602. Diamond 1604 may determine whether the tree represented by FT comprises an empty tree. In this particular embodiment, the value "r" is zero or one depending on whether a single node tree is associated with a value of zero or one (e.g., depending on a particular association embodiment defined above in connection with the push operation of relation (1)). Here, diamond 1604 determines whether the tree represented by FT is an empty tree based upon whether FT is less than r. However, this is merely an example of a technique to identify an empty tree and claimed subject matter is not limited in this respect. Process 1600 terminates at block 1612 if diamond 1604 determines that FT represents an empty tree. Diamond 1606 determines whether FT represents a single node tree based upon whether FT equals r. However, this is merely an example of a technique to identify a single node tree and claimed subject matter is not limited in this respect. If FT comprises a single node tree, block 1608 assigns r as the RPST element of {RPSTs:: FT} and the process 1600 terminates at block 1612.

Diamond 1606 determines whether FT comprises two or more nodes by determining whether FT is greater than r. If so, block 1610 may initiate execution of process 1700 shown in FIG. 21. Block 1704 initializes the set {RPSTs:: FT} to contain no elements while execution of the remaining portions of process 1700 may subsequently add elements to this set. As discussed below, process 1700 may be recursively executed to determine, for example, RPSTs of subtrees of the full tree represented by FT. Accordingly, diamond 1706 determines, much like diamond 1606 of process 1600, whether FT (e.g., in a recursive execution) represents a single node tree. If so, then process 1700 (and process 1600) terminate at block 1720.

If FT is greater than r, diamond 1708 determines whether FT represents a tree comprising a single subtree (e.g., comprising a child tree pushed from the full tree node by an edge as shown in FIG. 17) or a tree comprising a root node that merges two or more subtrees (e.g., as shown in FIG. 12). Here, diamond 1708 determines that FT represents a tree comprising a single subtree if FT comprises a non-composite numeral, and determines that FT represents a tree having a root node merging two or more subtrees if FT comprises a composite numeral. For this embodiment, an association between trees and natural numerals may associate composite natural numerals with trees merging two or more subtrees at a root node, and may associate non-composite numerals with trees comprising a single subtree (here, a pushed child tree coupled to the root node of the tree by an edge). However, this is merely an example of an association embodiment, and claimed subject matter is not limited in this respect.

Similar to the process 1250 illustrated above with reference to FIG. 16, process 1700 employs a process to enumerate the RPSTs of a full tree based, at least in part, on the configuration of the full tree. Here, it should be observed that block 1710 through 1716 collectively represent a process of enumerating RPSTs of a full tree having a single subtree connected to the root node of the full tree by a single edge. Process 1700 may employ a different process at block 1718 if the full tree comprises two or more subtrees merged at a root node. As illustrated below, the RPSTs of a full tree may be determined, at least in part, by an enumeration of RPSTs of child trees of subtrees. Accordingly, the process 1700 of enumerating RPSTs of a full tree may be recursively executed for determining such RPSTs of the child trees.

If diamond 1708 determines that FT represents a tree comprising a single subtree connected to a root node by a single edge, block 1710 executes an inverse push operation on FT as illustrated above in relation (3) to determine a natural numeral "child" representing the child tree coupled to the root node of the tree represented by FT (and edge label value "j" linking the root node with the child tree). At least some of the RPSTs of the tree represented by FT may be derived from RPSTs of the child tree determined at block 1710. Accordingly, block 1712 may recursively execute process 1700 to enumerate the RPSTs of the child tree ({RPSTs:: child}). Here, the recursively executed process may apply the natural numeral "child" representing the child tree (e.g., as determined at block 1710) as the FT input value.

Block 1714 then combines the single node tree represented by "r" with the set of enumerated RPSTs determined at block 1712. Block 1716 then performs a push operation according to relation (2) on the elements of this combined set {RPSTs:: child} to complete the enumeration of the elements of {RPSTs:: FT} in a pushed set with the edge label value "j" determined from the inverse push operation at block 1710.

If diamond 1708 determines that FT represents a tree comprising a root node that merges two or more subtrees, block 1718 may enumerate the elements of {RPSTs:: FT} by executing a process 1800 shown in FIG. 22. As such, block 1718 may provide the composite numeral FT as an input value to process 1800 at block 1802. Subsequent blocks 1804 through 1818 may then enumerate RPSTs for individual subtrees merged at the root node of the tree represented by FT, and determine {RPSTs:: FT} from combinations of the RPSTs enumerated from particular ones of the merged subtrees.

A processing loop of blocks 1806 through 1816 incrementally factors the composite numeral FT into non-composite numerals "ST" representing individual subtrees merged at the root node of the tree represented by FT. Again, this particular embodiment includes an association between trees and natural numerals that associates composite natural numerals with trees merging two or more subtrees at a root node and associates non-composite numerals with trees having a root node coupled to a single pushed subtree; however, claimed subject matter is not limited in scope to this particular embodiment. Here, block 1804 initializes a "remainder" as FT and block 1808 determines the non-composite numeral ST as the smallest non-composite factor of the remainder. If the remainder is decreased to below r, representing a single node tree in this particular embodiment), sequential execution returns to process 1700 at block 1818.

Through successive executions of the processing loop of blocks 1806 through 1816, block 1808 may sequentially factor the numeral FT into non-composite numerals representing subtrees of the tree represented by FT and connected to a root node of FT. According to a particular association embodiment, these non-composite numerals may represent individual ones of subtrees merged at a root node of the tree represented by FT. As at least a portion of the RPSTs of the tree represented by FT may be determined from the RSPTs of these subtrees, block 1810 may recursively execute the process 1700 to enumerate the RPSTs of the subtrees represented by the non-composite values ST determined at block 1808.

It should be observed that the elements of {RPSTs:: FT} are derived from the RPSTs enumerated from individual subtrees (determined through loop iterations of block 1810). In addition to these elements, {RPSTs:: FT} also includes merged combinations of RPSTs derived from RPSTs enumerated from different subtrees at block 1810 in different loop iterations. Through executions of the loop of block 1806 through 1816, block 1812 updates {RPSTs:: FT}. By way of example, for the purpose of illustration, in an initial iteration of the loop, block 1812 may merely assign elements to {RPSTs:: FT} (which is initialized as the empty set) to include the RPSTs enumerated at block 1810 from a first subtree of the tree represented by FT. In a second iteration of the loop, block 1810 enumerates RPSTs of a second subtree of the tree represented by FT. In addition to adding the enumerated RPSTs of the second subtree to {RPSTs:: FT} (updated in the initial loop iteration to include RPSTs enumerated from the first subtree), block 1812 in the second iteration also updates {RPSTs:: FT} to include RPSTs formed from the merger of the current individual elements of {RPSTs:: FT} (again, updated from the initial iteration) with individual enumerated RPSTs of the second subtree. Here, block 1812 employs a set merger operation according to relation (4) to determine a merger of the current individual elements of {RPSTs:: FT} (e.g., assigning the elements of {RPSTs:: FT} to "X") with the individual elements of the enumerated RPSTs of the second subtree (e.g., assigning the elements of RPSTs of the second subtree to "Y"). Subsequent iterations of the processing loop of blocks 1806 through 1816 may then enumerate the RPSTs of additional subtrees, and update {RPSTs:: FT} based upon the elements of {RPSTs:: FT} updated in the previous iteration and the enumerated RPSTs of the subsequent subtree children in like fashion.

Figure 23:
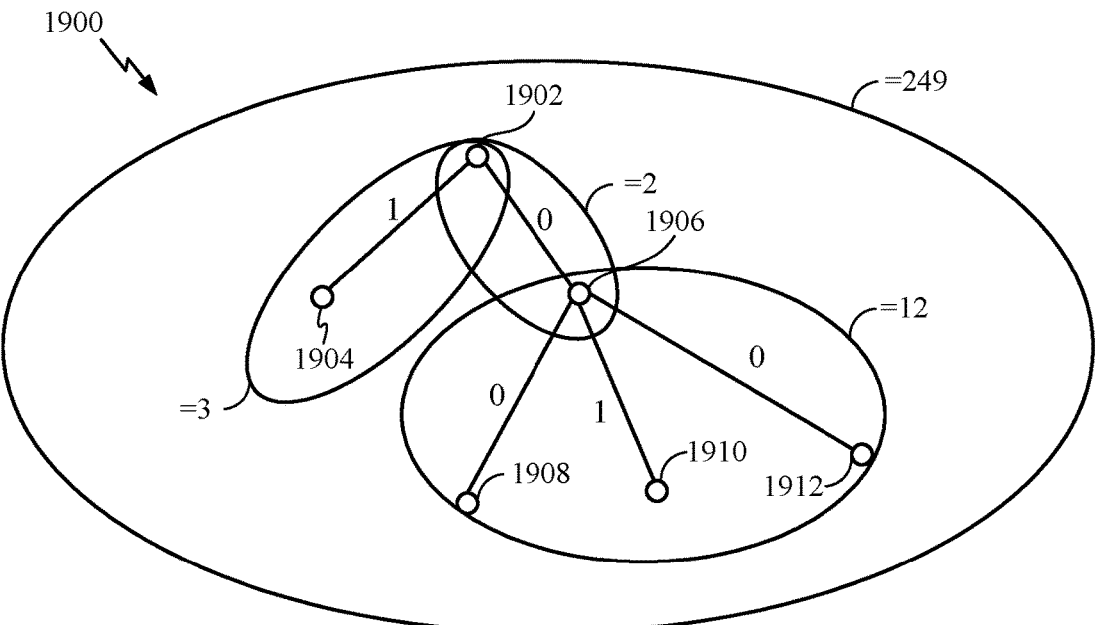
FIGS. 23 through 31 are schematic diagrams illustrating, by way of example, a process to enumerate RPSTs from a tree according to an embodiment.

FIGS. 23 through 31 are schematic diagrams of trees illustrating a specific example of enumerating RPSTs of a tree according to the process embodiments of FIGS. 20, 21 and 22. FIG. 23 shows a tree 1900 which comprises a BELT for this particular illustration of an embodiment, however, it should be understood that the processes described for enumerating RPSTs are applicable to non-BELT trees as well, and that claimed subject matter is not limited in this respect.

Tree 1900 may be represented as a numeral "249" according to an association of trees and natural numerals as described above with reference to FIG. 4, for example. As tree 1900 comprises two or more subtrees merged at a root node 1902, the natural numeral 249 comprises a non-composite natural numeral. Commencing execution of process 1600 for determining {RPSTs:: 249}, block 1602 defines FT=249. Since tree 1900 comprises a BELT in this particular embodiment, the value of "r" may be "1" consistent with the application of the push operation of relation (1). Accordingly, diamonds 1604 and 1606 direct initiating execution of process 1700 through block 1610.

Block 1704 initializes {RPSTs:: 249} as an empty set to be subsequently filled with natural numerals representing RPSTs of tree 1900. Since 249 (here, FT) comprises a composite natural numeral, block 1718 may initiate an instance of process 1800. Block 1804 initializes "remainder"=249 and block 1808 determines ST to be the natural numeral 3 (since 249 may be factored into two non-composite numerals 3 and 83).

Block 1810 may initiate a first recursive instance of process 1700 while providing FT=ST=3 as an input value, diamond 1708 determines that 3 is a non-composite numeral. Block 1710 performs an inverse push operation according to relation (3) to determine a natural numeral representative of the child tree of the subtree corresponding to the natural numeral 3 and an edge label value of an edge linking the child tree with the root node as follows:

$$\text{push}^{-1}(r = 1, k = 2, ST = 3) = \langle \text{child}, j \rangle \quad (5)$$

$$\text{child} = \text{Int}[(P^{-1}(3) + 2 - (2 - 1))/2]$$

$$= \text{Int}[(2 + 2 - (2 - 1))/2]$$

$$= 1$$

$$j = [(P^{-1}(3) + 2 - (2 - 1)]\text{modulo}[2]$$

$$= [(2 + 2 - (2 - 1)]\text{modulo}[2]$$

$$= 1$$

Block 1712 initiates execution of a second recursive instance of process 1700, initializing {RPSTs:: child}=ø and terminating at block 1720 through diamond 1706 (since child=1≤r). Returning to block 1714 of the first recursive instance of process 1700, {RPSTs:: child} is updated to be {r}={1} for this particular case of a BELT. Block 1716 then performs a push operation on the elements of the set {r} according to relation (2) (applying the edge label value j=1 as determined in relation (5) for block 1710) to provide an RPST, {3}, which is graphically illustrated in FIG. 24.

Execution of the initial instance of process 1800 then returns to block 1812 for updating {RPSTs:: FT} by including {RPSTs:: ST} (={3} as determined above) and merged combinations of the enumerated {RPSTs:: ST} with any other previously enumerated RPSTs according to relation (4). Since {RPSTs:: FT} at this point comprises an empty set, block 1812 merely updates {RPSTs:: FT} to include the single element of {RPSTs:: ST}. Block 1814 updates the remainder as FT/ST=249/3=83. This numeral corresponds to a subtree of tree 1900 formed by nodes 1902, 1906, 1908, 1910 and 1912 graphically illustrated as subtree 2100 in FIG. 25.

On a second iteration of the processing loop of blocks 1806 through 1816, block 1808 determines the non-composite factor of the remainder updated at block 1814 of the first iteration of the processing loop. Here, the natural numeral remainder, 83 as determined at block 1814 in the first iteration, comprises a non-composite numeral. Accordingly, block 1808 determines the natural numeral ST of the current iteration to be 83. Block 1810 then determines {RPSTs:: 83} by initiating a third recursive instance of process 1700. Since 83 is a non-composite natural numeral (as determined at diamond 1708), block 1710 determines the inverse push of 83 according to relation (3) as follows:

$$\text{push}^{-1}(r=1, k=2, ST=83) = \langle \text{child}, j \rangle \quad (6)$$

$$\text{child} = \text{Int}[(P^{-1}(83) + 2 - (2-1))/2]$$
$$= \text{Int}[(23 + 2 - (2-1))/2]$$
$$= 12$$
$$j = [(P^{-1}(83) + 2 - (2-1)] \text{modulo}[2]$$
$$= [(23 + 2 - (2-1)] \text{modulo}[2]$$
$$= 0$$

Figure 26:
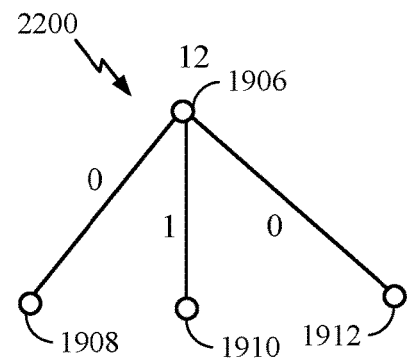

The result of this inverse push operation is graphically illustrated in FIG. 26 which includes a child tree 2200 of the subtree 2100 formed by the nodes 1906, 1908, 1910 and 1912. Block 1712 then determines {RPSTs:: 12} by initiating a fourth recursive instance of process 1700 (setting FT=child=12). Since the natural numeral "12" is a composite numeral (representing a tree which merges subtrees at a root node), block 1718 may determine {RPSTs:: 12} by initiating a first recursive instance of process 1800. As block 1804 sets remainder="12", block 1808 determines ST (the natural numeral representing a first merged subtree) as "2." Block 1810 may then determine {RPSTs:: 2} by initiating a fifth recursive instance of process 1700. Here, since "2" is a non-composite numeral (as determined at diamond 1708), block 1710 may determine the inverse push of "2" according to relation (3) as follows:

$$\text{push}^{-1}(r=1, k=0, ST=2) = \langle \text{child}, j \rangle \quad (7)$$

$$\text{child} = \text{Int}[(P^{-1}(2) + 2 - (2-1))/2]$$
$$= \text{Int}[(1 + 2 - (2-1))/2]$$
$$= 1$$
$$j = [(P^{-1}(2) + 2 - (2-1)] \text{modulo}[2]$$
$$= [(1 + 2 - (2-1)] \text{modulo}[2]$$
$$= 0$$

Block 1712 may initiate a sixth recursive instance of process 1700 to determine {RPSTs:: 1}. Diamond 1706 of the sixth recursive instance of process 1700 may terminate and return {RPSTs:: 1}=ø (i.e., the empty set). Returning to the fifth recursive instance of process 1700, block 1714 updates {RPSTs:: child} to include {r} ({r}={1} for this particular case where tree 1200 is a BELT). Accordingly, {RPSTs:: 2}=push {1}={2} (using the edge label value j=0 as determined at block 1710 of the fifth recursive instance of process 1700 and shown in relation (7)). This corresponds with the RPST 2300 of child tree 2200 formed by node 1906, and either node 1908 or 1912 as shown in FIG. 27.

Returning to block 1812 of the first recursive instance of process 1800, {RPSTs:: 12} is updated as {2}. The remainder is updated to be the natural numeral remainder/ST=12/2=6. Block 1808 determines ST to be the smallest non-composite factor of the updated remainder (here, "6") to be "2." As illustrated above in the fifth recursive instance of process 1700, block 1810 determines {RPSTs:: 2} to be {2} (again, corresponding with the RPST of subtree 2200 formed by node 1906, and either node 1908 or 1912). Block 1812 may then determine combinations of the previously enumerated elements of {RPSTs:: 12} with the elements of {RPSTs:: ST} using the set merger operation of relation (4) and update {RPSTs:: 12} as follows:

$$\{RPSTs:: 12\} = \{RPSTs:: 12\} \cup \{RPSTs:: 2\} \cup [\{RPSTs:: 12\} \times \{RPSTs:: 2\}] \quad (8)$$
$$= \{RPSTs:: 2\} \cup \{RPSTs:: 2\} \cup [\{RPSTs:: 2\} \times \{RPSTs:: 2\}]$$
$$= \{2\} \cup \{2\} \cup [\{2\} \times \{2\}]$$
$$= \{2, 4\}$$

Figure 27:
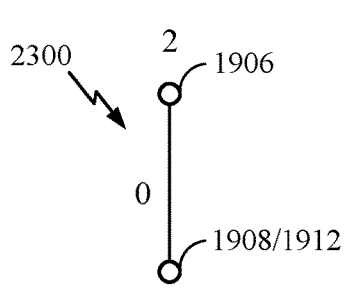
Figure 28:
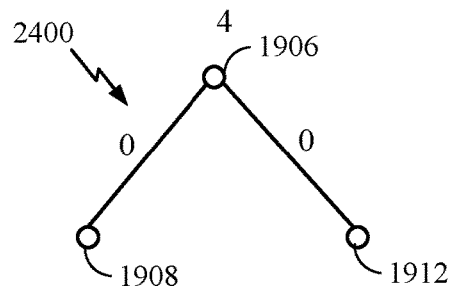
Figure 29:
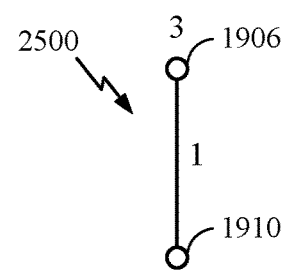

This updated {RPSTs:: 12} is graphically illustrated in FIGS. 27 (illustrating the RPST 2300 of child tree 2200) and 28 (illustrating an RPST 2400 of subtree 2200 associated with the natural numeral 4).

Block 1814 then updates the remainder=remainder/ST=6/2=3, and the next iteration of the processing loop of blocks 1806 through 1816 determines ST as "3" at block 1808. Block 1810 may determine {RPSTs:: ST}={RPSTs:: 3}={3} as illustrated above in the first recursive instance of process 1700. This resulting RSPT of the child tree 2200 includes nodes 1906 and 1910 as shown in RPST 2500 of FIG. 29. Block 1812 then updates {RPSTs:: 12} (from {RPSTs:: 12}={2, 4} at relation (8)) as follows:

$$\{RPSTs:: 12\} = \{2, 4\} \cup \{3\} \cup [\{2, 4\} \times \{3\}] \quad (9)$$
$$= \{2, 3, 4\} \cup \{6, 12\}$$
$$= \{2, 3, 4, 6, 12\}$$

Figure 30:
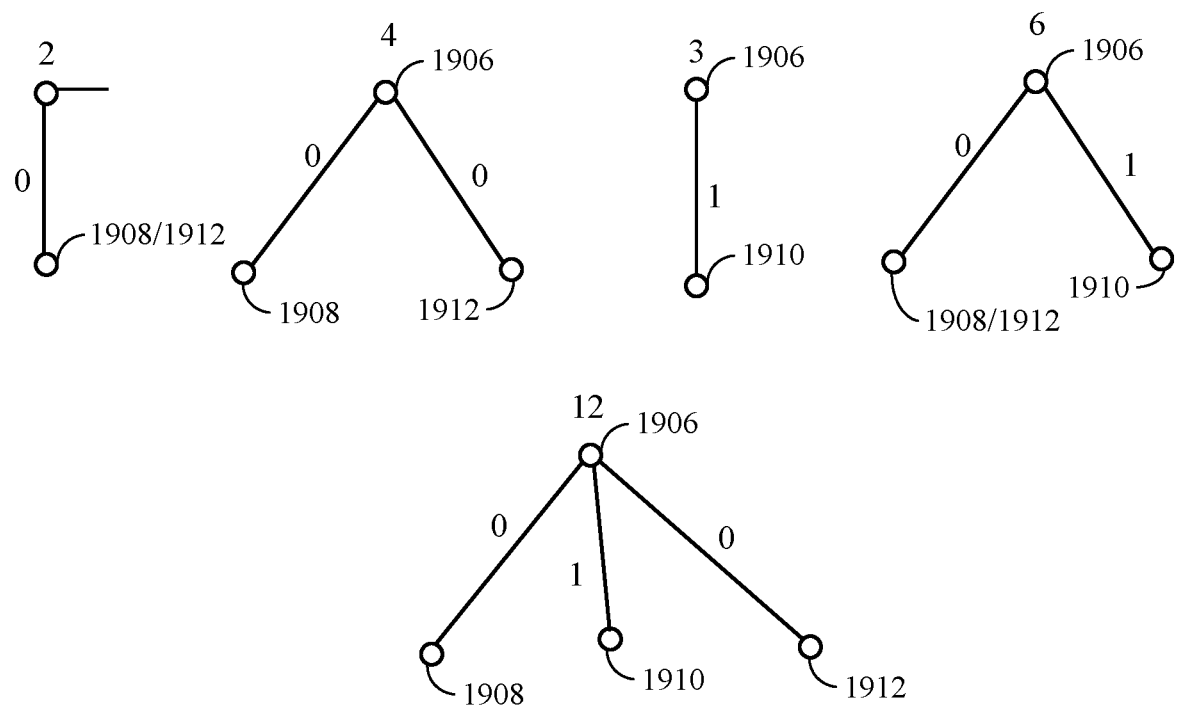

The resulting elements of {RPSTs:: 12} are graphically illustrated in FIG. 30 with corresponding nodes 1906, 1908, 1910 and 1912 of the child tree 2200 shown in FIG. 26. It should be noted that in the process of enumerating of elements of the set {RPSTs:: 12} at relations (8) and (9), duplicate RPSTs were enumerated for the RPST corresponding with numeral "4." Here, in listing the elements of the set {RPSTs:: 12} at relations (8) and (9) in this particular embodiment such a duplicate listing the RPST corresponding with the numeral "4" was not included so as to provide unique, unordered elements of the set {RPSTs:: 12}. However, this is merely a particular embodiment provided for illustration and claimed subject matter is not limited in this respect. For example, it should be readily appreciated that the process of enumerating RPSTs of a tree or subtree described herein may be readily applied alternative embodiments for enumerating RPSTs of a tree or subtree that includes such duplicated RPSTs. Again, this example of enumerating duplicate RPSTs is also merely an example provided for the purpose of illustration and claimed subject matter is not limited in this respect.

Returning to the third recursive instance of process 1700 (following the identification of 2200 as the child tree of RPST 2100 at block 1710 and the enumeration of the RPSTs of subtree 2200 as the elements of {RPSTs:: 12} in block 1712), block 1714 updates {RPSTs:: child} to include {RPSTs:: 12} U {r}={1, 2, 3, 4, 6, 12}. Block 1716 may then complete the enumeration of the elements of {RPSTs:: 83} by performing a push operation on the elements of {RPSTs:: child} according to relation (2) (with label index value j=0 as determined in relation (6)) as follows:

$$\{RPSTs::83\}=\text{zero-push}(\{1,2,3,4,6,12\})=\{2,5,11,17, 31,83\} \quad (10)$$

Figure 25:
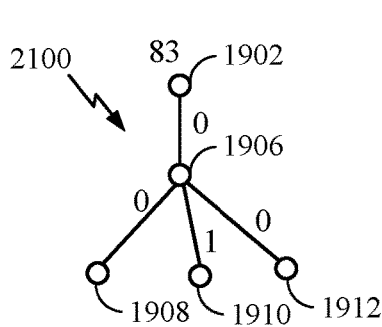

The resulting elements of {RPSTs:: 83} are graphically illustrated with reference to FIG. 31 with corresponding nodes 1902, 1906, 1908, 1910 and 1912 of the subtree 2100 shown in FIG. 25.

Figure 24:
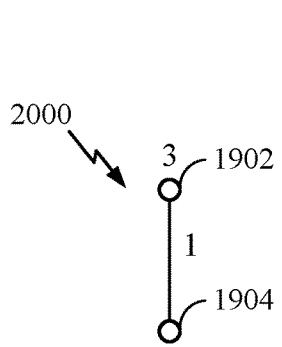
Figure 31:
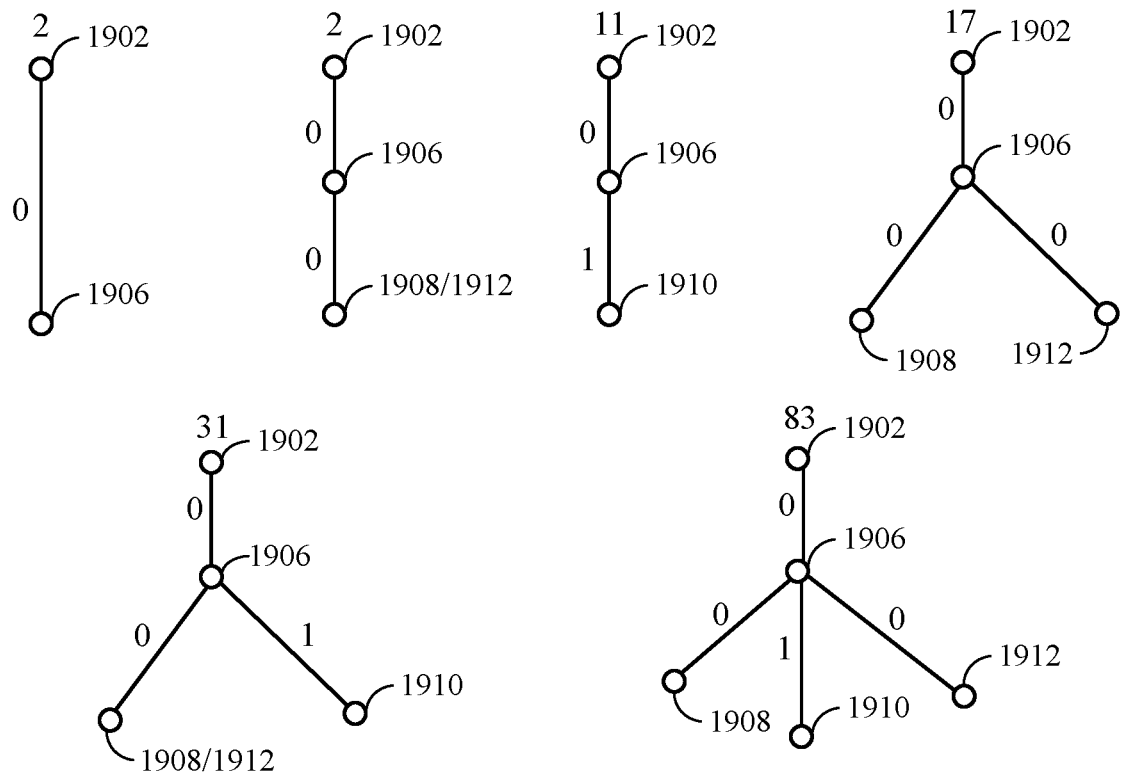

Returning to the initial instance of process 1800 (following the enumeration of elements in {RPSTs:: 3} corresponding with a first subtree merged at root node 1902 as graphically illustrated in FIG. 24 and the enumeration of elements in {RPSTs:: 83} corresponding with a second subtree merged at root node 1902 as graphically illustrated in FIG. 31), block 1812 updates {RPSTs:: FT} as follows:

$$\begin{aligned}\{RPSTs::\ FT\} &= \{RPSTs::\ 3\} U \{RPSTs::\ 83\} U [\{RPSTs::\ 3\} \times \{RPSTs::\ 83\}] \\ &= \{2, 3, 5, 11, 17, 31, 83\} U [\{3\} \times \{2, 5, 11, 17, 31, 83\}] \\ &= \{2, 3, 5, 11, 17, 31, 83\} U \{6, 15, 33, 51, 93, 249\} \\ &= \{2, 3, 5, 6, 11, 15, 17, 31, 33, 51, 83, 93, 249\}\end{aligned} \quad (11)$$

While the above illustrated example is a specific case of enumerating RPSTs from one particular BELT (associated with the natural numeral 249), it should be understood that the processes are general enough to enumerate RPSTs for any tree. Also, while the illustrated example is specifically directed to enumerating RPSTs of a BELT, claimed subject matter is not limited to this specific example or specifically to BELTs.

It should also be understood that, although particular embodiments have just been described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:
1. A method of querying a database, or a portion thereof, comprising:
    accessing instructions from one or more physical memory devices for execution by one or more processors;
    executing the instructions accessed from the one or more physical memory devices by the one or more processors;
    storing, in at least one of the physical memory devices, signal values, including numerical signal values, resulting from having executed the accessed instructions on the one or more processors, wherein the one or more physical memory devices also store the database, or the portion thereof;
    wherein the accessed instructions to transform the database, or the portion thereof, to the form of a hierarchically structured tree via one or more numerical signal values corresponding to content within the database, or the portion thereof;
    wherein the executing the transformation instructions comprises:
    generating the hierarchically structured tree via the one or more numerical signal values, the hierarchically structured tree comprising electronic content including binary digital signals and/or states; and
    wherein the executing the transformation instructions comprises:

presenting a query to the database, or the portion thereof, via at least one numerical signal value to fetch the content within the database, or the portion thereof.

2. The method of claim 1, and wherein the executing the transformation instructions comprises:
- identifying at least some of a plurality of partial subtrees of the hierarchically structured tree, wherein the plurality of partial subtrees are also in the form of signals and/or states;
- enumerating at least some partial subtrees of the at least some identified partial subtrees;
- associating the at least one numerical signal value with at least one of the at least some enumerated partial subtrees; and
- determining the at least one numerical signal value based, at least in part, on an association of numerical signal values with at least some of the at least some enumerated partial subtrees of the at least some identified partial subtrees.

3. The method of claim 2, wherein the identifying the at least some of the plurality of partial subtrees of the hierarchically structured tree comprises:
- identifying, from non-terminal nodes of the hierarchically structured tree, any root nodes of the at least some identified partial subtrees; and
- identifying one or more nodes descending from the root node of the at least some identified partial subtrees to be one or more nodes of the at least some enumerated partial subtrees.

4. The method of claim 3, wherein the identifying one or more nodes descending from the root node of the at least some identified partial subtrees comprises identifying the one or more nodes descending from the root node of the at least some identified partial subtrees down to a depth to be one or more nodes of the at least some enumerated partial subtrees.

5. The method of claim 3, wherein the identifying one or more nodes descending from the root node of the at least some identified partial subtrees comprises identifying the one or more nodes descending from the root node of the at least some identified partial subtrees based, at least in part, on one or more node label values associated with the one or more nodes.

6. The method of claim 1, and wherein the executing the transformation instructions comprises:
- comparing one or more probe numerical signal values with at least one target numerical signal value of the one or more numerical signal values, which is indicative of a presence of the content in the database, or the portion thereof, wherein the one or more probe numerical signal values are also based, at least in part, on an association of trees and numerical signal values, and
- wherein a correspondence between at least one of the one or more probe numerical signal values and the at least one target numerical signal value includes a match between the at least one probe numerical signal value and the at least one target numerical signal value.

7. The method of claim 1, and wherein the executing the transformation instructions further comprises: locating the content in the database, or the portion thereof.

8. The method of claim 1, wherein the executing the transformation instructions comprises identifying one or more query fields of the query.

9. The method of claim 8, wherein the executing the transformation instructions comprises enumerating at least some hierarchical query fields of the identified one or more query fields.

10. The method of claim 9, wherein the executing the transformation instructions comprises associating the at least one numerical signal value with at least one of the at least some hierarchical query fields.

11. The method of claim 10, wherein the executing the transformation instructions comprises comparing the at least one numerical signal value associated with the at least one hierarchical query fields and the one or more numerical signal values associated with the content within the database, or the portion thereof, to fetch the content via the at least one numerical signal value.

12. An apparatus comprising:
- one or more processors coupled to one or more physical memory devices are to store executable instructions and are to store binary digital signal quantities, as physical memory states, wherein the executable instructions are to be accessible from the one or more physical memory devices for execution by the one or more processors;
- wherein the one or more processors are able to store in at least one of the physical memory devices, binary signal quantities, if any, that are to result from execution of the instructions on the one or more processors, wherein the one or more physical memory devices also are to store a database, or a portion thereof, wherein the executable instructions are to transform the database, or the portion thereof, to the form of a hierarchically structured tree via one or more numerical signal values to correspond to content within the database, or the portion thereof;
- wherein the transformation instructions are to:
- generate the hierarchically structured tree via the one or more numerical signal values, wherein the hierarchically structured tree is to comprise electronic content comprising binary digital signals and/or states; and
- wherein the transformation instructions are to:
- present a query to the database, or the portion thereof, via at least one numerical signal value to fetch the content within the database, or the portion thereof.

13. The apparatus of claim 12, and wherein the transformation instructions are to:
- identify at least some of a plurality of partial subtrees of the hierarchically structured tree, wherein the plurality of partial subtrees are also in the form of signals and/or states;
- enumerate at least some partial subtrees of the at least some identified partial subtrees;
- associate the at least one numerical signal value with at least one of the at least some enumerated partial subtrees; and
- determine the at least one numerical signal value based, at least in part, on an association of numerical signal values with at least some of the at least some to be enumerated partial subtrees of the at least some to be identified partial subtrees.

14. The apparatus of claim 13, wherein the transformation instructions to identify the at least some partial subtrees of the hierarchically structured tree are to:
- identify, from non-terminal nodes of the tree, any root nodes of the at least some to be identified partial subtrees; and
- identify one or more nodes to descend from the root node of the at least some to be identified partial subtrees to be one or more nodes of the at least some to be enumerated partial subtrees.

15. The apparatus of claim 14, wherein the transformation instructions to identify the one or more nodes to descend from the root node of the at least some to be identified partial subtrees are to identify the one or more nodes to descend from the root node of the at least some to be identified partial subtrees down to a depth to be one or more nodes of the at least some to be enumerated partial subtrees.

16. The apparatus of claim 14, wherein the transformation instructions to identify the one or more nodes to descend from the root node of the at least some to be identified partial subtrees are to identify the one or more nodes to descend from the root node of the at least some to be identified partial subtrees based, at least in part, one or more on node values to be associated with the one or more nodes.

17. The apparatus of claim 12, wherein the transformation instructions are to:
compare one or more probe numerical signal values with at least one target numerical signal value of the one or more numerical signal values, which is to be indicative of a presence of the content in the database, or the portion thereof, wherein the one or more probe numerical signal values are also to be based, at least in part, on an association of trees and numerical signal values, and wherein a correspondence between at least one of the one or more probe numerical signal values and the at least one target numerical signal value is to include a match between the at least one numerical signal value and the at least one target numerical signal value.

18. The apparatus of claim 13, wherein the transformation instructions are to:
generate a first array of target numerals to comprise numerical signal values in the form of signals and/or states to be associated with the at least some to be identified partial subtrees; and
update the first array of target numerical signal values to be based at least in part on a combination of the one or more target numerical signal values to represent the tree with the numerical signal values of the first array of target numerical signal values.

19. The apparatus of claim 12, wherein the transformation instructions are to: locate the content to be in the database, or the portion thereof.

20. The apparatus of claim 12, and wherein the transformation instructions are to:
identify one or more query fields of the query.

21. The apparatus of claim 20, and wherein the transformation instructions are to:
enumerate at least some hierarchical query fields of the to be identified one or more query fields.

22. The apparatus of claim 21, and wherein the transformation instructions are to:
associate the at least one numerical signal value with at least one of the at least some hierarchical query fields.

23. The apparatus of claim 22, and wherein the transformation instructions are to:
compare the at least one numerical signal value to be associated with the at least one hierarchical query fields and the one or more numerical signal values associated with the content within the database, or the portion thereof, to fetch the content via the at least one numerical signal value.

24. An article comprising: a non-transitory storage medium that includes executable instructions stored thereon; wherein the instructions are executable by one or more processors to be coupled to one or more physical memory devices, the physical memory devices are to store instructions, including the executable instructions, and are to store binary digital signal quantities, as physical memory states, wherein the executable instructions are to be accessible from the one or more physical memory devices for execution by the one or more processors;
wherein the one or more processors are able to store in at least one of the physical memory devices, binary signal quantities, if any, that are to result from execution of the instructions on the one or more processors, wherein the one or more physical memory devices are also to store a database, or the portion thereof, and wherein the executable instructions are to transform the database, or the portion thereof, to the form of a hierarchically structured tree via one or more numerical signal values to correspond to content within the database, or the portion thereof;
wherein the transformation instructions are to:
generate the hierarchically structured tree via the one or more numerical signal values, wherein the hierarchically structured tree is to comprise electronic content comprising binary digital signals and/or states; and
wherein the transformation instructions are to:
present a query to the database, or the portion thereof, via at least one numerical signal value to fetch the content within the database, or the portion thereof.

25. The article of claim 24, and wherein the transformation instructions are to:
identify at least some of a plurality of partial subtrees of the hierarchically structured tree, wherein the plurality of partial subtrees are also in the form of signals and/or states;
enumerate at least some partial subtrees of the at least some identified partial subtrees;
associate the at least one numerical signal value with at least one of the at least some enumerated partial subtrees; and
determine the at least one numerical signal value based, at least in part, on an association of numerical signal values with at least some of the at least some to be enumerated partial subtrees of the at least some to be identified partial subtrees.

26. The article of claim 25, wherein the transformation instructions to identify the at least some partial subtrees of the hierarchically structured tree are to:
identify, from non-terminal nodes of the tree, any root nodes of the at least some to be identified partial subtrees; and
identify one or more nodes to descend from the root node of the at least some to be identified partial subtrees to be one or more nodes of the at least some to be enumerated partial subtrees.

27. The article of claim 26, wherein the transformation instructions to identify the one or more nodes to descend from the root node of the at least some to be identified partial subtrees are to identify the one or more nodes to descend from the root node of the at least some to be identified partial subtrees down to a depth to be one or more nodes of the at least some to be enumerated partial subtrees.

28. The article of claim 26, wherein the transformation instructions to identify the one or more nodes to descend from the root node of the at least some to be identified partial subtrees are to identify the one or more nodes to descend from the root node of the at least some to be identified partial subtrees based, at least in part, on one or more node label values associated with the one or more nodes.

29. The article of claim 24, wherein the transformation instructions are to:
compare one or more probe numerical signal values with at least one target numerical signal value of the one or more numerical signal values, which is to be indicative of a presence of the content in the database, or the portion thereof, wherein the one or more probe numerical signal values are also to be based, at least in part, on an association of trees and numerical signal values, and wherein a correspondence between at least one of the one or more probe numerical signal values and the at least one target numerical signal value is to include a match between the at least one probe numerical signal value and the at least one target numerical signal values.

30. The article of claim 25, wherein the transformation instructions are to:
generate a first array of target numerals to comprise numerical signal values in the form of signals and/or states to be associated with the at least some to be identified partial subtrees; and
update the first array of target numerical signal values to be based at least in part on a combination of the one or more target numerical signal values to represent the hierarchically structured tree with the numerical signal values of the first array of target numerical signal values.

31. The article of claim 24, wherein the transformation instructions are to: locate the content to be in the database, or the portion thereof.

32. The article of claim 24, wherein the transformation instruction are to:
identify one or more query fields of the query.

33. The article of claim 32, wherein the transformation instructions are to:
enumerate at least some hierarchical query fields of the identified one or more query fields.

34. The article of claim 33, wherein the transformation instructions are to:
associate the at least one numerical signal value with at least one of the at least some hierarchical query fields.

35. The article of claim 34, and wherein the transformation instructions are to: compare the at least one numerical signal value associated with the at least one hierarchical query fields and the one or more numerical signal values to be associated with the content within the database, or the portion thereof, to fetch the content via the at least one numerical signal value.

* * * * *